(12) United States Patent
Helferich

(10) Patent No.: US 9,167,401 B2
(45) Date of Patent: *Oct. 20, 2015

(54) WIRELESS MESSAGING AND CONTENT PROVISION SYSTEMS AND METHODS

(71) Applicant: Wireless Science, LLC, Chatsworth, CA (US)

(72) Inventor: Richard J. Helferich, Encinitas, CA (US)

(73) Assignee: Wireless Science, LLC, Phoenix, AZ (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/225,727

(22) Filed: Mar. 26, 2014

(65) Prior Publication Data

US 2014/0206320 A1 Jul. 24, 2014

Related U.S. Application Data

(60) Division of application No. 13/895,226, filed on May 15, 2013, now abandoned, which is a division of application No. 12/973,722, filed on Dec. 20, 2010, now Pat. No. 9,071,953, which is a division of (Continued)

(51) Int. Cl.
*H04W 4/18* (2009.01)
*H04L 12/58* (2006.01)
(Continued)

(52) U.S. Cl.
CPC .............. *H04W 4/18* (2013.01); *H04L 12/6418* (2013.01); *H04L 51/063* (2013.01); *H04L 51/22* (2013.01);
(Continued)

(58) Field of Classification Search
CPC ............ H04M 3/42042; H04M 1/575; H04M 1/72522; H04M 11/022; H04M 2203/2038; H04M 2201/50; H04Q 2213/13091; H04Q 3/0029; H04Q 3/74; H04W 12/06; H04W 8/005; H04L 47/10; H04L 2012/2841; H04L 2463/062; H04L 41/082; H04N 2201/32
See application file for complete search history.

(56) References Cited

U.S. PATENT DOCUMENTS

| | | |
|---|---|---|
| 2,003,576 A | 6/1935 | Buhren |
| 3,118,145 A | 1/1964 | Nee |

(Continued)

FOREIGN PATENT DOCUMENTS

| | | |
|---|---|---|
| EP | 631419 | 12/1994 |
| EP | 0 695 071 | 1/1996 |

(Continued)

OTHER PUBLICATIONS

Patent Owner Notice of Appeal in Inter Partes Reexamination of U.S. Pat. No. 7,835,757, Control No. 95/001,984 (Dec. 19, 2014).

(Continued)

*Primary Examiner* — Nizar Sivji
(74) *Attorney, Agent, or Firm* — Law Offices of Steven G. Lisa, Ltd.; Jon E. Kappes, Esq.; Justin J. Lesko, Esq.

(57) ABSTRACT

A messaging system and methods used by content providers to deliver items of content stored in an internet-accessible storage system to a cell phone by causing communication of notifications or paging calls to the cell phone that specify the item of content from among other items of content stored in the storage system and include a system address for the cell phone to initially contact to request the item of content; and methods that identify the system storing the content, that receive identifiers from a separate identification service; that update the content without causing communication of another notification; and that provide for performing action on information at different times, and for selective paging.

27 Claims, 19 Drawing Sheets

Related U.S. Application Data application No. 11/598,202, filed on Nov. 13, 2006, now Pat. No. 8,107,601, which is a continuation of application No. 10/445,257, filed on May 27, 2003, now abandoned, which is a continuation of application No. 09/540,490, filed on Mar. 31, 2000, now Pat. No. 6,636,733, which is a continuation-in-part of application No. 09/408,841, filed on Sep. 30, 1999, now Pat. No. 6,826,407, said application No. 09/540,490 is a continuation-in-part of application No. 08/934,143, filed on Sep. 19, 1997, now Pat. No. 6,233,430, and a continuation-in-part of application No. 08/933,344, filed on Sep. 19, 1997, now Pat. No. 6,253,061, and a continuation-in-part of application No. 08/934,132, filed on Sep. 19, 1997, now Pat. No. 6,087,956, and a continuation-in-part of application No. 08/934,337, filed on Sep. 19, 1997, now Pat. No. 6,259,892, and a continuation-in-part of application No. 08/989,874, filed on Dec. 12, 1997, now Pat. No. 6,097,941.

(60) Provisional application No. 60/155,055, filed on Sep. 21, 1999, provisional application No. 60/126,939, filed on Mar. 29, 1999.

(51) Int. Cl.
*H04W 4/12* (2009.01)
*H04L 12/64* (2006.01)
*H04M 3/53* (2006.01)
*H04M 3/533* (2006.01)
*H04W 68/00* (2009.01)
*H04M 3/42* (2006.01)
*H04M 11/02* (2006.01)
*H04W 84/02* (2009.01)
*H04W 88/02* (2009.01)
*H04W 88/18* (2009.01)
*H04W 92/02* (2009.01)
*H04W 4/14* (2009.01)

(52) U.S. Cl.
CPC ............... *H04L 51/24* (2013.01); *H04M 3/533* (2013.01); *H04M 3/5307* (2013.01); *H04W 4/12* (2013.01); *H04W 68/005* (2013.01); *H04L 51/043* (2013.01); *H04L 51/36* (2013.01); *H04L 51/38* (2013.01); *H04L 2012/6421* (2013.01); *H04L 2012/6472* (2013.01); *H04L 2012/6475* (2013.01); *H04L 2012/6481* (2013.01); *H04L 2012/6483* (2013.01); *H04M 3/42042* (2013.01); *H04M 3/42059* (2013.01); *H04M 3/42093* (2013.01); *H04M 11/022* (2013.01); *H04M 2203/4536* (2013.01); *H04M 2203/658* (2013.01); *H04M 2242/22* (2013.01); *H04W 4/14* (2013.01); *H04W 84/025* (2013.01); *H04W 88/022* (2013.01); *H04W 88/023* (2013.01); *H04W 88/184* (2013.01); *H04W 92/02* (2013.01)

(56) References Cited

U.S. PATENT DOCUMENTS

| | | |
|---|---|---|
| 3,794,983 A | 2/1974 | Sahin |
| 3,973,200 A | 8/1976 | Akerberg |
| 4,039,761 A | 8/1977 | Nicoud et al. |
| 4,042,906 A | 8/1977 | Ezell |
| 4,124,773 A | 11/1978 | Elkins |
| 4,369,443 A | 1/1983 | Giallanza et al. |
| 4,371,752 A | 2/1983 | Matthews et al. |
| 4,412,217 A | 10/1983 | Willard et al. |
| 4,468,813 A | 8/1984 | Burke et al. |
| 4,480,253 A | 10/1984 | Anderson |
| 4,495,647 A | 1/1985 | Burke et al. |
| 4,549,047 A | 10/1985 | Brian et al. |
| 4,573,140 A | 2/1986 | Szeto |
| 4,602,129 A | 7/1986 | Matthews et al. |
| 4,640,991 A | 2/1987 | Matthews et al. |
| 4,644,352 A | 2/1987 | Fujii |
| 4,654,713 A | 3/1987 | Boucharlat et al. |
| 4,710,955 A | 12/1987 | Kauffman |
| 4,713,837 A | 12/1987 | Gordon |
| 4,737,979 A | 4/1988 | Hashimoto |
| 4,769,641 A | 9/1988 | Yoshizawa et al. |
| 4,769,642 A | 9/1988 | Davis et al. |
| 4,786,902 A | 11/1988 | Davis et al. |
| 4,807,155 A | 2/1989 | Cree et al. |
| 4,811,376 A | 3/1989 | Davis et al. |
| 4,812,843 A | 3/1989 | Champion, III et al. |
| 4,821,308 A | 4/1989 | Hashimoto |
| 4,825,456 A | 4/1989 | Rosenberg |
| 4,837,798 A | 6/1989 | Cohen et al. |
| 4,837,800 A | 6/1989 | Freeburg et al. |
| 4,839,645 A | 6/1989 | Lill |
| 4,839,734 A | 6/1989 | Takemura |
| 4,845,491 A | 7/1989 | Fascenda et al. |
| 4,851,829 A | 7/1989 | DeLuca et al. |
| 4,853,688 A | 8/1989 | Andros et al. |
| 4,858,232 A | 8/1989 | Diaz et al. |
| 4,864,301 A | 9/1989 | Helferich |
| 4,868,560 A | 9/1989 | Oliwa et al. |
| 4,872,005 A | 10/1989 | DeLuca et al. |
| 4,873,520 A | 10/1989 | Fisch et al. |
| 4,885,577 A | 12/1989 | Nelson |
| 4,897,835 A | 1/1990 | Gaskill et al. |
| 4,905,003 A | 2/1990 | Helferich |
| 4,916,737 A | 4/1990 | Chomet et al. |
| 4,942,598 A | 7/1990 | Davis |
| 4,949,143 A | 8/1990 | Iesaka et al. |
| 4,961,216 A | 10/1990 | Baehr et al. |
| 4,965,569 A | 10/1990 | Bennett et al. |
| 4,975,694 A | 12/1990 | McLaughlin et al. |
| 5,003,576 A | 3/1991 | Helferich |
| 5,003,577 A | 3/1991 | Ertz et al. |
| 5,005,013 A | 4/1991 | Tsukamoto et al. |
| 5,007,105 A | 4/1991 | Kudoh et al. |
| 5,029,199 A | 7/1991 | Jones et al. |
| 5,040,204 A | 8/1991 | Sasaki et al. |
| 5,043,721 A | 8/1991 | May |
| 5,047,763 A | 9/1991 | Kuznicki et al. |
| 5,065,423 A | 11/1991 | Gaskill |
| 5,070,536 A | 12/1991 | Mahany et al. |
| 5,093,659 A | 3/1992 | Yamada |
| 5,093,901 A | 3/1992 | Cree et al. |
| 5,115,233 A | 5/1992 | Zdunek et al. |
| 5,117,449 A | 5/1992 | Metroka et al. |
| 5,128,980 A | 7/1992 | Choi |
| 5,128,981 A | 7/1992 | Tsukamoto et al. |
| 5,134,724 A | 7/1992 | Gehring et al. |
| 5,138,311 A | 8/1992 | Weinberg |
| 5,138,312 A | 8/1992 | Tsukamoto et al. |
| 5,140,419 A | 8/1992 | Galumbeck et al. |
| 5,146,612 A | 9/1992 | Grosjean et al. |
| 5,153,582 A | 10/1992 | Davis |
| 5,153,903 A | 10/1992 | Eastmond et al. |
| 5,159,331 A | 10/1992 | Park et al. |
| 5,159,592 A | 10/1992 | Perkins |
| 5,159,713 A | 10/1992 | Gaskill et al. |
| 5,173,688 A | 12/1992 | DeLuca et al. |
| 5,175,758 A | 12/1992 | Levanto et al. |
| 5,177,780 A | 1/1993 | Kasper et al. |
| 5,182,553 A | 1/1993 | Kung |
| 5,185,604 A | 2/1993 | Nepple et al. |
| 5,192,947 A | 3/1993 | Neustein |
| 5,194,857 A | 3/1993 | Gomez |
| 5,212,636 A | 5/1993 | Nakazawa |
| 5,220,366 A | 6/1993 | King |
| 5,227,774 A | 7/1993 | Benoist |
| 5,239,466 A | 8/1993 | Morgan et al. |
| 5,239,679 A | 8/1993 | Murai |

(56) References Cited

U.S. PATENT DOCUMENTS

| | | |
|---|---|---|
| 5,241,305 A | 8/1993 | Fascenda et al. |
| 5,247,700 A | 9/1993 | Wohl et al. |
| 5,249,230 A | 9/1993 | Mihm, Jr. |
| 5,255,305 A | 10/1993 | Sattar |
| 5,257,307 A | 10/1993 | Ise |
| 5,265,033 A | 11/1993 | Vajk et al. |
| 5,283,818 A | 2/1994 | Klausner et al. |
| 5,285,426 A | 2/1994 | Teodoridis |
| 5,285,496 A | 2/1994 | Frank et al. |
| 5,315,635 A | 5/1994 | Kane et al. |
| 5,329,501 A | 7/1994 | Meister et al. |
| 5,329,550 A | 7/1994 | Rousseau et al. |
| 5,332,994 A | 7/1994 | Kawashima et al. |
| 5,333,266 A | 7/1994 | Boaz et al. |
| 5,349,678 A | 9/1994 | Morris et al. |
| 5,375,161 A | 12/1994 | Fuller et al. |
| 5,379,031 A | 1/1995 | Mondrosch et al. |
| 5,390,362 A | 2/1995 | Modjeska et al. |
| 5,392,451 A | 2/1995 | Schwendeman et al. |
| 5,396,537 A | 3/1995 | Schwendeman |
| 5,396,547 A | 3/1995 | Baals et al. |
| 5,398,021 A | 3/1995 | Moore |
| 5,402,466 A | 3/1995 | Delahanty |
| 5,406,557 A | 4/1995 | Baudoin |
| 5,406,616 A | 4/1995 | Bjorndahl |
| 5,410,302 A | 4/1995 | Dulaney, III et al. |
| 5,416,473 A | 5/1995 | Dulaney, III et al. |
| 5,416,725 A | 5/1995 | Pacheco et al. |
| 5,418,835 A | 5/1995 | Frohman et al. |
| 5,420,922 A | 5/1995 | Lundblad et al. |
| RE34,976 E | 6/1995 | Helferich et al. |
| 5,426,422 A | 6/1995 | Vanden Heuvel et al. |
| 5,426,594 A | 6/1995 | Wright et al. |
| 5,428,663 A | 6/1995 | Grimes et al. |
| 5,428,784 A | 6/1995 | Cahill, Jr. |
| 5,432,839 A | 7/1995 | DeLuca |
| 5,436,960 A | 7/1995 | Campana, Jr. et al. |
| 5,438,611 A | 8/1995 | Campana, Jr. et al. |
| 5,440,559 A | 8/1995 | Gaskill |
| 5,442,706 A | 8/1995 | Kung |
| 5,444,438 A | 8/1995 | Goldberg |
| 5,444,671 A | 8/1995 | Tschannen et al. |
| 5,448,759 A | 9/1995 | Krebs et al. |
| 5,452,289 A | 9/1995 | Sharma et al. |
| 5,452,356 A | 9/1995 | Albert |
| 5,455,579 A | 10/1995 | Bennett et al. |
| 5,455,823 A | 10/1995 | Noreen et al. |
| 5,457,732 A | 10/1995 | Goldberg |
| 5,463,382 A | 10/1995 | Nikas et al. |
| 5,463,672 A | 10/1995 | Kage |
| 5,471,470 A | 11/1995 | Sharma et al. |
| 5,473,143 A | 12/1995 | Vak et al. |
| 5,473,320 A | 12/1995 | DeLuca et al. |
| 5,473,667 A | 12/1995 | Neustein |
| 5,475,653 A | 12/1995 | Yamada et al. |
| 5,475,863 A | 12/1995 | Simpson et al. |
| 5,475,866 A | 12/1995 | Ruthenberg |
| 5,479,378 A | 12/1995 | Yamada et al. |
| 5,479,408 A | 12/1995 | Will |
| 5,479,472 A | 12/1995 | Campana, Jr. et al. |
| 5,481,255 A | 1/1996 | Albert et al. |
| 5,483,352 A | 1/1996 | Fukuyama et al. |
| 5,483,595 A | 1/1996 | Owen |
| 5,485,503 A | 1/1996 | Diem |
| 5,487,100 A | 1/1996 | Kane |
| 5,487,167 A | 1/1996 | Dinallo et al. |
| 5,489,894 A | 2/1996 | Murray |
| 5,493,692 A | 2/1996 | Theimer et al. |
| 5,497,373 A | 3/1996 | Hulen et al. |
| 5,506,886 A | 4/1996 | Maine et al. |
| 5,511,069 A | 4/1996 | England et al. |
| 5,524,009 A | 6/1996 | Tuutijarvi et al. |
| 5,530,438 A | 6/1996 | Bickham et al. |
| 5,530,930 A | 6/1996 | Hahn |
| 5,544,321 A | 8/1996 | Theimer et al. |
| 5,546,077 A | 8/1996 | Lipp et al. |
| 5,550,535 A | 8/1996 | Park |
| 5,555,376 A | 9/1996 | Theimer et al. |
| 5,555,446 A | 9/1996 | Jasinski |
| 5,557,606 A | 9/1996 | Moon |
| 5,557,659 A | 9/1996 | Hyde-Thomson |
| 5,557,749 A | 9/1996 | Norris |
| 5,559,800 A | 9/1996 | Mousseau et al. |
| 5,559,862 A | 9/1996 | Bhagat et al. |
| 5,561,702 A | 10/1996 | Lipp et al. |
| 5,564,018 A | 10/1996 | Flores et al. |
| 5,568,536 A | 10/1996 | Tiller et al. |
| 5,568,540 A | 10/1996 | Greco et al. |
| 5,572,196 A | 11/1996 | Sakumoto et al. |
| 5,572,488 A | 11/1996 | Yamada et al. |
| 5,577,041 A | 11/1996 | Sharma et al. |
| 5,579,372 A | 11/1996 | Astrom |
| 5,581,366 A | 12/1996 | Merchant et al. |
| 5,581,593 A | 12/1996 | Engelke et al. |
| 5,584,070 A | 12/1996 | Harris et al. |
| 5,588,009 A | 12/1996 | Will |
| 5,590,092 A | 12/1996 | Fehnel |
| 5,592,532 A | 1/1997 | Koizumi et al. |
| 5,600,703 A | 2/1997 | Dang et al. |
| 5,600,708 A | 2/1997 | Meche et al. |
| 5,603,054 A | 2/1997 | Theimer et al. |
| 5,604,788 A | 2/1997 | Tett |
| 5,608,446 A | 3/1997 | Carr et al. |
| 5,608,786 A | 3/1997 | Gordon |
| 5,611,050 A | 3/1997 | Theimer et al. |
| 5,623,242 A | 4/1997 | Dawson, Jr. et al. |
| 5,625,870 A | 4/1997 | Moon |
| 5,627,525 A | 5/1997 | Kudoh et al. |
| 5,627,876 A | 5/1997 | Moon |
| 5,630,060 A | 5/1997 | Tang et al. |
| 5,630,207 A | 5/1997 | Gitlin et al. |
| 5,631,635 A | 5/1997 | Robertson |
| 5,631,948 A | 5/1997 | Bartholomew et al. |
| 5,633,916 A | 5/1997 | Goldhagen et al. |
| 5,635,918 A | 6/1997 | Tett |
| 5,636,265 A | 6/1997 | O'Connell et al. |
| 5,638,369 A | 6/1997 | Ayerst et al. |
| 5,640,442 A | 6/1997 | Fitzgerald et al. |
| 5,644,627 A | 7/1997 | Segal et al. |
| 5,649,305 A | 7/1997 | Yoshida |
| 5,652,789 A | 7/1997 | Miner et al. |
| 5,654,942 A | 8/1997 | Akahane |
| 5,661,782 A | 8/1997 | Bartholomew et al. |
| 5,663,703 A | 9/1997 | Pearlman et al. |
| 5,668,880 A | 9/1997 | Alajajian |
| 5,675,507 A | 10/1997 | Bobo, II |
| 5,675,627 A | 10/1997 | Yaker |
| 5,678,176 A | 10/1997 | Moon |
| 5,678,179 A | 10/1997 | Turcotte et al. |
| 5,680,442 A | 10/1997 | Bartholomew et al. |
| 5,684,859 A | 11/1997 | Chanroo et al. |
| 5,694,120 A | 12/1997 | Indekeu et al. |
| 5,694,454 A | 12/1997 | Hill et al. |
| 5,696,500 A | 12/1997 | Diem |
| 5,699,053 A | 12/1997 | Jonsson |
| 5,703,934 A | 12/1997 | Zicker et al. |
| 5,706,211 A | 1/1998 | Beletic et al. |
| 5,706,434 A | 1/1998 | Fraize et al. |
| 5,710,816 A | 1/1998 | Stork et al. |
| 5,717,742 A | 2/1998 | Hyde-Thomson |
| 5,722,071 A | 2/1998 | Berg et al. |
| 5,724,410 A | 3/1998 | Parvulescu et al. |
| 5,724,424 A | 3/1998 | Gifford |
| 5,726,643 A | 3/1998 | Tani |
| 5,737,394 A | 4/1998 | Anderson et al. |
| 5,737,395 A | 4/1998 | Irribarren |
| 5,737,688 A | 4/1998 | Sakai et al. |
| 5,740,230 A | 4/1998 | Vaudreuil |
| 5,742,668 A * | 4/1998 | Pepe et al. .................. 455/415 |
| 5,742,905 A | 4/1998 | Pepe et al. |
| 5,745,689 A | 4/1998 | Yeager et al. |
| 5,748,100 A | 5/1998 | Gutman et al. |
| 5,751,706 A | 5/1998 | Land et al. |
| 5,751,793 A | 5/1998 | Davies et al. |

(56) References Cited

U.S. PATENT DOCUMENTS

| | | |
|---|---|---|
| 5,751,814 A | 5/1998 | Kafri |
| 5,752,191 A | 5/1998 | Fuller et al. |
| 5,754,119 A | 5/1998 | Deluca et al. |
| 5,761,622 A | 6/1998 | Priest |
| 5,764,747 A | 6/1998 | Yue et al. |
| 5,768,381 A | 6/1998 | Hawthorne |
| 5,768,509 A | 6/1998 | Günlük |
| 5,774,803 A | 6/1998 | Kariya |
| 5,778,315 A | 7/1998 | Proietti |
| 5,781,857 A | 7/1998 | Hwang et al. |
| 5,787,345 A | 7/1998 | Moon |
| 5,794,039 A | 8/1998 | Guck |
| 5,794,144 A | 8/1998 | Comer et al. |
| 5,796,394 A | 8/1998 | Wicks et al. |
| 5,797,091 A | 8/1998 | Clise et al. |
| 5,802,165 A | 9/1998 | Kim |
| 5,802,466 A | 9/1998 | Gallant et al. |
| 5,805,886 A | 9/1998 | Skarbo et al. |
| 5,809,115 A | 9/1998 | Inkinen |
| 5,809,116 A | 9/1998 | Cairo |
| 5,809,130 A | 9/1998 | Ayala |
| 5,809,413 A | 9/1998 | Meche et al. |
| 5,809,415 A | 9/1998 | Rossmann |
| 5,809,424 A | 9/1998 | Eizenhoefer |
| 5,809,428 A | 9/1998 | Garahi et al. |
| 5,812,639 A | 9/1998 | Bartholomew et al. |
| 5,812,671 A | 9/1998 | Ross, Jr. |
| 5,812,776 A | 9/1998 | Gifford |
| 5,812,795 A | 9/1998 | Horovitz et al. |
| 5,812,865 A | 9/1998 | Theimer et al. |
| 5,815,800 A | 9/1998 | Su et al. |
| 5,818,824 A | 10/1998 | Lu et al. |
| 5,821,874 A | 10/1998 | Parvulescu et al. |
| 5,826,187 A | 10/1998 | Core et al. |
| 5,826,191 A | 10/1998 | Krishnan |
| 5,828,882 A | 10/1998 | Hinckley |
| 5,835,089 A | 11/1998 | Skarbo et al. |
| 5,838,252 A | 11/1998 | Kikinis |
| 5,841,837 A | 11/1998 | Fuller et al. |
| 5,844,498 A | 12/1998 | Ide |
| 5,845,202 A | 12/1998 | Davis |
| 5,845,211 A | 12/1998 | Roach, Jr. |
| 5,850,429 A | 12/1998 | Joyce et al. |
| 5,850,520 A | 12/1998 | Griebenow et al. |
| 5,850,594 A | 12/1998 | Cannon et al. |
| 5,857,020 A | 1/1999 | Peterson, Jr. |
| 5,862,325 A | 1/1999 | Reed et al. |
| 5,864,606 A | 1/1999 | Hanson et al. |
| 5,867,793 A | 2/1999 | Davis |
| 5,870,030 A | 2/1999 | DeLuca et al. |
| 5,870,454 A | 2/1999 | Dahlen |
| 5,872,779 A | 2/1999 | Vaudreuil |
| 5,872,847 A | 2/1999 | Boyle et al. |
| 5,872,926 A | 2/1999 | Levac et al. |
| 5,872,930 A | 2/1999 | Masters et al. |
| 5,875,436 A | 2/1999 | Kikinis |
| 5,878,230 A | 3/1999 | Weber et al. |
| 5,878,351 A | 3/1999 | Alanara et al. |
| 5,880,731 A | 3/1999 | Liles et al. |
| 5,884,159 A | 3/1999 | Thro et al. |
| 5,884,160 A | 3/1999 | Kanazaki |
| 5,884,170 A | 3/1999 | Valentine et al. |
| 5,887,249 A | 3/1999 | Schmid |
| 5,889,852 A | 3/1999 | Rosecrans et al. |
| 5,892,909 A | 4/1999 | Grasso et al. |
| 5,893,032 A | 4/1999 | Maeda et al. |
| 5,893,091 A | 4/1999 | Hunt et al. |
| 5,895,471 A | 4/1999 | King et al. |
| 5,897,622 A | 4/1999 | Blinn et al. |
| 5,903,723 A | 5/1999 | Beck et al. |
| 5,903,845 A | 5/1999 | Buhrmann et al. |
| 5,905,495 A | 5/1999 | Tanaka et al. |
| 5,905,777 A | 5/1999 | Foladare et al. |
| 5,905,865 A | 5/1999 | Palmer et al. |
| 5,907,680 A | 5/1999 | Nielsen |
| 5,907,805 A | 5/1999 | Chotai |
| 5,909,491 A | 6/1999 | Luo |
| 5,913,032 A | 6/1999 | Schwartz et al. |
| 5,918,158 A | 6/1999 | LaPorta et al. |
| 5,920,826 A | 7/1999 | Metso et al. |
| 5,924,016 A | 7/1999 | Fuller et al. |
| 5,928,325 A | 7/1999 | Shaughnessy et al. |
| 5,930,250 A | 7/1999 | Klok et al. |
| 5,930,471 A | 7/1999 | Milewski et al. |
| 5,930,701 A * | 7/1999 | Skog .......................... 455/415 |
| 5,933,478 A | 8/1999 | Ozaki et al. |
| 5,936,547 A | 8/1999 | Lund |
| 5,937,161 A | 8/1999 | Mulligan et al. |
| 5,938,725 A | 8/1999 | Hara |
| 5,943,055 A | 8/1999 | Sylvan |
| 5,943,397 A | 8/1999 | Gabin et al. |
| 5,943,478 A | 8/1999 | Aggarwal et al. |
| 5,946,629 A | 8/1999 | Sawyer |
| 5,948,059 A | 9/1999 | Woo et al. |
| 5,951,638 A | 9/1999 | Hoss et al. |
| 5,956,390 A | 9/1999 | McKibben et al. |
| 5,958,006 A | 9/1999 | Eggleston et al. |
| 5,961,590 A | 10/1999 | Mendez et al. |
| 5,961,620 A | 10/1999 | Trent et al. |
| 5,963,618 A | 10/1999 | Porter |
| 5,966,652 A | 10/1999 | Coad et al. |
| 5,974,447 A | 10/1999 | Cannon et al. |
| 5,974,449 A | 10/1999 | Chang et al. |
| 5,974,451 A | 10/1999 | Simmons |
| 5,978,837 A | 11/1999 | Foladare et al. |
| 5,988,857 A | 11/1999 | Ozawa et al. |
| 5,991,615 A | 11/1999 | Coppinger et al. |
| 5,991,799 A | 11/1999 | Yen et al. |
| 5,995,597 A | 11/1999 | Woltz et al. |
| 6,009,173 A | 12/1999 | Summer |
| 6,014,559 A | 1/2000 | Amin |
| 6,018,654 A | 1/2000 | Valentine et al. |
| 6,018,657 A | 1/2000 | Kennedy et al. |
| 6,018,774 A | 1/2000 | Mayle et al. |
| 6,021,114 A | 2/2000 | Shaffer et al. |
| 6,021,190 A | 2/2000 | Fuller et al. |
| 6,021,307 A | 2/2000 | Chan |
| 6,021,394 A | 2/2000 | Takahashi |
| 6,021,433 A | 2/2000 | Payne et al. |
| 6,026,153 A | 2/2000 | Fuller et al. |
| 6,026,292 A | 2/2000 | Coppinger et al. |
| 6,029,065 A | 2/2000 | Shah |
| 6,029,171 A | 2/2000 | Smiga et al. |
| 6,032,039 A * | 2/2000 | Kaplan .......................... 455/413 |
| 6,035,104 A | 3/2000 | Zahariev |
| 6,041,124 A | 3/2000 | Sugita |
| 6,044,247 A | 3/2000 | Taskett et al. |
| 6,047,053 A | 4/2000 | Miner et al. |
| 6,047,327 A | 4/2000 | Tso et al. |
| 6,049,821 A | 4/2000 | Theriault et al. |
| 6,052,442 A | 4/2000 | Cooper et al. |
| 6,052,595 A | 4/2000 | Schellinger et al. |
| 6,058,304 A | 5/2000 | Callaghan et al. |
| 6,060,997 A | 5/2000 | Taubenheim et al. |
| 6,061,570 A | 5/2000 | Janow |
| 6,064,342 A | 5/2000 | Sandhu et al. |
| 6,064,879 A | 5/2000 | Fujiwara et al. |
| 6,067,082 A | 5/2000 | Enmei |
| 6,070,067 A | 5/2000 | Nguyen et al. |
| 6,073,165 A | 6/2000 | Narasimhan et al. |
| 6,081,703 A | 6/2000 | Hallqvist |
| 6,087,956 A | 7/2000 | Helferich |
| 6,088,127 A | 7/2000 | Pieterse |
| 6,088,717 A | 7/2000 | Reed et al. |
| 6,091,957 A | 7/2000 | Larkins et al. |
| 6,094,574 A | 7/2000 | Vance et al. |
| 6,097,941 A | 8/2000 | Helferich |
| 6,101,531 A | 8/2000 | Eggleston et al. |
| 6,115,248 A | 9/2000 | Canova et al. |
| 6,119,167 A | 9/2000 | Boyle et al. |
| 6,122,484 A | 9/2000 | Fuller et al. |
| 6,122,503 A | 9/2000 | Daly |
| 6,125,281 A | 9/2000 | Wells et al. |
| 6,128,490 A | 10/2000 | Shaheen et al. |

(56) References Cited

U.S. PATENT DOCUMENTS

| | | | |
|---|---|---|---|
| 6,134,325 A | 10/2000 | Vanstone et al. |
| 6,134,432 A | 10/2000 | Holmes et al. |
| 6,137,864 A | 10/2000 | Yaker |
| 6,138,158 A | 10/2000 | Boyle et al. |
| 6,141,666 A | 10/2000 | Tobin |
| 6,144,313 A | 11/2000 | Nakano |
| 6,144,671 A | 11/2000 | Perinpanathan et al. |
| 6,145,079 A | 11/2000 | Mitty |
| 6,147,314 A | 11/2000 | Han et al. |
| 6,151,386 A | 11/2000 | Argade |
| 6,151,443 A | 11/2000 | Gable et al. |
| 6,151,491 A | 11/2000 | Farris et al. |
| 6,151,507 A | 11/2000 | Laiho |
| 6,167,253 A | 12/2000 | Farris et al. |
| 6,167,426 A | 12/2000 | Payne et al. |
| 6,169,883 B1 | 1/2001 | Vimpari et al. |
| 6,169,911 B1 | 1/2001 | Wagner et al. |
| 6,175,859 B1 | 1/2001 | Mohler |
| 6,178,331 B1 | 1/2001 | Holmes et al. |
| 6,181,736 B1 | 1/2001 | McLaughlin et al. |
| 6,185,423 B1 | 2/2001 | Brown et al. |
| 6,192,112 B1 | 2/2001 | Rapaport et al. |
| 6,192,407 B1 | 2/2001 | Smith et al. |
| 6,195,564 B1 | 2/2001 | Rydbeck et al. |
| 6,201,974 B1 | 3/2001 | Lietsalmi et al. |
| 6,205,330 B1 | 3/2001 | Winbladh |
| 6,208,839 B1 | 3/2001 | Davani |
| 6,212,550 B1 | 4/2001 | Segur |
| 6,215,858 B1 | 4/2001 | Bartholomew et al. |
| 6,216,165 B1 | 4/2001 | Woltz et al. |
| 6,219,694 B1 | 4/2001 | Lazaridis et al. |
| 6,219,696 B1 | 4/2001 | Wynblatt et al. |
| 6,222,857 B1 | 4/2001 | Kammer et al. |
| 6,223,042 B1 | 4/2001 | Raffel |
| 6,226,495 B1 | 5/2001 | Neustein |
| 6,226,533 B1 | 5/2001 | Akahane |
| 6,230,133 B1 | 5/2001 | Bennett, III et al. |
| 6,230,188 B1 | 5/2001 | Marcus |
| 6,230,202 B1 | 5/2001 | Lewine |
| 6,233,318 B1 | 5/2001 | Picard et al. |
| 6,233,430 B1 | 5/2001 | Helferich |
| 6,236,804 B1 | 5/2001 | Tozaki et al. |
| 6,243,739 B1 | 6/2001 | Schwartz et al. |
| 6,246,871 B1 | 6/2001 | Ala-Laurila |
| 6,252,588 B1 | 6/2001 | Dawson |
| 6,253,061 B1 | 6/2001 | Helferich |
| 6,259,892 B1 | 7/2001 | Helferich |
| 6,272,532 B1 | 8/2001 | Feinleib |
| 6,278,862 B1 | 8/2001 | Henderson |
| 6,282,435 B1 | 8/2001 | Wagner et al. |
| 6,285,745 B1 | 9/2001 | Bartholomew et al. |
| 6,285,777 B2 | 9/2001 | Kanevsky et al. |
| 6,288,715 B1 | 9/2001 | Bain et al. |
| 6,292,668 B1 | 9/2001 | Alanara et al. |
| 6,298,231 B1 | 10/2001 | Heinz |
| 6,301,471 B1 | 10/2001 | Dahm et al. |
| 6,301,513 B1 | 10/2001 | Divon et al. |
| 6,317,085 B1 | 11/2001 | Sandhu et al. |
| 6,317,594 B1 | 11/2001 | Gossman et al. |
| 6,320,957 B1 | 11/2001 | Draganoff |
| 6,321,094 B1 | 11/2001 | Hayashi et al. |
| 6,321,267 B1 | 11/2001 | Donaldson |
| 6,330,079 B1 | 12/2001 | Dugan et al. |
| 6,330,244 B1 | 12/2001 | Swartz et al. |
| 6,330,308 B1 | 12/2001 | Cheston et al. |
| 6,333,919 B2 | 12/2001 | Gaffney |
| 6,333,973 B1 | 12/2001 | Smith et al. |
| 6,336,135 B1 | 1/2002 | Niblett et al. |
| 6,339,591 B1 | 1/2002 | Migimatsu |
| 6,343,219 B1 | 1/2002 | Wada |
| 6,344,848 B1 | 2/2002 | Rowe et al. |
| 6,351,523 B1 | 2/2002 | Detlef |
| 6,356,939 B1 | 3/2002 | Dahl |
| 6,361,523 B1 | 3/2002 | Bierman |
| 6,363,082 B1 | 3/2002 | Kammer et al. |
| RE37,618 E | 4/2002 | Helferich |
| 6,370,389 B1 | 4/2002 | Isomursu et al. |
| 6,373,835 B1 | 4/2002 | Ng |
| 6,381,465 B1 | 4/2002 | Chern et al. |
| 6,381,650 B1 | 4/2002 | Peacock et al. |
| 6,388,877 B1 | 5/2002 | Canova et al. |
| 6,389,457 B2 | 5/2002 | Lazaridis et al. |
| 6,389,572 B1 | 5/2002 | Garrabrant et al. |
| 6,397,059 B1 | 5/2002 | Vance et al. |
| 6,401,113 B2 | 6/2002 | Lazaridis et al. |
| 6,411,827 B1 * | 6/2002 | Minata .......................... 455/566 |
| 6,418,305 B1 | 7/2002 | Neustein |
| 6,418,307 B1 | 7/2002 | Amin |
| 6,421,678 B2 | 7/2002 | Smiga et al. |
| 6,422,147 B1 | 7/2002 | Shann |
| 6,424,841 B1 | 7/2002 | Gustafsson |
| 6,425,087 B1 | 7/2002 | Osborn et al. |
| 6,438,585 B2 | 8/2002 | Mousseau et al. |
| 6,441,824 B2 | 8/2002 | Hertzfeld et al. |
| 6,442,243 B1 | 8/2002 | Valco et al. |
| 6,442,637 B1 | 8/2002 | Hawkins et al. |
| 6,449,344 B1 | 9/2002 | Goldfinger |
| 6,457,134 B1 | 9/2002 | Lemke et al. |
| 6,459,360 B1 | 10/2002 | Helferich |
| 6,462,646 B2 | 10/2002 | Helferich |
| 6,463,463 B1 | 10/2002 | Godfrey et al. |
| 6,463,464 B1 | 10/2002 | Lazaridis et al. |
| 6,484,027 B1 | 11/2002 | Mauney et al. |
| 6,501,834 B1 | 12/2002 | Milewski et al. |
| 6,505,237 B2 | 1/2003 | Beyda et al. |
| 6,510,453 B1 | 1/2003 | Apfel et al. |
| 6,516,202 B1 | 2/2003 | Hawkins et al. |
| 6,522,877 B1 | 2/2003 | Lietsalmi et al. |
| 6,522,879 B2 | 2/2003 | Myer et al. |
| 6,523,124 B1 | 2/2003 | Lunsford et al. |
| 6,526,127 B1 | 2/2003 | Piotrowski et al. |
| 6,539,476 B1 | 3/2003 | Marianetti et al. |
| 6,546,083 B1 | 4/2003 | Chaves et al. |
| 6,564,249 B2 | 5/2003 | Shiigi |
| 6,567,179 B1 | 5/2003 | Sato et al. |
| 6,580,784 B2 | 6/2003 | Rodriguez et al. |
| 6,580,787 B1 | 6/2003 | Akhteruzzaman et al. |
| 6,587,681 B1 | 7/2003 | Sawai |
| 6,587,693 B1 | 7/2003 | Lumme et al. |
| 6,590,588 B2 | 7/2003 | Lincke et al. |
| 6,597,688 B2 | 7/2003 | Narasimhan et al. |
| 6,597,903 B1 | 7/2003 | Dahm et al. |
| 6,611,254 B1 | 8/2003 | Griffin et al. |
| 6,622,147 B1 | 9/2003 | Smiga et al. |
| 6,625,142 B1 | 9/2003 | Joffe et al. |
| 6,625,642 B1 | 9/2003 | Naylor et al. |
| 6,633,630 B1 | 10/2003 | Owens et al. |
| 6,636,522 B1 | 10/2003 | Perinpanathan et al. |
| 6,636,733 B1 | 10/2003 | Helferich |
| 6,658,409 B1 | 12/2003 | Nomura et al. |
| 6,662,195 B1 | 12/2003 | Langseth et al. |
| 6,665,547 B1 | 12/2003 | Ehara |
| 6,665,803 B2 | 12/2003 | Lunsford et al. |
| 6,671,715 B1 | 12/2003 | Langseth et al. |
| 6,687,839 B1 | 2/2004 | Tate et al. |
| 6,694,316 B1 | 2/2004 | Langseth et al. |
| 6,701,378 B1 | 3/2004 | Gilhuly et al. |
| 6,728,530 B1 | 4/2004 | Heinonen et al. |
| 6,741,980 B1 | 5/2004 | Langseth et al. |
| 6,744,528 B2 | 6/2004 | Picoult et al. |
| 6,744,874 B2 | 6/2004 | Wu |
| 6,750,881 B1 | 6/2004 | Appelman |
| 6,751,453 B2 | 6/2004 | Schemers et al. |
| 6,754,181 B1 | 6/2004 | Elliott et al. |
| 6,760,423 B1 | 7/2004 | Todd |
| 6,766,490 B1 | 7/2004 | Garrabrant et al. |
| 6,771,949 B1 | 8/2004 | Corliss |
| 6,775,264 B1 | 8/2004 | Kurganov |
| 6,775,689 B1 | 8/2004 | Raghunandan |
| 6,779,019 B1 | 8/2004 | Mousseau et al. |
| 6,779,022 B1 | 8/2004 | Horstmann et al. |
| 6,788,767 B2 | 9/2004 | Lambke |
| 6,792,112 B1 | 9/2004 | Campbell et al. |
| 6,792,544 B2 | 9/2004 | Hashem et al. |

(56) References Cited

U.S. PATENT DOCUMENTS

| | | |
|---|---|---|
| 6,807,277 B1 | 10/2004 | Doonan et al. |
| 6,813,489 B1 | 11/2004 | Wu et al. |
| 6,816,723 B1 | 11/2004 | Borland |
| 6,823,225 B1 | 11/2004 | Sass |
| 6,826,407 B1 | 11/2004 | Helferich |
| 6,832,130 B2 | 12/2004 | Pintsov et al. |
| 6,868,498 B1 | 3/2005 | Katsikas |
| 6,869,016 B2 | 3/2005 | Waxelbaum |
| 6,871,214 B2 | 3/2005 | Parsons et al. |
| 6,880,079 B2 | 4/2005 | Kefford et al. |
| 6,882,709 B1 | 4/2005 | Sherlock et al. |
| 6,886,096 B2 | 4/2005 | Appenseller et al. |
| 6,892,074 B2 | 5/2005 | Tarkiainen et al. |
| 6,912,285 B2 | 6/2005 | Jevans |
| 6,912,400 B1 | 6/2005 | Olsson et al. |
| 6,920,637 B2 | 7/2005 | Mason et al. |
| RE38,787 E | 8/2005 | Sainton et al. |
| 6,938,065 B2 | 8/2005 | Jain |
| 6,941,349 B2 | 9/2005 | Godfrey et al. |
| 6,944,283 B1 | 9/2005 | Klein |
| 6,950,679 B2 | 9/2005 | Sugiyama et al. |
| 6,952,599 B2 | 10/2005 | Noda et al. |
| 6,980,792 B2 | 12/2005 | Iivonen et al. |
| 6,983,138 B1 | 1/2006 | Helferich |
| 6,990,587 B2 | 1/2006 | Willins et al. |
| 7,003,308 B1 | 2/2006 | Fuoss et al. |
| 7,006,459 B2 | 2/2006 | Kokot et al. |
| 7,007,239 B1 | 2/2006 | Hawkins et al. |
| 7,013,391 B2 | 3/2006 | Herle et al. |
| 7,017,181 B2 | 3/2006 | Spies et al. |
| 7,020,688 B2 | 3/2006 | Sykes, Jr. |
| 7,023,967 B1 | 4/2006 | Andersson et al. |
| 7,031,437 B1 | 4/2006 | Parsons et al. |
| 7,054,905 B1 | 5/2006 | Hanna et al. |
| 7,058,390 B2 | 6/2006 | Chikazawa |
| 7,062,536 B2 | 6/2006 | Fellenstein et al. |
| 7,065,189 B2 | 6/2006 | Wakabayashi |
| 7,068,993 B2 | 6/2006 | Rai et al. |
| 7,072,642 B2 | 7/2006 | Yabe et al. |
| 7,076,528 B2 | 7/2006 | Premutico |
| 7,079,006 B1 | 7/2006 | Abe |
| 7,082,469 B2 | 7/2006 | Gold et al. |
| 7,082,536 B2 | 7/2006 | Filipi-Martin |
| 7,088,990 B1 | 8/2006 | Isomursu et al. |
| 7,092,743 B2 | 8/2006 | Vegh |
| 7,100,048 B1 | 8/2006 | Czjkowski et al. |
| 7,107,246 B2 | 9/2006 | Wang |
| 7,113,601 B2 | 9/2006 | Ananda |
| 7,113,803 B2 | 9/2006 | Dehlin |
| 7,113,979 B1 | 9/2006 | Smith et al. |
| 7,116,762 B2 | 10/2006 | Bennett, III et al. |
| 7,116,997 B2 | 10/2006 | Byers et al. |
| 7,133,687 B1 | 11/2006 | El-Fishawy et al. |
| 7,146,009 B2 | 12/2006 | Andivahis et al. |
| 7,149,537 B1 | 12/2006 | Kupsh et al. |
| 7,149,893 B1 | 12/2006 | Leonard et al. |
| 7,155,241 B2 | 12/2006 | Helferich |
| 7,188,186 B1 | 3/2007 | Meyer et al. |
| 7,218,919 B2 | 5/2007 | Vaananen |
| 7,233,655 B2 | 6/2007 | Gailey et al. |
| 7,239,338 B2 | 7/2007 | Krisbergh et al. |
| 7,251,314 B2 | 7/2007 | Huang |
| 7,254,384 B2 | 8/2007 | Gailey et al. |
| 7,277,692 B1 | 10/2007 | Jones et al. |
| 7,277,716 B2 | 10/2007 | Helferich |
| 7,280,838 B2 | 10/2007 | Helferich |
| 7,286,817 B2 | 10/2007 | Provost et al. |
| 7,289,797 B2 | 10/2007 | Kato |
| 7,299,036 B2 | 11/2007 | Sanding et al. |
| 7,299,046 B1 | 11/2007 | Ozugur et al. |
| 7,317,929 B1 | 1/2008 | El-Fishawy et al. |
| 7,333,817 B2 | 2/2008 | Tsuchiyama |
| 7,353,018 B2 | 4/2008 | Mauney et al. |
| 7,403,793 B2 | 7/2008 | Mauney et al. |
| 7,426,264 B1 | 9/2008 | Henderson |
| 7,433,461 B1 | 10/2008 | Bauer |
| 7,734,305 B2 | 6/2010 | Alanara et al. |
| 7,983,404 B1 | 7/2011 | Croak et al. |
| 8,583,139 B2 | 11/2013 | Jung et al. |
| 2001/0005857 A1 | 6/2001 | Lazaridis et al. |
| 2001/0005860 A1 | 6/2001 | Lazaridis et al. |
| 2001/0005861 A1 | 6/2001 | Mousseau et al. |
| 2001/0013071 A1 | 8/2001 | Lazaridis et al. |
| 2001/0039546 A1 | 11/2001 | Moore et al. |
| 2001/0048737 A1 | 12/2001 | Goldberg et al. |
| 2001/0054115 A1 | 12/2001 | Ferguson et al. |
| 2002/0012323 A1 | 1/2002 | Petite |
| 2002/0023131 A1 | 2/2002 | Wu et al. |
| 2002/0029258 A1 | 3/2002 | Mousseau et al. |
| 2002/0032658 A1 | 3/2002 | Oki et al. |
| 2002/0035687 A1 | 3/2002 | Skantze |
| 2002/0038298 A1 | 3/2002 | Kusakabe et al. |
| 2002/0039419 A1 | 4/2002 | Akimoto et al. |
| 2002/0046084 A1 | 4/2002 | Steele et al. |
| 2002/0049818 A1 | 4/2002 | Gilhuly et al. |
| 2002/0052218 A1 | 5/2002 | Rhee |
| 2002/0065887 A1 | 5/2002 | Paik et al. |
| 2002/0065895 A1 | 5/2002 | Zhang et al. |
| 2002/0087645 A1 | 7/2002 | Ertugrul et al. |
| 2002/0091777 A1 | 7/2002 | Schwartz |
| 2002/0091782 A1 | 7/2002 | Benninghoff |
| 2002/0101998 A1 | 8/2002 | Wong et al. |
| 2002/0107928 A1 | 8/2002 | Chalon |
| 2002/0120696 A1 | 8/2002 | Mousseau et al. |
| 2002/0120788 A1 | 8/2002 | Wang et al. |
| 2002/0128036 A1 | 9/2002 | Yach et al. |
| 2002/0138735 A1 | 9/2002 | Felt et al. |
| 2002/0138759 A1 | 9/2002 | Dutta |
| 2002/0156691 A1 | 10/2002 | Hughes et al. |
| 2002/0178353 A1 | 11/2002 | Graham |
| 2002/0181701 A1 | 12/2002 | Lee |
| 2002/0194281 A1 | 12/2002 | McConnell et al. |
| 2002/0194285 A1 | 12/2002 | Mousseau et al. |
| 2003/0005066 A1 | 1/2003 | Lazaridis et al. |
| 2003/0009698 A1 | 1/2003 | Lindeman et al. |
| 2003/0037261 A1 | 2/2003 | Meffert et al. |
| 2003/0048905 A1 | 3/2003 | Gehring et al. |
| 2003/0050987 A1 | 3/2003 | Lazaridis et al. |
| 2003/0055902 A1 | 3/2003 | Amir et al. |
| 2003/0061511 A1 | 3/2003 | Fischer |
| 2003/0078058 A1 | 4/2003 | Vatanen et al. |
| 2003/0081621 A1 | 5/2003 | Godfrey et al. |
| 2003/0088633 A1 | 5/2003 | Chiu et al. |
| 2003/0097361 A1 | 5/2003 | Huang et al. |
| 2003/0115448 A1 | 6/2003 | Bouchard |
| 2003/0120733 A1 | 6/2003 | Forman |
| 2003/0126216 A1 | 7/2003 | Avila et al. |
| 2003/0126220 A1 | 7/2003 | Wanless |
| 2003/0142364 A1 | 7/2003 | Goldstone |
| 2003/0182575 A1 | 9/2003 | Korfanta |
| 2003/0187938 A1 | 10/2003 | Mousseau et al. |
| 2003/0191808 A1 | 10/2003 | Adler et al. |
| 2003/0194990 A1 | 10/2003 | Helferich |
| 2003/0204568 A1 | 10/2003 | Bhargava et al. |
| 2003/0220979 A1 | 11/2003 | Hejl |
| 2003/0222765 A1 | 12/2003 | Curbow et al. |
| 2003/0235307 A1 | 12/2003 | Miyamoto |
| 2003/0235308 A1 | 12/2003 | Boynton et al. |
| 2003/0237082 A1 | 12/2003 | Thurlow |
| 2004/0019780 A1 | 1/2004 | Waugh et al. |
| 2004/0021889 A1 | 2/2004 | McAfee et al. |
| 2004/0024824 A1 | 2/2004 | Ferguson et al. |
| 2004/0030906 A1 | 2/2004 | Marmigere et al. |
| 2004/0052340 A1 | 3/2004 | Joffe et al. |
| 2004/0059598 A1 | 3/2004 | Wellons et al. |
| 2004/0059914 A1 | 3/2004 | Karaoguz |
| 2004/0060056 A1 | 3/2004 | Wellons et al. |
| 2004/0073619 A1 | 4/2004 | Gilhuly et al. |
| 2004/0078488 A1 | 4/2004 | Patrick |
| 2004/0083271 A1 | 4/2004 | Robert Tosey |
| 2004/0083365 A1 | 4/2004 | Renier et al. |
| 2004/0111478 A1 | 6/2004 | Gross et al. |
| 2004/0111480 A1 | 6/2004 | Yue |
| 2004/0116073 A1 | 6/2004 | Mauney et al. |

(56) References Cited

U.S. PATENT DOCUMENTS

| | | |
|---|---|---|
| 2004/0116119 A1 | 6/2004 | Lewis et al. |
| 2004/0122847 A1 | 6/2004 | Rodgers |
| 2004/0122905 A1 | 6/2004 | Smith et al. |
| 2004/0137884 A1 | 7/2004 | Engstrom et al. |
| 2004/0137955 A1 | 7/2004 | Engstrom et al. |
| 2004/0165727 A1 | 8/2004 | Moreh et al. |
| 2004/0185877 A1 | 9/2004 | Asthana et al. |
| 2004/0194116 A1 | 9/2004 | McKee et al. |
| 2004/0196978 A1 | 10/2004 | Godfrey et al. |
| 2004/0198348 A1 | 10/2004 | Gresham et al. |
| 2004/0199669 A1 | 10/2004 | Riggs et al. |
| 2004/0202327 A1 | 10/2004 | Little et al. |
| 2004/0203642 A1 | 10/2004 | Zatloukal et al. |
| 2004/0205106 A1 | 10/2004 | Adler et al. |
| 2004/0205248 A1 | 10/2004 | Little et al. |
| 2004/0205330 A1 | 10/2004 | Godfrey et al. |
| 2004/0208296 A1 | 10/2004 | Aboujaoude et al. |
| 2004/0212639 A1 | 10/2004 | Smoot et al. |
| 2004/0221014 A1 | 11/2004 | Tomkow |
| 2004/0221048 A1 | 11/2004 | Ogier |
| 2004/0230657 A1 | 11/2004 | Tomkow |
| 2004/0243677 A1 | 12/2004 | Curbow et al. |
| 2004/0243844 A1 | 12/2004 | Adkins |
| 2004/0243847 A1 | 12/2004 | Way |
| 2004/0249768 A1 | 12/2004 | Kontio et al. |
| 2004/0249895 A1 | 12/2004 | Way |
| 2004/0249899 A1 | 12/2004 | Shiigi |
| 2004/0252727 A1 | 12/2004 | Mousseau et al. |
| 2004/0264121 A1 | 12/2004 | Orriss |
| 2004/0266441 A1 | 12/2004 | Sinha et al. |
| 2004/0283844 | 12/2004 | Adkins |
| 2005/0003809 A1 | 1/2005 | Kato |
| 2005/0009502 A1 | 1/2005 | Little et al. |
| 2005/0015455 A1 | 1/2005 | Liu |
| 2005/0019634 A1 | 1/2005 | Legg |
| 2005/0025172 A1 | 2/2005 | Frankel |
| 2005/0025291 A1 | 2/2005 | Peled et al. |
| 2005/0025297 A1 | 2/2005 | Finnigan |
| 2005/0038863 A1 | 2/2005 | Onyon et al. |
| 2005/0044160 A1 | 2/2005 | McElligott |
| 2005/0055413 A1 | 3/2005 | Keohane et al. |
| 2005/0058124 A1 | 3/2005 | Helferich |
| 2005/0058260 A1 | 3/2005 | Lasensky et al. |
| 2005/0060720 A1 | 3/2005 | Mayer |
| 2005/0076109 A1 | 4/2005 | Mathew et al. |
| 2005/0079873 A1 | 4/2005 | Caspi et al. |
| 2005/0091329 A1 | 4/2005 | Friskel |
| 2005/0099654 A1 | 5/2005 | Chen |
| 2005/0099998 A1 | 5/2005 | Semper |
| 2005/0102381 A1 | 5/2005 | Jiang et al. |
| 2005/0108336 A1 | 5/2005 | Naick et al. |
| 2005/0108359 A1 | 5/2005 | Hyder et al. |
| 2005/0114652 A1 | 5/2005 | Swedor et al. |
| 2005/0130631 A1 | 6/2005 | Maguire et al. |
| 2005/0132010 A1 | 6/2005 | Muller |
| 2005/0135681 A1 | 6/2005 | Schirmer |
| 2005/0137009 A1 | 6/2005 | Vetelainen |
| 2005/0138353 A1 | 6/2005 | Spies et al. |
| 2005/0141718 A1 | 6/2005 | Yu et al. |
| 2005/0148356 A1 | 7/2005 | Ferguson et al. |
| 2005/0159107 A1 | 7/2005 | Mauney et al. |
| 2005/0163320 A1 | 7/2005 | Brown et al. |
| 2005/0165740 A1 | 7/2005 | Kerr et al. |
| 2005/0176451 A1 | 8/2005 | Helferich |
| 2005/0180576 A1 | 8/2005 | Jevans |
| 2005/0188024 A1 | 8/2005 | Singer |
| 2005/0188045 A1 | 8/2005 | Katsikas |
| 2005/0198143 A1 | 9/2005 | Moody et al. |
| 2005/0198170 A1 | 9/2005 | LeMay et al. |
| 2005/0198506 A1 | 9/2005 | Qi et al. |
| 2005/0210064 A1 | 9/2005 | Caldini et al. |
| 2005/0210106 A1 | 9/2005 | Cunningham |
| 2005/0210246 A1 | 9/2005 | Faure |
| 2005/0210394 A1 | 9/2005 | Crandall et al. |
| 2005/0216587 A1 | 9/2005 | John |
| 2005/0216735 A1 | 9/2005 | Huang |
| 2005/0229258 A1 | 10/2005 | Pigin |
| 2005/0251558 A1 | 11/2005 | Zaki |
| 2005/0257057 A1 | 11/2005 | Ivanov et al. |
| 2005/0265551 A1 | 12/2005 | Hara |
| 2005/0282525 A1 | 12/2005 | Adams et al. |
| 2006/0013368 A1 | 1/2006 | LaBaw |
| 2006/0019638 A1 | 1/2006 | Chiu et al. |
| 2006/0019639 A1 | 1/2006 | Adams et al. |
| 2006/0020667 A1 | 1/2006 | Wang et al. |
| 2006/0021038 A1 | 1/2006 | Brown et al. |
| 2006/0021066 A1 | 1/2006 | Clayton et al. |
| 2006/0026246 A1 | 2/2006 | Fukuhara et al. |
| 2006/0029191 A1 | 2/2006 | Miller et al. |
| 2006/0041505 A1 | 2/2006 | Enyart |
| 2006/0041625 A1 | 2/2006 | Chen et al. |
| 2006/0046720 A1 | 3/2006 | Toropainen et al. |
| 2006/0046757 A1 | 3/2006 | Hoover et al. |
| 2006/0047766 A1 | 3/2006 | Spadea |
| 2006/0053202 A1 | 3/2006 | Foo et al. |
| 2006/0068768 A1 | 3/2006 | Sanding et al. |
| 2006/0069737 A1 | 3/2006 | Gilhuly et al. |
| 2006/0072761 A1 | 4/2006 | Johnson et al. |
| 2006/0074706 A1 | 4/2006 | Gilham |
| 2006/0075027 A1 | 4/2006 | Zager et al. |
| 2006/0080384 A1 | 4/2006 | Robinson et al. |
| 2006/0090065 A1 | 4/2006 | Bush et al. |
| 2006/0095510 A1 | 5/2006 | Rouse et al. |
| 2006/0101119 A1 | 5/2006 | Qureshi et al. |
| 2006/0133585 A1 | 6/2006 | Daigle et al. |
| 2006/0135128 A1 | 6/2006 | Skoog |
| 2006/0155698 A1 | 7/2006 | Vayssiere |
| 2006/0155812 A1 | 7/2006 | Looman |
| 2006/0168037 A1 | 7/2006 | Audu et al. |
| 2006/0168065 A1 | 7/2006 | Martin |
| 2006/0168072 A1 | 7/2006 | Park |
| 2006/0177015 A1 | 8/2006 | Skakkebaek et al. |
| 2006/0179056 A1 | 8/2006 | Rosenberg |
| 2006/0182124 A1 | 8/2006 | Cole et al. |
| 2006/0187897 A1 | 8/2006 | Dabbs et al. |
| 2006/0190533 A1 | 8/2006 | Shannon et al. |
| 2006/0194572 A1 | 8/2006 | Fresonke et al. |
| 2006/0200528 A1 | 9/2006 | Pathiyal |
| 2006/0217112 A1 | 9/2006 | Mo |
| 2006/0218224 A1 | 9/2006 | Agrawal et al. |
| 2006/0218244 A1 | 9/2006 | Rasmussen et al. |
| 2006/0221916 A1 | 10/2006 | Taylor et al. |
| 2006/0224893 A1 | 10/2006 | Sales et al. |
| 2006/0230266 A1 | 10/2006 | Maes |
| 2006/0233370 A1 | 10/2006 | Jung et al. |
| 2006/0234635 A1 | 10/2006 | Riordan et al. |
| 2006/0234680 A1 | 10/2006 | Doulton |
| 2006/0239424 A1 | 10/2006 | Walter |
| 2006/0240868 A1 | 10/2006 | Kaplan et al. |
| 2006/0247962 A1 | 11/2006 | Harvey et al. |
| 2006/0248148 A1 | 11/2006 | Timmins et al. |
| 2006/0259558 A1 | 11/2006 | Yen |
| 2006/0265660 A1 | 11/2006 | Hullot et al. |
| 2006/0270461 A1 | 11/2006 | Won et al. |
| 2006/0285533 A1 | 12/2006 | Divine et al. |
| 2006/0286990 A1 | 12/2006 | Juan et al. |
| 2007/0006098 A1 | 1/2007 | Krumm et al. |
| 2007/0030143 A1 | 2/2007 | Benson et al. |
| 2007/0042747 A1 | 2/2007 | Sun |
| 2007/0063850 A1 | 3/2007 | Devaul et al. |
| 2007/0082680 A1 | 4/2007 | Fish |
| 2007/0117541 A1 | 5/2007 | Helferich |
| 2007/0162454 A1 | 7/2007 | D'Albora et al. |
| 2007/0194893 A1 | 8/2007 | Deyoe et al. |
| 2007/0239813 A1 | 10/2007 | Pinder et al. |
| 2007/0265838 A1 | 11/2007 | Chopra et al. |
| 2007/0265866 A1 | 11/2007 | Fehling et al. |
| 2008/0037582 A1 | 2/2008 | Wang |
| 2008/0039052 A1 | 2/2008 | Knowles |

(56) References Cited

U.S. PATENT DOCUMENTS

| | | | |
|---|---|---|---|
| 2009/0191848 | A1 | 7/2009 | Helferich |
| 2009/0209235 | A1 | 8/2009 | Lawler et al. |
| 2009/0234927 | A1 | 9/2009 | Buzescu et al. |

FOREIGN PATENT DOCUMENTS

| | | |
|---|---|---|
| EP | 777394 | 6/1997 |
| EP | 831664 | 9/1997 |
| EP | 0 505 489 | 11/1997 |
| EP | 0821536 | 1/1998 |
| EP | 0 624 993 | 12/2003 |
| GB | 2 284 693 | 6/1995 |
| JP | 3/500955 | 2/1991 |
| JP | 03232325 | 10/1991 |
| JP | 6-70292 | 3/1994 |
| JP | 6-261121 | 9/1994 |
| JP | 6-276226 | 9/1994 |
| JP | 06245254 | 9/1994 |
| JP | 6/318899 | 11/1994 |
| JP | 06-326656 A | 11/1994 |
| JP | 7/503826 | 4/1995 |
| JP | 7/245773 | 9/1995 |
| JP | 8-019025 | 1/1996 |
| JP | 8-097852 | 4/1996 |
| JP | 8-97854 | 4/1996 |
| JP | 8-163637 | 6/1996 |
| JP | 0 721 268 | 7/1996 |
| JP | H8-181781 | 7/1996 |
| JP | 8/228368 | 9/1996 |
| JP | 8-237387 | 9/1996 |
| JP | 8-265245 | 10/1996 |
| JP | 08336182 | 12/1996 |
| JP | 9-065430 | 3/1997 |
| JP | 9-146824 | 6/1997 |
| JP | 9-172685 | 6/1997 |
| JP | 9-200250 | 7/1997 |
| JP | 2001/517891 | 10/2001 |
| JP | 2000-513362 | 9/2005 |
| KR | 00164369 | 9/1998 |
| WO | 89/05009 | 6/1989 |
| WO | 92/14330 | 8/1992 |
| WO | WO 94/30021 | 12/1994 |
| WO | WO 95/26113 | 9/1995 |
| WO | WO 96/25826 | 8/1996 |
| WO | WO 96/42041 | 12/1996 |
| WO | 97/08906 | 3/1997 |
| WO | 9731488 | 8/1997 |
| WO | WO 97/29597 | 8/1997 |
| WO | 97/32439 | 9/1997 |
| WO | WO 97/27546 | 9/1997 |
| WO | 9858476 | 12/1998 |
| WO | 9965256 | 12/1999 |

OTHER PUBLICATIONS

Patent Owner Appeal Brief in Inter Partes Reexamination of U.S. Pat. No. 7,499,716, Control No. 95/001,867 (Jan. 7, 2015).
Patent Owner Appeal Brief in Inter Partes Reexamination of U.S. Pat. No. 7,835,757, Control No. 95/001,984 (Feb. 19, 2015).
Patent Owner Rebuttal Brief in Inter Partes Reexamination of U.S. Pat. No. 8,116,741, Control No. 95/001,983 (Feb. 23, 2015).
Respondent's Brief in Inter Partes Reexamination of U.S. Pat. No. 8,224,294, Control No. 95/002,140 (Dec. 19, 2014).
Respondent's Brief in Inter Partes Reexamination of U.S. Pat. No. 7,499,716, Control No. 95/001,867 (Feb. 6, 2015).
Respondent's Brief in Inter Partes Reexamination of U.S. Pat. No. 7,835,757, Control No. 95/001,984 (Mar. 19, 2015).
Order Granting Petition to Continue Reexamination in Inter Partes Reexamination of U.S. Pat. No. 8,134,450, Control No. 95/002,016 (Mar. 3, 2015).
Examiner's Answer in Inter Partes Reexamination of U.S. Pat. No. 8,116,741, Control No. 95/001,983 (Jan. 23, 2015).
Examiner's Answer in Inter Partes Reexamination of U.S. Pat. No. 7,499,716, Control No. 95/001,867 (Feb. 27, 2015).
Examiner's Answer in Inter Partes Reexamination of U.S. Pat. No. 8,224,294, Control No. 95/002,140 (Mar. 13, 2015).
Reply Brief for Appellant, *Helferich v. Lee*, Case No. 2014-1556 (Fed. Cir) (Appeal of IPR No. 2013-00033) (Dec. 15, 2014).
Brief for Defendants—Appellees, *Helferich v. New York Times Company*, Case No. 14-1196-CC (Fed. Cir) (Appeal of Case No. 1:10-cv-04387 (N. D. Ill.)) (Jun. 23, 2014).
Order Denying Plaintiff's Motion for Summary Judgment and Granting Defendant's Motion to Dismiss, *Helferich v. Lee*, Case No. 2:14 cv-0105-SRB (D. Ariz.) (Dec. 30, 2014).
Response to Non-Final Office Action in U.S. Appl. No. 12/973,722 (Mar. 18, 2015).
Office Action in Canadian Application No. 2,659,079 (Oct. 27, 2014).
File History of U.S. Pat. No. 5,974,451 to Simmons.
Anonymous, "Active Channel Server Frequently Asked Questions (FAQ)", Microsoft Corporation, Q181161, 2006, 2 pages.
Anonymous, "Introduction to Active Channel Technology", Microsoft Corporation, 2006, 5 pages.
Anonymous, PatentAtlas, "Patent Cluster Tree Encompassing the Subject in Question: SAMPLE" (date unknown).
Anonymous, usamobility.com, "ReFLEX Wireless Data Technology" (date unknown).
Engst, A.C., "The Real TidBITS Channel", TidBITS Electronic Publishing, 1998, 4 pages.
Engst, A.C., "TidBITS#349/14/Oct/96," TidBITS Electronic Publishing, 1996, 10 pages.
Form 1449, filed in U.S. Pat. No. 5,438,611, Campana, Jr. et al., Issued Aug. 1, 1995, 1 page.
Gillay, C.Z., "Subscriptions, Channels, and Active Desktop", TechNotes, Franklin, Beedle & Associates, Inc., 1999, pp. 1/6.
International Preliminary Examination Report dated Jul. 10, 2001 (7 pages) PCT/US00/08261 Jul. 1, 2001.
Khare, R., et al., "Scenarios for an Internet/Scale Event Notification Service (ISENS)", Internet/Draft, Aug. 13, 1998, 18 pages.
Plus Patent Linguistics Utility Search Results for U.S. Appl. No. 10/445,257, Searched Mar. 16, 2005.
Siewiorek, D.P., et al., "Computer Structures: Principles and Examples", McGraw/Hill Book Company, 1982, 21 pages.
Statutory Invention Registration No. H610; Date: Mar. 7, 1989, Focarile et al.
Winnick Cluts, N., et al., "A Preview of Active Channel and the Active Desktop for Internet Explorer 4.0", Microsoft Corporation, 1997, 13 pages.
Anonymous, "Envoy Wireless Communicator User's Guide," Motorola, Inc. (1994).
Anonymous, "General Magic OS Targets US, Japan," Reed Business Information (1996).
Anonymous, "MessagePad 2000: New Newton Exceeds Expectation," TidBITS #379 (May 12, 1997).
Anonymous, "NETCOM and RadioMail form Strategic Alliance Enabling Netcom Customers to Exchange Email, Send Faxes and Access Web Sites Wireless," Business Wire (Dec. 11, 2006).
Anonymous, "New Features of the Newton 2.0 Operating System," Apple Computer, Inc. (1995).
Anonymous, "New RadioMail Package Brings Maximum Affordability and Simplicity to Wireless Communications," AllBusiness (Feb. 27, 1996).
Anonymous, "Newton Apple MessagePad Handbook," Apple Computer, Inc. (1995).
Anonymous, "Newton Internet Enabler," (1997).
Anonymous, "Newton MessagePad (Original) Specs," EveryMac.com (1996).
Anonymous, "RadioMail Corporation Releases Wireless Internet Access Solution for CDPD Carriers," Business Wire (Oct. 7, 1996).
Anonymous, "Using E/Mail on Your Newton Device," Apple Computer, Inc. (1997).
Denise Shelton, "RadioMail can Find, Retrieve Web Pages," CNET News (Jun. 4, 1996).
Ira Brodsky, "Instant Gratification," Telephone Online (Jan. 15, 1999).
Mark Kellner, "Earthquake and RadioMail," The Washington Times (Jan. 24, 1994).

(56) References Cited

OTHER PUBLICATIONS

Mike Fine, "The AllPoints Wireless PC Card and RadioMail Service," www.palmtoppaer.com (Date Unknown).
Stuart Price, "Product Reviews: Eudora Pro for Newton 1.0," MacUser (Dec. 22, 1996).
Anonymous, "Sony Electronics Introduces Magic Link PIC/2000," BusinessWire (Oct. 30, 1995).
M.M. Tso, et al. "Always on, Always Connected Mobile Computing," 1996 5th IEEE International Conference on Universal Personal Communications Record, vol. 1 of 2, Sessions 1-6, Cambridge Marriott Hotel, Cambridge, Massachusetts, pp. 918-924 (Sep. 29-Oct. 2, 1996) (hereinafter "Always On, Always Connected").
Anonymous, "Newton Solutions Guide," Apple Computer, Inc. (1995).
Anonymous, "Newton Messaging Card Arrives," MacWeek (Sep. 1993).
Anonymous, "Allpen's Nethopper Lets Apple Newton Owners Surf Internet, Intranets," Tribune Business News (Jun. 1996).
Anonymous, § 3.2.9 ETSI GSM 3.40, "Digital Cellular Telecommunications System (Phase 2+) Technical Realisation of the Short Message Service Point/to/Point," v4.13.0, (May 1996).
Anonymous, "Eudora Pro for Newton Users' Guide," Eudora (This reference is unavailable to Applicant and date is unknown).
"New Wyndmail version 1.5 features another first for wireless industry," Busines Wire (Author Unknown) (Aug. 19, 1996).
"WyndMail wireless e/mail now provides "Message Header Preview" for Apple Powerbook and MessagePad," Business Wire (Author Unknown) (Jan. 9, 1997).
"Notice of Grounds of Rejection," Japanese Patent App. No. 2008/302127, dated Jun. 30, 2009.
"Notice of Grounds of Rejection," Japanese Patent App. No. 2009-052858, dated Oct. 6, 2009.
Anonymous, "Second Generation Personal Handy Phone System," pp. 117-119, dated Jun. 25, 1996.
"Notice of Grounds of Rejection," Japanese Patent App. No. 2009-052859, dated Oct. 6, 2009.
Freed, Borenstein, RFC 2045, MIME format standards, Nov. 1996.
Anonymous, Wikipedia, "Personal Communications Service" (Date Unknown).
Anonymous, Wikipedia, "SMS" (Date Unknown).
"Claim Charts Applying U.S. Pat. No. 5,905,777 (Foladare et al.) to Selected Claims of Helferich U.S. Pat. Nos. 7,499,716, 7,280,838, and U.S. Pat. No. 7,155,241" (Apr. 15, 2010).
"Final Rejection," Japanese Patent App. No. 2008-302127, dated Apr. 13, 2010.
"Final Rejection," Japanese Patent App. No. 2009-052858, dated Apr. 22, 2010.
Fuhrt, Design issues for interactive television systems, Computer Magazine, May, 1995.
Henriksen, Mobile Data Network System Description, Norwegian Telecommunications Administration Research Dept, Apr. 1986.
Crispin, Interactive Mail Access Protocol—Version 2, Request for Comments 1176, Network Working Group, Aug. 1990.
Kaspersen, Volume 1 Network architecture addressing and routing, Mobile Data Network Description", Teledirektoratets forskningsavdeling, Mar. 1989.
Kaspersen, Volume 2 Service and service elements, "Mobile Data Network Description", Teledirektoratets forskningsavdeling, Apr. 1989.
Kaspersen, Volume 6 Requirements to the Base Station, "Mobile Data Network Description", Teledirektoratets forskningsavdeling, Jul. 1989.
Kaspersen, Volume 7 Requirements to the Mobile Stations, "Mobile Data Network Description", Teledirektoratets forskningsavdeling, Sep. 1989.
Kramer, Use of two-way wireless messaging for personal telephone management, University of Wisconsin Record, Jun. 1905.
Anonymous, re Nokia 9000i Communicator, Owner's Manual Issue 1.1, Undated.
Anonymous, Changes from Pine 3.96 to 4.00, Computing and Networking, University of Washington, Feb. 2001.
Anonymous, Active Paper's Presto!Mail to be bundled with Envoy 150 Wireless Communicator from Motorola, Business Wire, Apr. 1996.
Crispin, Internet Message Access Protocol Version 4, Request for Comments 2060, Network Working Group, Dec. 1996.
Rodriquez, Motorola provides NetWare access to paging networks, InfoWorld, May 1995.
A.D. Joseph et al., "Rover: A Toolkit for Mobile Information Access," Proceedings of the Fifteenth ACM Symposium on Operating Systems and Principles, Copper Mountain Resort, Colorado, pp. 156-171 (Dec. 3-6, 1995) (hereinafter Rover Toolkit).
Hardy, SkyTel is set to launch two-way-paging—Mtel unit is poised for big gains in wireless business, Wall Street Journal, Sep. 1995.
Anonymous, Motorola unveils next-generation Tango products at PCS '96; Tanto Lite guarantees message delivery and receipt, Business Wire, Sep. 1996.
Kaspersen, Volume 3 Protocols and protocol hierarchy within the MDN, "Mobile Data Network Description", Teledirektoratets forskningsavdeling, May 1989.
Kaspersen, Volume 4 Specification of DTL and DTP within the MDN, "Mobile Data Network Description", Teledirektoratets forskningsavdeling, Jun. 1989.
Kaspersen, Volume 8 Specification of the MDN-MHS inter-working, "Mobile Data Network Description", Teledirektoratets forskningsavdeling, Aug. 1989.
Anonymous, UP Browser Manual, Unwired Planet, Aug. 1996.
Anonymous, UP HDML Language Reference, Jul. 1996.
Anonymous, UP Up.Link Developer's Guide, Jul. 1996.
Verjinkski, Phase, a portable host access system environment, Unisys Defense Systems , Jan. 1900.
Kylanpaa, Nomadic access to information services by a GSM phone, Computer & Graphics, Jun. 1905.
Anonymous, Cost of Ownership Analysis Instructions, Unwired Planet, Jun. 2010.
Anonymous, The Mobile Intranet—wireless internet access with UP Link by Unwired Planet, Jun. 1905.
Butler, Post Office Protocol Version 2, Request for Comments 937, Network Working Group, Feb. 1985.
Taylor, Internetwork Mobility—the CDPD Approach, Jun. 1996.
Anonymous, Narrowband Sockets Specification Intel and Nokia, Sep. 1996.
Thesis of A.F. deLespinasse, "Rover Mosaic: E-mail Communication for a Full-Function Web Browser," Massachusetts Institute of Technology (archived Aug. 10, 1995, in MIT Library) (hereinafter "Rover Mosaic").
"Notice of Grounds of Rejection," Japanese Patent App. No. 2010-001327, dated Aug. 17, 2010 (including English Translation).
Anonymous, Compiled Redacted Correspondence regarding Tso '327 Reference, 2010.
Compiled Plaintiff's Response to Defendant's Initial Invalidity Contentions and Defendant's Initial Invalidity Contentions exchanged in NDIL Case No. 1:10-cv-04387 (Dec. 2010).
Request for Ex Parte Reexamination of U.S. Pat. No. 7,835,757, claims 1-20, Control No. 90/009,882, Andrea G. Reister (Feb. 25, 2011).
Request for Ex Parte Reexamination of U.S. Pat. No. 7,499,716, claims 1-18 and 21-69, Control No. 90/009,880, Andrea G. Reister (Feb. 25, 2011).
Request for Ex Parte Reexamination of U.S. Pat. No. 7,280,838, claims 1-96, Control No. 90/009,883, Andrea G. Reister (Feb. 25, 2011).
"Information Disclosure Statement by Applicant" filed in Reexam of U.S. Pat. No. 7,835,757, Andrea G. Reister (Feb. 25, 2011).
"Information Disclosure Statement by Applicant" filed in Reexam of U.S. Pat. No. 7,499,716, Andrea G. Reister (Feb. 25, 2011).
"Information Disclosure Statement by Applicant" filed in Reexam of U.S. Pat. No. 7,280,838, Andrea G. Reister (Feb. 25, 2011).
Order Granting/Denying Request for Ex Parte Reexamination of U.S. Pat. No. 7,835,757, claims 1-20, Control No. 90/009,882, (Mar. 25, 2011).

(56) References Cited

OTHER PUBLICATIONS

Order Granting/Denying Request for Ex Parte Reexamination of U.S. Pat. No. 7,499,716, claims 1-18 and 21-69, Control No. 90/009,880, (Mar. 25, 2011).
Order Granting/Denying Request for Ex Parte Reexamination of U.S. Pat. No. 7,280,838, claims 1-96, Control No. 90/009,883, (Apr. 26, 2011).
Notice of Failure to Comply With Ex Parte Reexamination Request Requirements (37 CFR 1.510(c)), Control No. 90/009,883 (Mar. 29, 2011).
Decision Vacating Notice of Failure to Comply (Form PTOL-2077), Control No. 90/009,883 (Apr. 6, 2011).
Vaudreuil, Internet Engineering Task Force Request for Comments 1911: "Voice Profile for Internet Mail," pp. 1-22 (Feb. 1996) (Hereinafter "RFC 1911").
Yeong, et al., Internet Engineering Task Force Request for Comments 1487: "X.500 Lightweight Directory Access Protocol," pp. 1-21 (Jul. 1993) (hereinafter "RFC 1487").
Non-Final Rejection in Ex Parte Reexamination of U.S. Pat. No. 7,835,757, Control No. 90/009,882, (Jun. 17, 2011).
Non-Final Rejection in Ex Parte Reexamination of U.S. Pat. No. 7,499,716, Control No. 90/009,880, (Jun. 17, 2011).
Patentee Response and Request for Reconsideration of Non-Final Rejection in Ex Parte Reexamination of U.S. Pat. No. 7,835,757, Control No. 90/009,882 (Jun. 29, 2011).
Patentee Response and Request for Reconsideration of Non-Final Rejection in Ex Parte Reexamination of U.S. Pat. No. 7,499,716, Control No. 90/009,880 (Jun. 29, 2011).
Notice of Allowance in U.S. Appl. No. 12/167,971, (Aug. 4, 2011).
Notice of Allowance in U.S. Appl. No. 12/367,358, (Jul. 21, 2011).
Office Action in Ex Parte Reexamination of U.S. Pat. No. 7,499,716, Control No. 90/009,880, (Aug. 5, 2011).
Office Action in Ex Parte Reexamination of U.S. Pat. No. 7,835,757, Control No. 90/009,882, (Aug. 5, 2011).
Amendment Pursuant to 37 C.F.R. §§ 1.111 and 1.121 filed in U.S. Appl. No. 11/598,832 (Jun. 15, 2011).
Order Denying Request for Inter Partes Reexamination of U.S. Pat. No. 7,280,838 (assigned Control No. 95/001,740) (Oct. 28, 2010).
Request for Ex Parte Reexamination of U.S. Pat. No. 7,835,757, claims 2-20, Control No. 95/001,739, Andrea G. Reister (Sep. 6, 2011).
Request for Ex Parte Reexamination of U.S. Pat. No. 7,499,716, claims 15, 17, 189, and 21-29, Control No. 95/001,738, Andrea G. Reister (Sep. 6, 2011).
Request for Ex Parte Reexamination of U.S. Pat. No. 7,280,838, claims 9-20, Control No. 95/001,740, Andrea G. Reister (Sep. 6, 2011).
"Information Disclosure Statement by Applicant" filed in 95/001,739 (Inter Partes Reexamination of U.S. Pat. No. 7,835,757) by Andrea G. Reister (Sep. 6, 2011).
"Information Disclosure Statement by Applicant" filed in 95/001,738 (Inter Partes Reexamination of U.S. Pat. No. 7,499,716) by Andrea G. Reister (Sep. 6, 2011).
"Information Disclosure Statement by Applicant" filed in 95/001,740 (Inter Partes Reexamination of U.S. Pat. No. 7,280,838) by Andrea G. Reister (Sep. 6, 2011).
Non-Final Office Action in 90/009,883 (Ex Parte Reexamination of U.S. Pat. No. 7,280,838) (Sep. 28, 2011).
Patentee Response After Final Office Action in 90/009,880 (Ex Parte Reexamination of U.S. Pat. No. 7,499,716) (Oct. 5, 2011).
Examiner Summary of Interview in 90/009,880 (Ex Parte Reexamination of U.S. Pat. No. 7,499,716) (Sep. 30, 2011).
Patentee Supplemental Response After Final Office Action in 90/009,880 (Ex Parte Reexamination of U.S. Pat. No. 7,499,716) (Oct. 13, 2011).
Notice of Intent to Issue Reexamination Certificate in 90/009,880 (Ex Parte Reexamination of U.S. Pat. No. 7,499,716) (Oct. 21, 2011).
Patentee Response After Final Office Action in 90/009,882 (Ex Parte Reexamination of U.S. Pat. No. 7,835,575) (Oct. 5, 2011).
Examiner Summary of Interview in 90/009,882 (Ex Parte Reexamination of U.S. Pat. No. 7,835,757) (Sep. 29, 2011).
Advisory Action in 90/009,882 (Ex Parte Reexamination of U.S. Pat. No. 7,835,757) (Oct. 21, 2011).
Patentee Supplemental Response After Final Office Action in 90/009,882 (Ex Parte Reexamination of U.S. Pat. No. 7,835,575) (Nov. 1, 2011).
3GPP TS 23.140 V6, "Multimedia Messaging Service (MMS); Functional Description, Stage 2 (Release 6)" (Mar. 2009).
Reilly, et al., "Enabling Mobile Network Manager," Computer Networks and ISDN Systems 29, 1417-1428 (1997).
T. Berners-Lee, "RFC 1945: Hypertext Transfer Protocol—HTTP/1.0," May 1996.
M. Crispin, "RFC 1730: Internet Message Access Protocol—Version 4," Dec. 1994.
N. Freed, "RFC: 2046: Multipurpose Internet Mail Extensions (MIME) Part Two: Media Types," Nov. 1996.
J. Meyers, "RFC 1939: Post Office Protocol—Version 3," May 1996.
J. Postel, "RFC 793: Transmission Control Protocol," Sep. 1981.
Nokia 9000 Communicator User's Manual, Issue 2 (1995).
Order Denying Request for Inter Partes Reexamination of U.S. Pat. No. 7,499,716 (assigned Control No. 95/001,738) (Nov. 4, 2011).
Order Denying Request for Inter Partes Reexamination of U.S. Pat. No. 7,835,757 (assigned Control No. 95/001,739) (Nov. 4, 2011).
Notice of Intent to Issue Reexamination Certificate ("NIRC") in Ex Parte Reexamination of U.S. Pat. No. 7,835,757 (Control No. 90/009,882), (Dec. 9, 2011).
Examiner's Interview summary in Ex Parte Reexamination of U.S. Pat. No. 7,280,838 (Control No. 90/009,883), (Dec. 13, 2011).
Patentee's Response after Non-Final Office Action in Ex Parte Reexamination of U.S. Pat. No. 7,280,838 (Control No. 90/009,883), (Nov. 28, 2011).
Kaashoek, M. Frans, et al., "Dynamic Documents: Mobile Wireless Access to the WWW", IEEE Computer Society (Chs. 1-3) (1995).
Chau, Jonathan, "Internet Explorer 3.0," Microsoft (Nov. 1, 1996).
"How to Set Up Windows 95's 'Dial-Up Networking' for Auto-Dial with 32-bit Internet Applications," Stanford University Customer Assistance (date unknown).
"Windows NT Internet and Intranet Development. Chapter 3: Microsoft Internet Mail" (date unknown).
Lemay, Laura, "Teach Yourself WEB Publishing with HTML in 14 days" (1996).
Wolfe, David, "Designing and Implementing Microsoft Proxy Server, Chapter 11" (1997).
"MSDN Library-file Protocol," Microsoft (date unknown).
McFedries, Paul, "Windows 95 Unleashed," SAMS Publishing (Ch. 32) (1996).
"GSM Originating Call Flow," EventHelix (2008).
"GSM Terminating Call Flow," EventHelix (2004).
"GSM, SIP, H323, ISUP and IMS Call Flows," EventHelix (date unknown).
"Eudora Mail Pro, Version 3.0 User Manual," QUALCOMM (pp. 30, 32, 50, and 53) (Jun. 1997).
Second Request for Inter Partes Reexamination of U.S. Pat. No. 7,499,716, claims 15-18,21-33,37-43,83-86,89-100, and 103-115 Control No. 95/001,867, Andrea G. Reister (Jan. 6, 2012).
Request for Inter Partes Reexamination of U.S. Pat. No. 7,155,241, claims 1, 2, 7, 10, 13, 14, 38, 39, 40, 41, 42, 47, 50, 53, 54, 71, 72, 77, 80, 84, and 85, Control No. 95/001,864, Andrea G. Reister (Dec. 29, 2011).
*Helferich Patent Licensing LLC v. Suns Leagacy Partners LLC*, Defendant's Answer, Defenses, First Counterclaim, Amended Second Counterclaim, and Jury Demand, Laura E. Muschamp (Feb. 21, 2012).
*Helferich Patent Licensing LLC v. Suns Leagacy Partners LLC*, Helferich's Response to First Counterclaim, Amended Second Counterclaim by Phoenix Newspapers, Inc., Victoria Curtin (Mar. 16, 2012).
B. Pemberton, "Elm Configuration Guide (The Elm Mail System, Version 2.5)," Oct. 1, 1996.
J. Murphy, et. al, "Restaurant Marketing on the Worldwide Web," Cornell Hotel and Restaurant Administration Quarterly, pp. 61-71 (Feb. 1996).

(56) References Cited

OTHER PUBLICATIONS

M. Cox, et. al, "Robotic Telescopes: An Interactive Exhibit on the World-Wide Web," (Date Unknown).
M. Kramer, et. al, "Use of Two-way Wireless Messaging for Personal Telephone Management," Universal Personal Communications, 1993. Personal Communications: Gateway to the 21st Century, Conference Record, pp. 743-748 (Oct. 1993).
Non-Final Office Action in U.S. Appl. No. 12/267,436, (Feb. 17, 2011).
Final Office Action in U.S. Appl. No. 12/267,436, (Oct. 31, 2011).
Applicant's Response to Non-Final Office Action in U.S. Appl. No. 12/267,436, (May 12, 2011).
Applicant's Supplemental Amendment in U.S. Appl. No. 12/267,436, (Jun. 17, 2011).
Applicant's Response to Final Office Action in U.S. Appl. No. 12/267,436, (Feb. 13, 2012).
Applicant's Supplemental Amendment in U.S. Appl. No. 12/267,436, (Mar. 1, 2012).
Notice of Allowance in U.S. Appl. No. 12/267,436, (Mar. 15, 2012).
Anonymous, re Nokia 9000i Communicator, Owner's Manual 9357109 Issue 2 EN, (Jun. 7, 1998).
Anonymous, "Nokia Brings Internet Into the Wireless Age," Nokia (Sep. 19, 1996).
Anonymous, "GeoWorks GEOS V3.0," PDAdb.net (Date Unknown).
Christian Müller-Schloe, "Embedded Microprocessor Systems," IOS Press, (1996) at p. 165.
Anonymous, "Detailed Technical Datasheet of Nokia 9000 Communicator," PDAdb.net (Date Unknown).
Anonymous, "Nokia 9000," Softpedia (Date Unknown).
Anonymous, PDAmaster, PDAdb.net (Date Unknown).
Anonymous, "Quick Guide for Nokia 9000/9000i/9110 Communicator GPS—SMS Application Version 1.0," Nokia Mobile Phones (1999).
Anonymous, "At&T Wireless Service announces At&T PocketNet Service for business," Business Wire (Feb. 10, 1997).
Anonymous, "Handheld Device Markup Language FAQ," W3C (Apr. 11, 1997).
Sheldon, "HDML (Handheld Device Markup Language)," Linktionary.com (Date Unknown).
Allaire, "The first 'Internet Phone' circa 1996," Brightcove.com (Mar. 16, 2009).
Anonymous, "Network World" at p. 10 (Jul. 15, 1996).
Anonymous, "At&T Vu by LG User Guide," LG Electronics (2008).
Sykes, "Motorola's Tango offers wireless E-mail. (pagerlike device) (Brief Article) (Product Announcement)," InfoWorld (Aug. 26, 1996).
Order Granting/Denying Request for Inter Partes Reexamination of U.S. Pat. No. 7,499,716, Control No. 95/001,867, (Feb. 27, 2012).
Patentee Response and Request for Reconsideration of Non-Final Rejection in Inter Partes Reexamination of U.S. Pat. No. 7,499,716, Control No. 95/001,867 (Apr. 27, 2012).
Expert Declaration of John R. Grindon, D. Sc., in Inter Partes Reexamination of U.S. Pat. No. 7,499,716, Control No. 95/001,867 (Apr. 27, 2012).
Order Granting/Denying Request for Inter Partes Reexamination of U.S. Pat. No. 7,155,241, Control No. 95/001,864, (Mar. 12, 2012).
Request for Inter Partes Reexamination of U.S. Pat. No. 8,116,741, Control No. 95/001,983, (May 4, 2012).
Request for Inter Partes Reexamination of U.S. Pat. No. 7,835,757, Control No. 95/001,984, (May 9, 2012).
Request for Inter Partes Reexamination of U.S. Pat. No. 8,107,601, Control No. 95/001,991, (May 16, 2012).
Request for Inter Partes Reexamination of U.S. Pat. No. 7,280,838, Control No. 95/001,996, Paul Stephens (May 18, 2012).
Patentee Response and Request for Reconsideration of Non-Final Rejection in Inter Partes Reexamination of U.S. Pat. No. 7,155,241, Control No. 95/001,864 (May 14, 2012).
Expert Declaration of John R. Grindon, D. Sc. In Inter Partes Reexamination of U.S. Pat. No. 7,155,241, Control No. 95/001,864 (May 14, 2012).
Declaration of Leonard I. Palevsky in Inter Partes Reexamination of U.S. Pat. No. 7,155,241, Control No. 95/001,864 (May 14, 2012).
Request for Inter Partes Reexamination of U.S. Pat. No. 8,134,450, Control No. 95/002,016, (Jun. 14, 2012).
Order Granting/Denying Request for Inter Partes Reexamination of U.S. Pat. No. 8,116,741, Control No. 95/001,983, (Jun. 18, 2012).
Order Granting/Denying Request for Inter Partes Reexamination of U.S. Pat. No. 7,835,757, Control No. 95/001,984, (Aug. 3, 2012).
Order Granting/Denying Request for Inter Partes Reexamination of U.S. Pat. No. 8,107,601, Control No. 95/001,991, (Aug. 3, 2012).
P. Mockapetris, "RFC 883: Domain Names—Implementation and Specification," Nov. 1983.
T. Berners-Lee, "RFC 1738: Uniform Resource Locators (URL)," Dec. 1994.
R. Fielding, "RFC 1808: Relative Uniform Resource Locators," Jun. 1995.
R. Fielding, "RFC 2068: Hypertext Transfer Protocol—HTTP/1.1," Jan. 1997.
T. Berners-Lee, "RFC 2396: Uniform Resource Identifiers (URI): Generic Syntax," Aug. 1998.
Order Granting/Denying Request for Inter Partes Reexamination of U.S. Pat. No. 7,280,838, Control No. 95/002,088 (Nov. 13, 2012).
Order Staying Inter Partes Reexamination of U.S. Pat. No. 7,155,241 (Control No. 95/002,088) in View of Petition for Inter Partes Review of U.S. Pat. No. 7,155,241, Trial No. IPR2013-00033, Administrative Patent Judge Joni Y. Chang, (Nov. 6, 2012).
Non-Final Office Action in U.S. Appl. No. 13/109,389, (Aug. 21, 2012).
Request for Inter Partes Reexamination of U.S. Pat. No. 7,280,838, Control No. 95/002,088, Paul Stephens (Aug. 17, 2012).
Request for Inter Partes Reexamination of U.S. Pat. No. 8,224,294, Control No. 95/002,140, Andrea G. Reister (Filed Sep. 5, 2012).
Order Granting/Denying Request for Inter Partes Reexamination of U.S. Pat. No. 8,134,450, Control No. 95/002,016 (Sep. 10, 2012).
Order Granting/Denying Request for Inter Partes Reexamination of U.S. Pat. No. 8,224,294, Control No. 95/002,140 (Sep. 27, 2012).
Patentee Response and Request for Reconsideration of Non-Final Rejection in Inter Partes Reexamination of U.S. Pat. No. 8,116,741, Control No. 95/001,983 (Sep. 18, 2012).
Expert Declaration of John R. Grindon, D. Sc., in Inter Partes Reexamination of U.S. Pat. No. 8,116,741, Control No. 95/001,983 (Sep. 18, 2012).
Declaration of Leonard I. Palevsky in Inter Partes Reexamination of U.S. Pat. No. 8,116,741, Control No. 95/001,983 (Sep. 18, 2012).
Patentee Response and Request for Reconsideration of Non-Final Rejection in Inter Partes Reexamination of U.S. Pat. No. 7,835,757, Control No. 95/001,984 (Nov. 5, 2012).
Expert Declaration of John R. Grindon, D. Sc., in Inter Partes Reexamination of U.S. Pat. No. 7,835,757, Control No. 95/001,984 (Nov. 5, 2012).
Declaration of Leonard I. Palevsky in Inter Partes Reexamination of U.S. Pat. No. 7,835,757, Control No. 95/001,984 (Nov. 5, 2012).
Declaration of Martin Schwartz in Inter Partes Reexamination of U.S. Pat. No. 7,835,757, Control No. 95/001,984 (Nov. 5, 2012).
Patentee Response and Request for Reconsideration of Non-Final Rejection in Inter Partes Reexamination of U.S. Pat. No. 8,107,601, Control No. 95/001,991 (Nov. 5, 2012).
Expert Declaration of John R. Grindon, D. Sc., in Inter Partes Reexamination of U.S. Pat. No. 8,107,601, Control No. 95/001,991 (Nov. 5, 2012).
Declaration of Leonard I. Palevsky in Inter Partes Reexamination of U.S. Pat. No. 8,107,601, Control No. 95/001,991 (Nov. 5, 2012).
Declaration of Martin Schwartz in Inter Partes Reexamination of U.S. Pat. No. 8,107,601, Control No. 95/001,991 (Nov. 5, 2012).
Requester Comments in Inter Partes Reexamination of U.S. Pat. No. 7,155,241, Control No. 95/001,864, Andrea G. Reister (Filed Sep. 28, 2012).
Requester Comments in Inter Partes Reexamination of U.S. Pat. No. 7,499,716, Control No. 95/001,867, Andrea G. Reister (Filed Oct. 11, 2012).
*Helferich Patent Licensing LLC* v. *CBS Corporation, Bravo Media LLC, and G4 Media LLC*, Defendants' Preliminary Invalidity Contentions, Michael E. Markman (Sep. 28, 2012).

(56) References Cited

OTHER PUBLICATIONS

*Helferich Patent Licensing LLC* v. *The New York Times Company*, Defendant's Updated Initial Invalidity Contentions, Brian M. Buroker (Sep. 28, 2012).
*Helferich Patent Licensing LLC* v. *J.C. Penney Corporation, Inc.*, Defendant's Initial Invalidity Contentions, R. David Donaghue (Sep. 28, 2012).
*Helferich Patent Licensing LLC* v. *Suns, et al.*, Defendant's Initial Invalidity Contentions, Michael E. Markman et al. (Nov. 9, 2012).
*Helferich Patent Licensing LLC* v. *CBS Corporation, Bravo Media LLC, and G4 Media LLC*, Plaintiff's Response to Defendants' Preliminary Invalidity Contentions, Timothy Sperling (Nov. 2, 2012).
*Helferich Patent Licensing LLC* v. *The New York Times Company*, Plaintiff's Response to Defendant's Updated Initial Invalidity Contentions, Timothy Sperling (Oct. 26, 2012).
*Helferich Patent Licensing LLC* v. *J.C. Penney Corporation, Inc.*, Plaintiff's Response to Defendant's Initial Invalidity Contentions, Timothy Sperling (Nov. 2, 2012).
Balancing Push and Pull for Data Broadcast, Acharya, et al., dated 1997.
AirMedia's Mobile Internet Antenna is First Push Solution for Mobile Computing Market, dated 1997.
Air Media—What is it? With an AirMedia Live wireless receiver and AirMedia Live Software, you're linked to the AirMedia Live Internet Broadcast Network, dated 1996.
BackWeb Delivers Personalized Broadcasting Software on Multiple Platforms, dated 1996.
Handheld to Web paging, Kimberly Caisse, E-mail features, dated 1997.
A Way out of the Web Maze, dated 1997.
When worlds collide: the rapid convergence of enterprise dat, e-mail messaging and paging could result in a big bang for VARs who add wireless to their portfolios, Alison Eastwood, dated 1997.
Data Management for Mobile Computing, Imielinski and Badrinath, dated 1993.
Mobile Wireless Computing, Imielinski and Badrinath, dated 1994.
Intelligent Information Inc. pushes, phone beeper technology, dated 1997.
Libertel campaign leads to upsurge in use of SMS services, Alice Macandrew, dated 1997.
News On-Demand for Multimedia Networks, Miller, et al., dated 1993.
America's competitive advantage: Advanced technologies, Richard Paddock, dated 1997.
Market plans IQ tests of smart handsets, Joseph Palenchar, dated 1997.
IP Mobility Support, Charles Perkins, dated 1996.
Mobile Network Computing Protocol (MNCP), D. Piscitello, dated 1997.
Telecom Monitor Notebook, dated 1997.
TIA/EIA Interim Standard TIA/EIA/IS-637, dated 1995.
Tibco ships push interfaces, dated 1997.
E-mail Pager, Frank Vizard, dated 1997.
FreeLoader takes on PointCast, Nick Wingfield, dated 1997.
Recommendation GSM 04.08, dated 1992.
Recommendation GSM 03.03, dated 1993.
Recommendation GSM 04.11 version 3.3.0, dated 1993.
Standard for the Format of ARPA Internet Text Messages, dated 1982.
RFC 1123—Requirements for Internet Hosts—Application and Support, R. Braden, dated 1989.
RFC 1866—Hypertext Markup Language—2.0, T. Berners-Lee, D. Connolly, dated 1995.
GSM Technical Specification—GSM 3.40, dated 1996.
W3C Proposal for a Handheld Device Markup Language (HDML), dated 1997.
GSM Technical Specification—GSM 3.41, dated 1996.
Eudora Email User Manual for Windows Version 4.3, dated 2000.
Eudora Light Windows User Manual Bringing the P.O. To Where you Live, dated 1995.
GSM 1.04, dated 1991.
GSM 03.02, dated 1991.
Report GSM 11.31, dated 1992.
Multimedia Messaging Client Transactions Candidate Version 1.3-17 Jun. 2005.
Multimedia Messaging Client Transactions Version 1.1 Version Oct. 31, 2002.
Multimedia Messaging Service Architecture Overview Version 1.1 Version Nov. 1, 2002.
Version 3.0 for Windows User Manual Eudora Light, dated 1997.
Petition for Inter Partes Review of U.S. Pat. No. 7,155,241, IPR2013-00033 (Oct. 25, 2012).
Non-Final Office Action in U.S. Appl. No. 13/210,223, (Dec. 26, 2012).
Response to Non-Final Office Action in U.S. Appl. No. 13/210,223 (Feb. 11, 2013).
*Helferich Patent Licensing LLC* v. *Suns, et al.*, Plaintiff's Response to Defendant's Initial Invalidity Contentions (Dec. 21, 2012).
Patentee Response and Request for Reconsideration of Non-Final Rejection in Inter Partes Reexamination of U.S. Pat. No. 8,134,450, Control No. 95/002,016 (Dec. 10, 2012).
Expert Declaration of John R. Grindon, D. Sc., in Inter Partes Reexamination of U.S. Pat. No. 8,134,450, Control No. 95/002,016 (Dec. 10, 2012).
Declaration of Leonard I. Palevsky in Inter Partes Reexamination of U.S. Pat. No. 8,134,450, Control No. 95/002,016 (Dec. 10, 2012).
Declaration of Martin Schwartz in Inter Partes Reexamination of U.S. Pat. No. 8,134,450, Control No. 95/002,016 (Dec. 10, 2012).
Patentee Response and Request for Reconsideration of Non-Final Rejection in Inter Partes Reexamination of U.S. Pat. No. 8,224,294, Control No. 95/002,140 (Dec. 27, 2012).
Expert Declaration of John R. Grindon, D. Sc., in Inter Partes Reexamination of U.S. Pat. No. 8,224,294, Control No. 95/002,140 (Dec. 27, 2012).
Declaration of Leonard I. Palevsky in Inter Partes Reexamination of U.S. Pat. No. 8,224,294, Control No. 95/002,140 (Dec. 27, 2012).
Declaration of Martin Schwartz in Inter Partes Reexamination of U.S. Pat. No. 8,224,294, Control No. 95/002,140 (Dec. 27, 2012).
Requester Comments in Inter Partes Reexamination of U.S. Pat. No. 7,835,757, Control No. 95/001,984, Andrea G. Reister (Jan. 4, 2013).
Requester Comments in Inter Partes Reexamination of U.S. Pat. No. 8,107,601, Control No. 95/001,991, Andrea G. Reister (Feb. 13, 2013).
Order in Inter Partes Review of U.S. Pat. No. 7,155,241, Trial No. IPR2013—Expunging Papers in Inter Partes Reexamination of U.S. Pat. No. 7,155,241 (Control No. 95/002,088), Administrative Patent Judge Joni Y. Chang, (Dec. 6, 2012).
Order in Inter Partes Review of U.S. Pat. No. 7,155,241, Trial No. IPR2013-00033, Denying Request to Lift the Stay in Inter Partes Reexamination of U.S. Pat. No. 7,155,241 (Control No. 95/002,088), Administrative Patent Judge Joni Y. Chang, (Dec. 20, 2012).
Preliminary Patent Owner Response to the Petition for Inter Partes Review of U.S. Pat. No. 7,155,241, IPR2013-00033 (Jan. 18, 2013).
Notice of Allowance in U.S. Appl. No. 13/109,389, (Oct. 12, 2012).
Notice of Allowance in U.S. Appl. No. 13/109,437, (Dec. 21, 2012).
Requester Comments in Inter Partes Reexamination of U.S. Pat. No. 8,107,601, Control No. 95/001,991 (Feb. 13, 2013).
Requester Comments in Inter Partes Reexamination of U.S. Pat. No. 8,134,450, Control No. 95/002,016 (Feb. 28, 2013).
Requester Comments in Inter Partes Reexamination of U.S. Pat. No. 8,224,294, Control No. 95/002,140 (Feb. 28, 2013).
Requester Comments in Inter Partes Reexamination of U.S. Pat. No. 8,116,741, Control No. 95/001,983 (Mar. 8, 2013).
Non-Final Action Closing Prosecution in Inter Partes Reexamination of U.S. Pat. No. 7,499,716, Control No. 95/001,867 (Apr. 29, 2013).
Notice of Allowance in U.S. Appl. No. 13/210,223 (Mar. 19, 2013).
Order Instituting Inter Partes Review of U.S. Pat. No. 7,155,241 in IPR2013-00033 (Mar. 25, 2013).
Muller-Schloer, et al., "Embedded Microprocessor Systems," IOS Press (1996).
Engelen, Letter re: Publication Date of Muller-Schloer, et al., "Embedded Microprocessor Systems," IOS Press (1996) (Mar. 4, 2013).

(56) References Cited

OTHER PUBLICATIONS

*Helferich Patent Licensing LLC v. CBS Corporation, Bravo Media LLC, and G4 Media LLC*, Defendants' Invalidity and Unenforceability Contentions, (Apr. 10, 2013).
*Helferich Patent Licensing LLC v. New York Times Company*, Defendant's Invalidity and Unenforceability Contentions, (Apr. 10, 2013).
*Helferich Patent Licensing LLC v. J.C. Penney Corporation, Inc.*, Defendant's Invalidity and Unenforceability Contentions, (Apr. 10, 2013).
Nokia, "Smart Messaging Specification, Revision 1.0.0" (Sep. 15, 1997).
Nokia, "Tagged Text Markup Language" (Sep. 15, 1997).
Simila, et. al, "Providing SMS Based Mobile Office Services in New GSM Communicator," IOS Press (1996).
Borenstein, et al., "RFC 1521: MIME (Multipurpose Internet Mail Extensions) Part One: Mechanisms for Specifying and describing the Format of Internet Message Bodies" (Sep. 1993).
ETSI GSM 03.12, "European Digital Cellular Telecommunications System (Phase 2); Location Registration Procedures," (Sep. 1994).
ETSI GSM 03.38, "Digital Cellular Telecommunications System (Phase 2+); Alphabets and language-specific information," Version 5.3.0 (Jul. 1996).
ETSI GSM 09.02, "Digital Cellular Telecommunications System (Phase 2+); Mobile Application Part (MAP) specification," Version 5.3.0 (Aug. 1996).
ETSI GSM 03.03, "European Digital Cellular Telecommunications System (Phase 2); Numbering, addressing and identification," Second Edition (Mar. 1995).
ETSI GSM 03.41, "Digital Cellular Telecommunications System (Phase 2+); Technical realization of Short Message Service Cell Broadcast (SMSCB)," Version 5.0.0 (Oct. 1995).
Non-Final Action Closing Prosecution in Inter Partes Reexamination of U.S. Pat. No. 8,116,741, Control No. 95/001,983 (May 31, 2013).
"Patentee Response to Action Closing Prosecution (Non-Final) Pursuant to 37 C.F.R. § 1.951(a)," Reexamination Control No. 95/001,867 (Jul. 1, 2013).
"Expert Declaration of John R. Grindon, D.Sc.," Reexamination Control No. 95/001,867 (Jul. 1, 2013).
"Expert Declaration of Bobby R. Hunt, Ph.D.," Reexamination Control No. 95/001,867 (Jul. 1, 2013).
"Declaration of Leonard I. Palevsky, Managing Member of Helferich Patent Licensing, LLC," Reexamination Control No. 95/001,867 (Jul. 31, 2013).
"Patentee Response to Action Closing Prosecution (Non-Final) Pursuant to 37 C.F.R. § 1.951(a)," Reexamination Control No. 95/001,983 (Jul. 31, 2013).
"Expert Declaration of John R. Grindon, D.Sc.," Reexamination Control No. 95/001,983 (Jul. 31, 2013).
"Expert Declaration of Bobby R. Hunt, Ph.D.," Reexamination Control No. 95/001,983 (Jul. 31, 2013).
"Declaration of Timothy D. Sperling, BSE, JD," Reexamination Control No. 95/001,983 (Jul. 31, 2013).
"Declaration of Dwight Duncan, M.S., CFA" Reexamination Control No. 95/001,983 (Jul. 31, 2013).
"Patent Owner's Amended Response under 35 U.S.C. § 316(a)(8) and 37 C.F.R. § 42.220," Inter Partes Review of U.S. Pat. No. 7,155,241 IPR2013-00033 (Jun. 25, 2013).
"Patent Owner's Motion to Amend under 37 C.F.R. § 42.121," Inter Partes Review of U.S. Pat. No. 7,155,241 IPR2013-00033 (Jun. 7, 2013).
Official Transcript of John C. Mitchell Cross-Examination Deposition Transcript in IPR2013-0003 (Jun. 3, 2013).
"Expert Declaration of Bobby R. Hunt, Ph.D.," Inter Partes Review of U.S. Pat. No. 7,155,241 IPR2013-00033 (Jun. 7, 2013).
"Expert Declaration of John R. Grindon, D.Sc.," Inter Partes Review of U.S. Pat. No. 7,155,241 IPR2013-00033 (Jun. 7, 2013).
"Supplemental Expert Declaration of John R. Grindon, D.Sc.," Inter Partes Review of U.S. Pat. No. 7,155,241 IPR2013-00033 (Jun. 25, 2013).

"Petitioner's Reply to Patent Owner's Response," Inter Partes Review of U.S. Pat. No. 7,155,241 IPR2013-00033 (Jul. 29, 2013).
"Petitioner's Opposition to Patent Owner's Motion to Amend," Inter Partes Review of U.S. Pat. No. 7,155,241 IPR2013-00033 (Jul. 29, 2013).
"Second Declaration of John C. Mitchell, Ph.D.," Inter Partes Review of U.S. Pat. No. 7,155,241 IPR2013-00033 (Jul. 29, 2013).
"John Grindon Deposition Transcript, vol. I," Inter Partes Review of U.S. Pat. No. 7,155,241 IPR2013-00033 (Jul. 17, 2013).
"John Grindon Deposition Transcript, vol. II," Inter Partes Review of U.S. Pat. No. 7,155,241 IPR2013-00033 (Jul. 18, 2013).
"Richard Helferich Deposition Transcript, vol. I," Inter Partes Review of U.S. Pat. No. 7,155,241 IPR2013-00033 (Jul. 15, 2013).
"Richard Helferich Deposition Transcript, vol. II," Inter Partes Review of U.S. Pat. No. 7,155,241 IPR2013-00033 (Jul. 16, 2013).
Microsoft Press Computer Dictionary, pp. 236-237, 240, 285, 487 (3d ed. 1997).
RFC 1081: Post Office Protocol—Version 3 (Nov. 1988).
RFC 1738: Uniform Resource Locators (URL), Dec. 1994.
Non-Final Office Action in U.S. Appl. No. 12/973,722, (May 31, 2013).
*Helferich Patent Licensing LLC v. CBS Corporation, Bravo Media LLC, and G4 Media LLC*, Defendants' Invalidity and Unenforceability Contentions, (Jun. 7, 2013).
*Helferich Patent Licensing LLC v. New York Times Company*, Defendant's Invalidity and Unenforceability Contentions, (Jun. 7, 2013).
*Helferich Patent Licensing LLC v. J.C. Penney Corporation, Inc.*, Defendant's Invalidity and Unenforceability Contentions, (Jun. 7, 2013).
*Helferich Patent Licensing LLC v. CBS Corporation, Bravo Media LLC, and G4 Media LLC*, Defendants' Invalidity and Unenforceability Contentions, (Jun. 21, 2013).
*Helferich Patent Licensing LLC v. New York Times Company*, Defendant's Invalidity and Unenforceability Contentions, (Jun. 21, 2013).
*Helferich Patent Licensing LLC v. J.C. Penney Corporation, Inc.*, Defendant's Invalidity and Unenforceability Contentions, (Jun. 21, 2013).
*Helferich Patent Licensing LLC v. CBS Corporation, Bravo Media LLC, and G4 Media LLC*, Plaintiff's Responsive Validity and Enforceability Contentions, (Jul. 19, 2013).
*Helferich Patent Licensing LLC v. New York Times Company*, Plaintiff's Responsive Validity and Enforceability Contentions, (Jul. 19, 2013).
*Helferich Patent Licensing LLC v. J.C. Penney Corporation, Inc.*, Plaintiff's Responsive Validity and Enforceability Contentions, (Jul. 19, 2013).
Action Closing Prosecution (Non-Final) in Inter Partes Reexamination of U.S. Pat. No. 8,107,601, Control No. 95/001,991 (Oct. 28, 2013).
"John C. Mitchell Deposition Transcript," Inter Partes Review of U.S. Pat. No. 7,155,241 IPR2013-00033 (Ex. 2067) (Sep. 20, 2013).
"Patent Owner's Motion for Observation Regarding John Mitchell," Inter Partes Review of U.S. Pat. No. 7,155,241 IPR2013-00033 (Paper 98) (Sep. 27, 2013).
"Petitioners' Response to Patent Owner's Motion for Observation Regarding John Mitchell," Inter Partes Review of U.S. Pat. No. 7,155,241 IPR2013-00033 (Paper 103) (Oct. 7, 2013).
"Expert Declaration of John R. Grindon, D.Sc.," Inter Partes Review of U.S. Pat. No. 7,155,241 IPR2013-00033 (Ex. 2062) (Sep. 6, 2013).
"John Grindon Deposition Transcript," Inter Partes Review of U.S. Pat. No. 7,155,241 IPR2013-00033 (Ex. 2070) (Sep. 23, 2013).
"Petitioners' Motion for Observation Regarding John Grindon," Inter Partes Review of U.S. Pat. No. 7,155,241 IPR2013-00033 (Paper 93) (Sep. 27, 2013).
"Patent Owner's Response to Petitioners' Motion for Observation Regarding John Grindon," Inter Partes Review of U.S. Pat. No. 7,155,241 IPR2013-00033 (Paper 106) (Oct. 7, 2013).
"Patent Owner's Reply to Opposition to Patent Owner's Motion to Amend," Inter Partes Review of U.S. Pat. No. 7,155,241 IPR2013-00033 (Paper 89) (Sep. 6, 2013).
"Webmail Brings Home 'Best of Show' Product Allows E-Mail Access from Any Computer on the World Wide Web," PRNewswire (Oct. 3, 1995).

(56) References Cited

OTHER PUBLICATIONS

Oral Hearing Transcript, Inter Partes Review of U.S. Pat. No. 7,155,241 IPR2013-00033 (Paper 121) (Oct. 23, 2013).
Final Office Action in U.S. Appl. No. 12/973,722, (Nov. 21, 2013).
Action Closing Prosecution (Non-Final) in Inter Partes Reexamination of U.S. Pat. No. 8,134,450, Control No. 95/002,016 (Dec. 3, 2013).
Action Closing Prosecution (Non-Final) in Inter Partes Reexamination of U.S. Pat. No. 8,224,294, Control No. 95/002,140 (Dec. 4, 2013).
Action Closing Prosecution (Non-Final) in Inter Partes Reexamination of U.S. Pat. No. 7,835,757, Control No. 95/001,984 (Dec. 4, 2013).
PO's Response to Action Closing Prosecution (Non-Final) in Inter Partes Reexamination of U.S. Pat. No. 8,134,450, Control No. 95/002,016 (Feb. 3, 2014).
"Declaration of Martin Zoltick" in Inter Partes Reexamination of U.S. Pat. No. 8,134,450, Control No. 95/002,016 (Feb. 3, 2014).
PO's Response to Action Closing Prosecution (Non-Final) in Inter Partes Reexamination of U.S. Pat. No. 8,224,294, Control No. 95/002,140 (Feb. 4, 2014).
"Declaration of Martin Zoltick" in Inter Partes Reexamination of U.S. Pat. No. 8,224,294, Control No. 95/002,140 (Feb. 4, 2014).
PO's Response to Action Closing Prosecution (Non-Final) in Inter Partes Reexamination of U.S. Pat. No. 7,835,757, Control No. 95/001,984 (Feb. 4, 2014).
"Declaration of Martin Zoltick" in Inter Partes Reexamination of U.S. Pat. No. 7,835,757, Control No. 95/001,984 (Feb. 4, 2014).
Requester Comments after Action Closing Prosecution (Non-Final) in Inter Partes Reexamination of U.S. Pat. No. 8,116,741, Control No. 95/001,983 (Feb. 7, 2014).
File History of Inter Partes Reexamination Control No. 95/002,140 (for U.S. Pat. No. 8,224,294).
File History of Inter Partes Reexamination Control No. 95/002,088 (for U.S. Pat. No. 7,280,838).
File History of Inter Partes Reexamination Control No. 95/002,016 (for U.S. Pat. No. 8,134,450).
File History of Inter Partes Reexamination Control No. 95/001,996 (for U.S. Pat. No. 7,280,838).
File History of Inter Partes Reexamination Control No. 95/001,991 (for U.S. Pat. No. 8,107,601).
File History of Inter Partes Reexamination Control No. 95/001,984 (for U.S. Pat. No. 7,835,757).
File History of Inter Partes Reexamination Control No. 95/001,983 (for U.S. Pat. No. 8,116,741).
File History of Inter Partes Reexamination Control No. 95/001,867 (for U.S. Pat. No. 7,499,716).
File History of Inter Partes Reexamination Control No. 95/001,864 (for U.S. Pat. No. 7,155,241).
File History of Inter Partes Reexamination Control No. 95/001,740 (for U.S. Pat. No. 7,280,838).
File History of Inter Partes Reexamination Control No. 95/001,739 (for U.S. Pat. No. 7,835,757).
File History of Inter Partes Reexamination Control No. 95/001,738 (for U.S. Pat. No. 7,499,716).
File History of Ex Parte Reexamination Control No. 90/009,882 (for U.S. Pat. No. 7,835,757).
File History of Ex Parte Reexamination Control No. 90/009,883 (for U.S. Pat. No. 7,280,838).
File History of Ex Parte Reexamination Control No. 90/009,880 (for U.S. Pat. No. 7,499,716).
Petition Under 37 C.F.R. § 1.181(a)(3) for Supervisory Review of Decision on Requesters' 37 C.F.R. § 1.181(a)(1) Petition to Vacate the ACP and Reverse Entry of Patent Owner's Supplemental Responses, Control No. 95/001,991 (Apr. 10, 2014).
Response to Final Office action and Request for Continued Examination in U.S. Appl. No. 12/873,722 (Apr. 21, 2014).
Non-Final Office Action in U.S. Appl. No. 13/895,226, (Apr. 11, 2014).

Patent Owner Rebuttal Brief in Inter Partes Reexamination of U.S. Pat. No. 7,499,716, Control No. 95/001,867 (Mar. 27, 2015).
Patent Owner Rebuttal Brief in Inter Partes Reexamination of U.S. Pat. No. 8,224,294, Control No. 95/002,140 (Apr. 13, 2015).
Requester Comments After ACP in Inter Partes Reexamination of U.S. Pat. No. 8,134,450, Control No. 95/002,016 (Mar. 27, 2015).
Notification of Defective Requester Comments in Inter Partes Reexamination of U.S. Pat. No. 8,107,601, Control No. 95/001,991 (Apr. 10, 2015).
Order Lifting Stay in Inter Partes Reexamination of U.S. Pat. No. 7,155,241, Control No. 95/001,864 (Apr. 13, 2015).
Order Affirming Decision Under Fed. Cir. Rule 36, *Helferich* v. *Lee*, Case No. 2014-1556 (Fed. Cir) (Appeal of IPR No. 2013-00033) (Apr. 8, 2015).
Notice of Continued Prosecution in Related Continuation Application in U.S. Appl. No. 13/895,226 (Apr. 9, 2015).
Identification of postal items—Part C: 13 character identifier for special letter products, Universal Postal Union (2015).
Petition under 37 C.F.R. §1.183 to Stay Proceeding Pursuant to 5 U.S.C.§ 705 Pending Parallel Action under the APA, U.S. Pat. No. 8,107,601, Control No. 95/001,991 (May 20, 2014).
Opposition to Patent Owner's Petition under 37 C.F.R. §1.183 to Stay Proceeding Pursuant to 5 U.S.C.§ 705 Pending Parallel Action under the APA, U.S. Pat. No. 8,107,601, Control No. 95/001,991 (Jun. 3, 2014).
"Declaration of John R. Grindon D.Sc.," in Inter Partes Reexamination of U.S. Pat. No. 8,107,601, Control No. 95/001,991 (Jun. 2, 2014).
"Declaration of Martin Zoltick" in Inter Partes Reexamination of U.S. Pat. No. 8,107,601, Control No. 95/001,991 (Feb. 3, 2014).
"Declaration of Martin A. Schwartz" in Inter Partes Reexamination of U.S. Pat. No. 8,107,601, Control No. 95/001,991 (Jul. 8, 2013).
"Declaration of Richard J. Helferich" and Supporting Exhibits 1-33 in Inter Partes Reexamination of U.S. Pat. No. 8,107,601, Control No. 95/001,991 (May 29, 2014).
Request for Reconsideration after Non-Final Office Action Pursuant to 37 C.F.R. § 1.111 & 1.945, U.S. Pat. No. 8,107,601, Control No. 95/001,991 (Jun. 2, 2014).
Decision on Patent Owner Petition under 37 C.F.R. §1.183(a)(3) for Relief from Aug. 30, 2012 Decision, U.S. Pat. No. 8,107,601, Control No. 95/001,991 (Apr. 30, 2014).
Miscellaneous Action in U.S. Pat. No. 8,107,601, Control No. 95/001,991 (Apr. 29, 2014).
Decision on Patent Owner Petition under 37 C.F.R. §1.182 and 1.183 to Continue Reexamination and Consider Patent Owner's Amendment After RAN, in Inter Partes Reexamination of U.S. Pat. No. 7,499,716, Control No. 95/001,867 (Jun. 24, 2014).
Petition under 37 C.F.R. §1.182 and 1.183 to Continue Reexamination and Consider Patent Owner's Amendment After RAN (including exhibits 1-3), in Inter Partes Reexamination of U.S. Pat. No. 7,499,716, Control No. 95/001,867 (May 14, 2014).
Right of Appeal Notice 37 C.F.R. 1.953 in Inter Partes Reexamination of U.S. Pat. No. 8,116,741, Control No. 95/001,983 (May 21, 2014).
Petition under 37 C.F.R. §1.182 to Continue Reexamination in Inter Partes Reexamination of U.S. Pat. No. 8,116,741, Control No. 95/001,983 (Jun. 20, 2014).
Requester Comments in Inter Partes Reexamination of U.S. Pat. No. 8,134,450 Control No. 95/002,016 (May 30, 2014).
Requester Comments in Inter Partes Reexamination of U.S. Pat. No. 7,835,757, Control No. 95/001,984 (May 30, 2014).
Requester Comments in Inter Partes Reexamination of U.S. Pat. No. 8,224,294 Control No. 95/002,140 (May 30, 2014).
Right of Appeal Notice in Inter Partes Reexamination of U.S. Pat. No. 8,224,294, Control No. 95/002,140 (Aug. 25, 2014).
Patent Owner Notice of Appeal in Inter Partes Reexamination of U.S. Pat. No. 8,224,294, Control No. 95/002,140 (Sep. 24, 2014).
Requester Comments after NFOA in Inter Partes Reexamination of U.S. Pat. No. 8,107,601, Control No. 95/001,991 (Jul. 11, 2014).
"Declaration of John C. Mitchell, PH.D," in Inter Partes Reexamination of U.S. Pat. No. 8,107,601, Control No. 95/001,991 (Jul. 10, 2014).

(56) References Cited

OTHER PUBLICATIONS

Patent Owner Petition to Strike Requester Comments after NFOA in Inter Partes Reexamination of U.S. Pat. No. 8,107,601, Control No. 95/001,991 (Aug. 22, 2014).
Patent Owner Supplemental Response in Inter Partes Reexamination of U.S. Pat. No. 8,107,601, Control No. 95/001,991 (Aug. 22, 2014).
Requester Supplemental Response in Inter Partes Reexamination of U.S. Pat. No. 8,107,601, Control No. 95/001,991 (Sep. 16, 2014).
Scan of CD Case titled "Sixth International World Wide Web Conference Proceedings" (date unknown).
Notice of Defective Notice of Appeal in Inter Partes Reexamination of U.S. Pat. No. 8,116,741, Control No. 95/001,983 (Jul. 21, 2014).
Order Dismissing Petition to Continue Reexam in Inter Partes Reexamination of U.S. Pat. No. 8,116,741, Control No. 95/001,983 (Aug. 19, 2014).
Patent Owner Appeal Brief in Inter Partes Reexamination of U.S. Pat. No. 8,116,741, Control No. 95/001,983 (Oct. 9, 2014).
Patent Owner Petition Continue Reexam Inter Partes Reexamination of U.S. Pat. No. 8,116,741, Control No. 95/001,983 (Jun. 20, 2014).
Requesters Notice of Appeal Inter Partes Reexamination of U.S. Pat. No. 8,116,741, Control No. 95/001,983 (Jun. 23, 2014).
Requester Comments Under 37 C.F.R. § 1.951 in Inter Partes Reexamination of U.S. Pat. No. 7,499,716, Control No. 95/001,867 (Jul. 22, 2014).
Notice of Defective Notice of Appeal in Inter Partes Reexamination of U.S. Pat. No. 7,499,716, Control No. 95/001,867 (Jun. 20, 2014).
Right of Appeal Notice in Inter Partes Reexamination of U.S. Pat. No. 7,499,716, Control No. 95/001,867 (Oct. 9, 2014).
Right of Appeal Notice in Inter Partes Reexamination of U.S. Pat. No. 8,134,450, Control No. 95/002,016 (Oct. 31, 2014).
Requester Response Brief in Inter Partes Reexamination of U.S. Pat. No. 8,116,741, Control No. 95/001,983 (Nov. 7, 2014).
Patent Owner Notice of Appeal in Inter Partes Reexamination of U.S. Pat. No. 7,499,716, Control No. 95/001,867 (Nov. 7, 2014).
Patent Owner Appeal Brief in Inter Partes Reexamination of U.S. Pat. No. 8,224,294, Control No. 95/002,140 (Nov. 24, 2014).
Patent Owner Notice of Appeal in Inter Partes Reexamination of U.S. Pat. No. 8,134,450, Control No. 95/002,016 (Dec. 1, 2014).
Patent Owner Petition to Continue Reexam in Inter Partes Reexamination of U.S. Pat. No. 8,134,450, Control No. 95/002,016 (Dec. 1, 2014).
Right of Appeal Notice in Inter Partes Reexamination of U.S. Pat. No. 7,835,757, Control No. 95/001,984 (Nov. 20, 2014).
Brief for Appellant, *Helferich v. Lee*, Case No. 2014-1556 (Fed. Cir) (Appeal of IPR No. 2013-00033) (Sep. 16, 2014).
Plaintiff's Motion for Summary Judgment, *Helferich v. Lee*, Case No. 2:14 cv-0105-SRB (D. Ariz.) (Jul. 29, 2014).
Defendant's Motion to Dismiss, *Helferich v. Lee*, Case No. 2:14 cv-0105-SRB (D. Ariz.) (Aug. 15, 2014).
Plaintiffs Response in Opposition to Defendant's Motion to Dismiss, *Helferich v. Lee*, Case No. 2:14 cv-0105-SRB (D. Ariz.) (Sep. 2, 2014).
Defendant's Response in Opposition to Plaintiff's Motion for Summary Judgment, *Helferich v. Lee*, Case No. 2:14 cv-0105-SRB (D. Ariz.) (Sep. 5, 2014).
Plaintiff's Reply in Support of Plaintiff's Motion for Summary Judgment, *Helferich v. Lee*, Case No. 2:14 cv-0105-SRB (D. Ariz.) (Sep. 23, 2014).
Defendant's Reply in Support of Defendant's Motion to Dismiss, *Helferich v. Lee*, Case No. 2:14 cv-0105-SRB (D. Ariz.) (Sep. 22, 2014).
Brief for Plaintiff-Appellant Helferich Patent Licensing, *Helferich v. New York Times Company*, Case No. 14-1196-CC (Fed. Cir) (Appeal of Case No. 1:10-cv-04387 (N.D. Ill.)) (Apr. 7, 2014).
Brief for Defendants-Appellees, *Helferich v. New York Times Company*, Case No. 14-1196-CC (Fed. Cir) (Appeal of Case No. 1:10-cv-04387 (N.D. Ill.)) (Jun. 23, 2014).
Reply Brief for Plaintiff-Appellant *Helferich Patent Licensing, LLC, Helferich v. New York Times Company*, Case No. 14-1196-CC (Fed. Cir) (Appeal of Case No. 1:10-cv-04387 (N.D. Ill.)) (Jul. 24, 2014).
Brief for Appellee, *Helferich v. Lee*, Case No. 2014-1556 (Fed. Cir) (Appeal of IPR No. 2013-00033) (Nov. 17, 2014).
Brief for Intervenor, *Helferich v. Lee*, Case No. 2014-1556 (Fed. Cir) (Appeal of IPR No. 2013-00033) (Nov. 17, 2014).
Response to Final Office Action in U.S. Appl. No. 12/973,722 (Oct. 15, 2014).
Response to Non-Final Office Action in U.S. Appl. No. 13/895,226 (Oct. 9, 2014).
Non-Final Office Action in U.S. Appl. No. 12/973,722 (Nov. 10, 2014).
Notice of Non-Compliant Amendment in U.S. Appl. No. 13/895,226 (Nov. 10, 2014).
Summons to Attend Oral Proceedings in EP Application No. 10181938.1 to Helferich (Mar. 11, 2014).
Hearing Transcript, *Helferich v. Lee*, Case No. 2:14 cv-0105-SRB (D. Ariz.) (Nov. 10, 2014).

\* cited by examiner

| SYSTEM ID | TRANSCEIVER(S) ID | MESSAGE ID | MESSAGE TYPE | MESSAGE LENGTH | MESSAGE PRIORITY | ADDITIONAL INFORMATION |

WIRELESS MESSAGING AND CONTENT PROVISION SYSTEMS AND METHODS

This application is a division of U.S. patent application Ser. No. 13/895,226, filed May 15, 2013 (pending), which is a division of U.S. patent application Ser. No. 12/973,722, filed Dec. 20, 2010 (pending), which is a division of U.S. application Ser. No. 11/598,202, filed Nov. 13, 2006 (now U.S. Pat. No. 8,107,601), which is a continuation of U.S. application Ser. No. 10/445,257, filed May 27, 2003 (status: Abandoned), which is a continuation of U.S. application Ser. No. 09/540,490, filed Mar. 31, 2000 (now U.S. Pat. No. 6,636,733), and which is a continuation-in-part of U.S. application Ser. No. 09/408,841, filed Sep. 30, 1999 (now U.S. Pat. No. 6,826,407), which claims the benefit of U.S. Provisional Application No. 60/155,055, filed Sep. 21, 1999 and U.S. Provisional Application No. 60/126,939, filed Mar. 29, 1999; U.S. patent application Ser. No. 09/540,490 is also a continuation-in-part of U.S. application Ser. No. 08/934,143, filed Sep. 19, 1997 (now U.S. Pat. No. 6,233,430), U.S. application Ser. No. 08/933,344, filed Sep. 19, 1997 (now U.S. Pat. No. 6,253,061), U.S. application Ser. No. 08/934,132, filed Sep. 19, 1997 (now U.S. Pat. No. 6,087,956), U.S. application Ser. No. 08/934,337, filed Sep. 19, 1997 (now U.S. Pat. No. 6,259,892), and U.S. application Ser. No. 08/989,874, filed Dec. 12, 1997 (now U.S. Pat. No. 6,097,941). All of the above mentioned applications (provisional and non-provisional) are incorporated in their entirety herein by this reference.

Reference is made to the following patented patent applications: (1) Ser. No. 13/763,970 (now U.S. Pat. No. 8,560,006); (2) Ser. No. 13/210,223 (now U.S. Pat. No. 8,498,387); (3) Ser. No. 09/513,998 (now U.S. Pat. No. 6,983,138); (4) Ser. No. 09/688,282 (now U.S. Pat. No. 7,039,428); (5) Ser. No. 09/860,954 (now U.S. Pat. No. 6,462,646); (6) Ser. No. 10/236,932 (now U.S. Pat. No. 6,696,921); (7) Ser. No. 09/688,321 (now U.S. Pat. No. 7,003,304); (8) Ser. No. 09/613,345 (now U.S. Pat. No. 6,459,360); (9) Ser. No. 11/049,869 (now U.S. Pat. No. 7,277,716); (10) Ser. No. 11/050,775 (now U.S. Pat. No. 7,155,241); (11) Ser. No. 11/082,913 (now U.S. Pat. No. 7,280,838); (12) Ser. No. 11/081,611 (now U.S. Pat. No. 7,376,432); (13) Ser. No. 11/082,872 (now U.S. Pat. No. 7,242,951); (14) Ser. No. 11/083,897 (now U.S. Pat. No. 7,403,787); (15) Ser. No. 11/635,781 (now U.S. Pat. No. 7,843,314); (16) Ser. No. 12/367,358 (now U.S. Pat. No. 8,134,450); (17) Ser. No. 12/580,189 (now U.S. Pat. No. 8,224,294); (18) Ser. No. 12/764,025 (now U.S. Pat. No. 7,835,757); (19) Ser. No. 13/109,389 (now U.S. Pat. No. 8,355,702); (20) Ser. No. 11/108,759 (now U.S. Pat. No. 7,146,157); (21) Ser. No. 11/399,513 (now U.S. Pat. No. 7,499,716); (22) Ser. No. 11/105,441 (now U.S. Pat. No. 7,627,305); (23) Ser. No. 12/625,357 (now U.S. Pat. No. 7,957,695); (24) Ser. No. 10/958,731 (now U.S. Pat. No. 8,099,046); (25) Ser. No. 12/167,971 (now U.S. Pat. No. 8,116,741); (26) Ser. No. 11/598,832 (now U.S. Pat. No. 8,116,743); (27) Ser. No. 12/267,436 (now U.S. Pat. No. 8,295,450); and (28) Ser. No. 13/109,437 (now U.S. Pat. No. 8,374,585).

FIELD OF THE INVENTION

The present invention relates generally to paging transceivers, systems and methods for selectively acting on messages, paging and, more particularly, to paging systems and transceivers and methods for selectively paging in response to or retrieving messages received, erasing information stored at a plurality of sources including the paging transceivers or at remote locations. The present invention also relates generally to the field of communication systems, and more particularly to systems for allowing users to access and manage voice and other messages. The present invention also relates to wireless messaging devices such as two-way pagers, wireless telephones and personal digital assistants (PDA's) and, electronic media systems such as, electronic mail systems, electronic commerce systems and storage and retrieval systems. More specifically, the present invention relates to two-way wireless email devices and associated systems.

BACKGROUND OF THE INVENTION

In general, a paging receiver can be classified into one of four categories: an alert or tone only paging receiver, a numeric paging receiver, an alphanumeric paging receiver, or a voice paging receiver. One common characteristic of all of these paging receivers is that they monitor the air waves and notify the user when their particular address has been detected. For the alert or tone only paging receiver, the paging receiver would generate a tone or beep when its address is detected. The other paging receivers, upon detecting their address, would additionally store a message associated with the address signal and display or play it to the user. The message for a numeric paging receiver would be a set of numbers, typically the calling person's telephone number, and the message for an alphanumeric paging receiver would be a set of numbers and/or letters. The user of an alphanumeric paging receiver could therefore receive a message in the form of a telephone number with some descriptive text. For the voice paging receiver, the message that is stored is a voice message that the user can later play to hear the message.

A paging receiver is typically a rather small electronic device and, accordingly, has a limited amount of memory for storing messages that have been received from a base station in a paging system. Because of the relatively small size of the memory, the paging receiver can store only a limited number of messages. A user can delete messages from memory but will oftentimes desire to save a message, such as temporarily until the user makes a note of the message or until he or she is able to respond to the page. The messages that are saved in memory, however, reduce the space in memory that is available to receive new messages. This demand on space in memory is increasing as the size of the messages continue to grow and as users receive a greater number of messages. Although more memory can be added to accommodate more messages, the added cost and space needed for extra memory runs counter to the desires to keep the paging receiver small and inexpensive. A need therefore exists for a paging receiver which can display and/or play messages while efficiently using memory.

In addition to the demand on paging receiver memory, paging systems will be challenged as greater numbers of pages are being transmitted and as the size of the transmitted messages increases. Initially, when paging systems were only concerned with transmitting address signals of the paging receivers, the size of each transmission by the paging systems was relatively small. Paging receivers and paging systems, however, have undergone tremendous advances with paging systems now transmitting messages which can be hundreds of kilobytes or greater in size in addition to the address signals. Additionally, many paging receivers are actually paging transceivers which transmit acknowledgment signals back through the paging system. The capacity of the paging systems are therefore being challenged not only by messages of increasing sizes but also by reply signals transmitted from the paging transceivers to the paging system. The future of paging systems is therefore tied to the ability of the paging systems to control the number and size of the data transmissions and to provide additional features without sacrificing the quality of service to the user.

As discussed above, many paging transceivers are able to issue a reply or acknowledgment back to the base station in response to a received message. If the base station does not receive this reply or acknowledgment, then the base station assumes that the message has not been received and will repeatedly transmit the message until the reply or acknowledgment is received. Due to the high power levels at which the base station transmits its paging signals, the signals are usually easily received by all paging transceivers located within the coverage area of the base station antenna. The paging transceivers, on the other hand, must operate at lower power levels and often cannot transmit signals at sufficiently high levels to reach the base station. For example, when a paging transceiver is located in a basement of a building, in a subway, or in an airplane, the paging transceiver may be unable to issue a reply that can reach the base station. As a result, the base station may continue to transmit a page to a paging transceiver and the paging transceiver will continue to receive the message but the base station cannot detect the reply being issued by the paging transceiver. This unnecessary transmission of duplicate messages and the ineffectual reply signals transmitted by the paging transceivers consume valuable resources of the paging system and of the paging transceiver.

For safety reasons, a user may at times have to turn off his or her paging transceiver. For instance, when the user is on an airplane, the transmissions from the paging transceiver can interfere with the instrumentation or communication within the cockpit of the plane. The paging transceiver therefore should not be operating within the plane or around other electronic equipment that are sensitive to interference from the signals transmitted by the paging transceiver. As another example, if the user is in an environment that contains electronic detonators for explosive materials, the signals transmitted by the paging transceiver could possibly trigger an explosion. The user therefore must turn his or her paging transceiver off to ensure that it does not transmit any reply or acknowledgment signals in response to a received page. Although it may be dangerous for the pager transceivers to issue a reply signal in these situations, the signals transmitted by the base station may at times be safely received by the paging transceiver. Since the paging transceiver automatically issues a reply in response to a received message, the paging transceiver must nonetheless be turned off so as to not pose a risk to the user. During these times that the paging transceiver must be turned off, the user unfortunately is unable to receive any page or message. A need therefore exists for a paging transceiver that can notify a user of a message without automatically generating a reply message or acknowledgment to the base station.

Recent ubiquity of mobile communications systems and devices increases demand for remote access to and ability to manage voice messages and similar messages, records or files. Conventional remote voice message access generally occurs through mobile telephony devices or through pagers. Such conventional approaches typically require users to master a sophisticated list of commands, rules, procedures and protocols in order to access and manage voice mail even on one platform. For instance, simply to forward a message may require the user to know that the forward command is "73," which should not be confused with the reply all command "74." This command then presents the user with a voice menu which requires time to hear and requires multiple additional keystrokes and commands in order to forward the message. Issues become more tedious and acute in mobile telephony, where users on cell phones who may be driving or in cramped quarters find themselves simply unable to refer to a list of voice mail menu options, and may not have the time required to work through the menu in order to forward the message. Where users maintain an account or mail box on more than one system or provider, they must master multiple sets of such commands, rules, procedures and protocols and the inconvenience and problems intensify. Pagers often do not impose the same level of interface complexity, but for that very reason they typically fail to provide the user an acceptable range of options for accessing and managing voice messages.

Conventional mobile approaches to voice mail access and management present other issues. In conventional mobile telephony systems, users may communicate via analog (for example, cellular) or digital (for example, PCS) link with the platform on which voice messages are stored in order to access messages. Such users typically employ standard dual tone multi frequency (DTMF) key interfaces for communicating with, controlling and managing messages on the voice messaging platforms. Such voice mail access and management sessions require excessive bandwidth, however, because the user must be "on line" (in communication via radio link, or otherwise connected or coupled) with the platform and thus occupying radio spectrum. Such sessions can create additional expense to the user and impose extra load upon the telecommunications infrastructure. Such sessions also impose unnecessary demands on the user unit's power system, upon which radio transmission activities impose a considerable load.

U.S. Reissue Pat. No. 34,976 and its antecedent U.S. Pat. No. 5,003,576 to Helferich et al. (Reissued Jun. 20, 1995 and originally issued Mar. 26, 1991) (which disclosures are incorporated herein by this reference) disclose systems in which voice messages and other messages typically created in analog form may be downloaded to cellular telephones and/or other user units for access and management at least partially to address some of these issues. Although such systems disclosed in those documents contemplate transmission of an analog signal, it would also be desirable to download messages via digital radio link such as those conventionally employed in PCS.

Another paradigm for considering optimal access and management of voice messages is in the context of paging systems. Paging receivers are typically more efficient than cellular or PCS devices in energy consumption and use of spectrum among other reasons because they are in an active mode or transmit mode for shorter periods of time. User available information, however, is limited to vibration, tone, tone and voice or data messages. Conventional paging systems which include voice retrieval typically use analog voice channels for transmission and reception of voice messages. Accordingly, voice paging systems have been proposed which include user devices that can, via radio link, download, digitize and store voice messages for access and management in the user unit. In this regard, see U.S. Pat. No. 5,455,579 to Bennett, et al. issued Oct. 3, 1995 (which disclosure is incorporated herein by this reference). Such systems allow users to access and download voice messages to pagers or pager like devices in batch mode, but do not allow the user to access and manage the voice messages on the platform where they are initially stored (or other remote platforms) in the event that the user wishes to do so.

SUMMARY OF THE INVENTION

The present invention solves the problems described above with methods and systems for selective paging. A paging system notifies a paging transceiver that a message has been received but does not initially transmit the associated message. The user, upon being notified of the message, can then download the entire message at a time convenient to the user, which allows the user to download messages at less-expensive off-peak hours and allows the user to place the paging transceiver at a location where it can easily receive the message and reply to the message. Since the messages are not initially transmitted to the paging transceiver, the paging transceiver can receive and store a greater number of pages with minimal increase in the size of memory. Further, because entire messages are not automatically transmitted and since the user can position the paging transceiver to issue a sufficiently strong reply, traffic in the paging system can be controlled and actually reduced.

The system may transmit some identifying information about the page to the user without sending the entire message. For instance, the base station may identify the type of message, such as email, voice, or text, and also indicate the caller or other descriptive material about the message. The user can then determine the priority of the message and whether he or she wants to retrieve the message, play the message, erase the message, store the message, forward, reply, or otherwise act on the message. The user is also given control over the messages stored remotely from the paging transceiver and can erase or store these messages from the paging transceiver. The paging transceiver may have a timer for allowing the user to program the paging transceiver to perform a desired function on a message at a particular time.

The information initially sent to the user may also indicate the location of the stored message. For instance, the system paging a particular paging transceiver to notify it that a page has been received need not be the system actually storing the content of the message. Instead, a plurality of systems may store the contents of messages with one or more of the systems paging the paging transceiver. The paging transceiver would be provided sufficient information on the system storing the message so that it can communicate with this system. The system paging the paging transceiver can therefore act as a clearinghouse for other messaging systems by notifying a user of all messages received regardless of their source or type.

The paging transceivers according to the invention may erase information stored in memory at the paging transceivers or at a remote system. The paging transceiver preferably queries the users as to whether the information should be erased at the paging transceiver or both at the paging transceiver and at the system. If the information is erased only at the paging transceiver, the identifier for the information stored in the memory is not erased. As a result, if the user subsequently desires to retrieve an erased message, the paging transceiver is still able to send the identifier information to the system in order to retrieve the message from the system. Preferably, the paging transceiver does not write over the message in memory whereby if a user subsequently desires the message the message may be recovered without requiring a call to the system. By erasing the information at the system, the user is able to conserve memory space at the system. The paging transceiver therefore provides a user with remote control over remotely stored information.

According to the present invention, user devices include an interface which allows the user to access and manage voice messages and other information which is stored on the devices as well as on remote devices to which the user devices may be coupled via radio frequency link. Processes according to the present invention employ user input to such interfaces for access and management of messages stored on the user devices and, when such a device is on line with a remote platform at which the user's messages are stored, to provide automatic access and management to messages stored there as well. In the event that the user device is not in communication with the remote platform, processes according to the present invention automatically establish a communications session in order to provide such automatic access and message management.

Accordingly, it is an object of the present invention to provide systems and methods for paging that conserve memory in paging transceivers.

It is another object of the present invention to provide systems and methods for paging that conserve valuable air time.

It is a further object of the present invention to provide systems and methods for paging that provide users with remote control over their messages.

It is yet another object of the present invention to provide systems and methods for paging that allow users to select when and how action should be taken on their messages.

It is yet a further object of the present invention to provide messaging systems and methods for notifying users of received messages.

It is also an object of the present invention to provide messaging systems and methods for providing control to users over message stored at remote locations.

It is still another object of the present invention to provide messaging systems and methods that notify users of messages received from multiple sources.

It is an additional object of the present invention to provide a single user interface which allows a user to access and manage voice messages and other information stored in the user's device as well as at, in or on remote devices, platforms or locations.

It is an additional object of the present invention to allow a user to access and manage messages stored on his or her own user device as well as on remote devices using a single interface and an analog or digital radio frequency link.

It is an additional object of the present invention to conserve radio spectrum by enabling efficient access and management of voice messages and other information in a number of locations, on a number of platforms, using a single interface.

It is an additional object of the present invention to allow users to access and manage voice messages and other information from any number of other sources stored in any number of locations without requiring the users to be conversant in different access and management interfaces, procedures, rules and protocols for each platform on which messages or information happen to be stored.

It is an additional object of the present invention to provide user devices which access and manage voice messages in their own memory capacity, but which also access and manage messages at remote sites via radio frequency link with power efficiencies and with spectrum efficiencies more akin to paging networks than the less efficient (from a power point of view and currently from a spectrum point of view) cellular and PCS voice message systems.

It is an additional object of the present invention to provide voice messaging interfaces which feature intuitive and direct commands, such as pushing a designated "forward" button in order to forward a message, and which thus eliminate the need for users to memorize or refer to a list of commands in order to access and manage voice messages.

Another object of the invention is to provide a messaging system for selectively performing an action on information, for remote retrieval of messages, for performing action on information at different times, for selective paging, for providing a user interface for message access and having integrated audio visual messaging. Another object of the invention is to provide a method and system for wireless retrieval of an email attachment such as an audio or video file.

Another object of the invention is to provide a system for allowing a wireless device to retrieve a portion of or an entire email from one or a plurality of email systems.

It is yet another object of the invention to provide direct access to one specific or a plurality of specific email messages without having to retrieve or access other email messages.

Another object of the invention is to provide a messaging system that delivers messages or message notifications to a specific device, based on a variable such as: the "presence" of the user (i.e., whether the user has turned on his/her device), the location of the device, the device being accessed, the importance level of the message, the type of message, the time or date, the weather, a user action, or a user request.

It is still another object of the invention to provide automatic identification of a wireless mobile phone user or wireless email device and a mobile phone user's reply email message destination by utilizing a phone number or code.

It is yet another object of the invention to provide an improved method for memory management in a messaging device.

Other objects, features, and advantages of the present invention will become apparent with respect to the remainder of this document.

BRIEF DESCRIPTION OF THE DRAWINGS

The accompanying drawings, which are incorporated in and form a part of the specification, illustrate preferred embodiments of the present invention and, together with the description, serve to explain the principles of the invention, and to enable a person skilled in the pertinent art to make and use the invention. In the drawings:

FIG. 11 is a diagram of a data transmission for the system in FIG. 10.

DETAILED DESCRIPTION OF THE INVENTION

Figure 1:
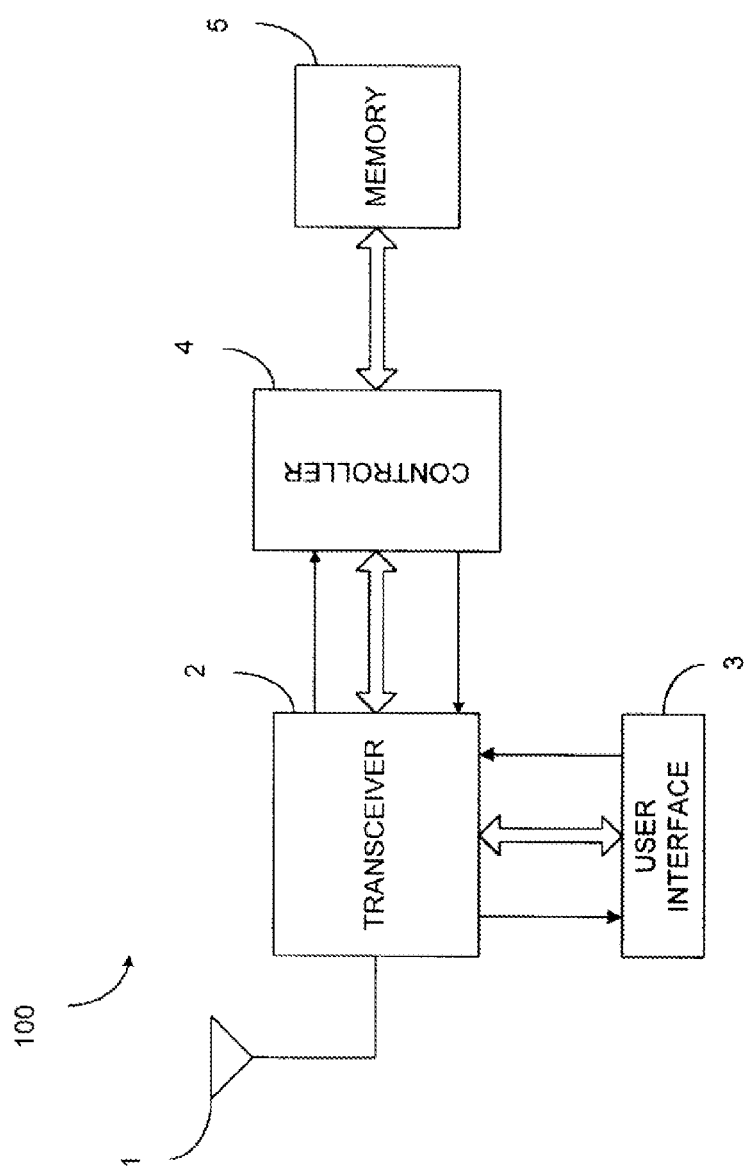
FIG. 1 is a block diagram of a paging transceiver according to a preferred embodiment of the invention, and a simplified block diagram of a user device according to a preferred embodiment of the present invention.

Reference will now be made in detail to preferred embodiments of the invention, non-limiting examples of which are illustrated in the accompanying drawings. With reference to FIG. 1, a paging transceiver 100 according to a preferred embodiment of the invention comprises an antenna 1, a transceiver 2, a user interface 3, a controller 4, and a memory 5. The single antenna 1 is preferably used for both receiving and transmitting signals, although the paging transceiver 100 may comprise a separate antenna for transmitting signals and a separate antenna for receiving signals.

The transceiver 2 is connected to the antenna 1 and is for transmitting signals from the paging transceiver 100 and for receiving signals directed to the paging transceiver 100. The signals that may be transmitted to, or received from, the paging transceiver 100 include, but are not limited to, such signals as selective call signals, command data signals, signals corresponding to a message, and information data signals. The transceiver 2 may comprise a transceiver found in two way pagers or mobile radios and preferably comprises a transceiver commonly used in a portable mobile radiotelephone.

The transceiver 2 is connected to the user interface 3, which contains all necessary input and output devices. The user interface 3 includes a microphone, speaker, alert transducer, LED or LCD display, keypad, and necessary switches. The user interface 3 may also contain other types of input/output devices depending on the messaging application, such as a video display, camera, scanner, a printer, or a voice recognition device. The user interface 3 is not limited to these examples of user input/output devices but may comprise any input or output device which allows or assists communication between the user and the paging transceiver 100.

The transceiver 2 is connected to, and communicates with, the controller 4, which preferably comprises a digital signal processor (DSP) 4. The memory 5 is connected to the DSP 4 and is for storing messages or other types of information. The memory 5 may comprise static RAM, Dynamic RAM, Flash RAM, or any type of memory suitable for storing messages and allowing the retrieval of the messages. The amount of the memory 5 is preferably at least 4 MB for voice or text applications, although it may consist of a greater or lesser amount depending upon the specific message type application.

FIG. 1 shows a basic functional block diagram of a paging transceiver 100 according to a preferred embodiment of the present invention. A transmit/receive antenna 1 is connected to transceiver 2 for transmitting and receiving signals such as selective call signals, command data signals and information data signals via conventional radio frequency link. Transceiver 2 may be of any conventional design such as those utilized in two way pagers, mobile radios or portable cellular telephones and similar devices, products or equipment. Transceiver 2 is coupled to a user interface 3 which contains appropriate input and output devices including, for example, a microphone speaker, alert transducer, LED or LCD display, keypad and necessary switches. The user interface 3 may also contain other types of input/output devices depending on the messaging application such as video display, camera, scanner, printer or voice recognition devices, and others. The user interface 3 of the present invention may be of any sort which allows the user to communicate with the transceiver 2. The transceiver 2 is coupled to and communicates with the digital signal processor (DSP) 4. DSP's are conventional in portable cellular transceivers for signal processing purposes. A message memory 5 is coupled to DSP 4 for storing messages. Message memory 5 may be static RAM, Dynamic RAM, Flash RAM, or any type of memory suitable for the messages to be stored and addressed in a manner that allows them to be accessed and managed.

Figure 2:
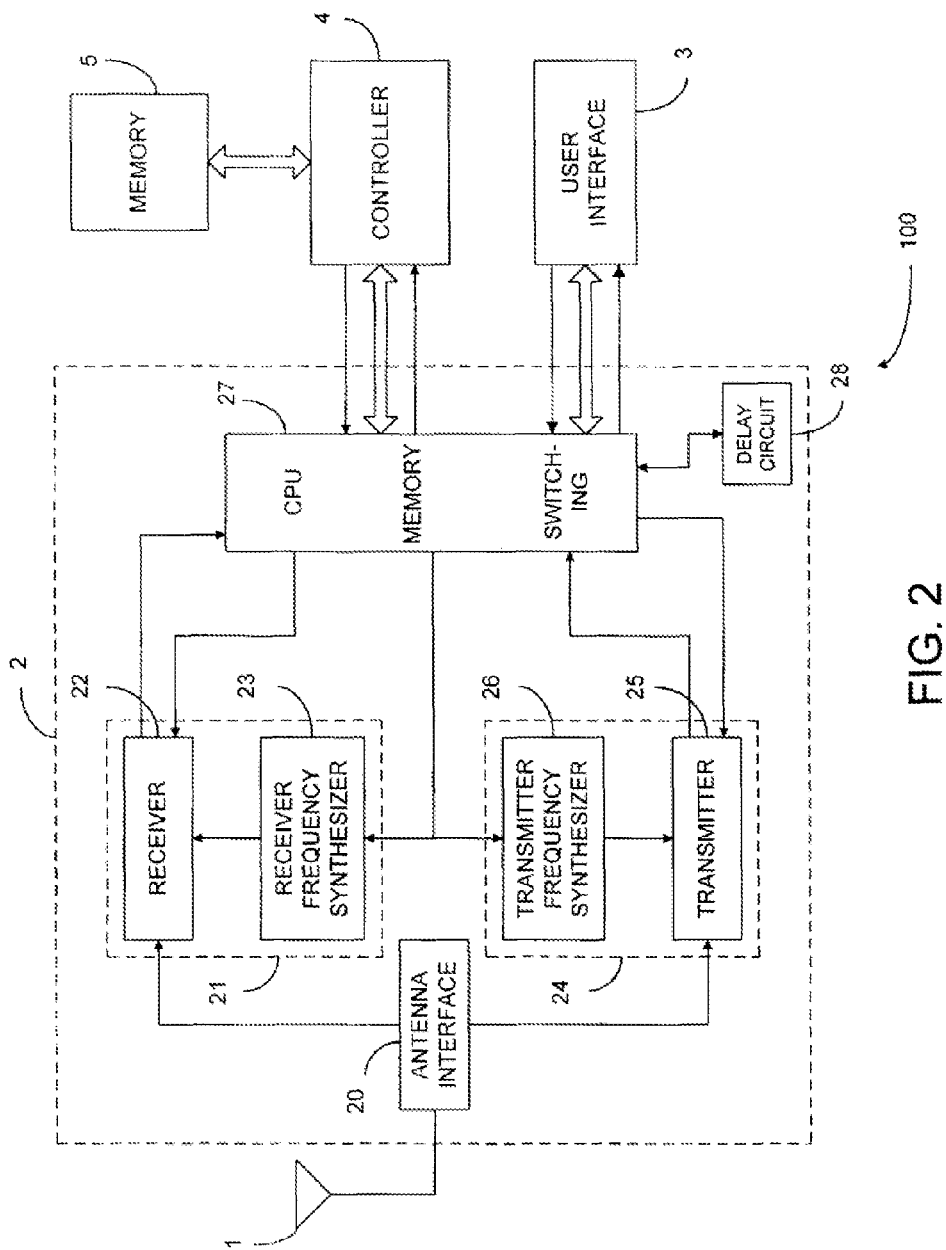
FIG. 2 is a more detailed block diagram of the transceiver in the paging transceiver of FIG. 1, and a more detailed block diagram of a user device according to a preferred embodiment of the present invention.

FIG. 2 shows transceiver 2 in greater detail. An antenna interface 20, for example a conventional cellular duplexer, antenna transmit/receive switch or other device or component or system may be utilized to provide signal isolation and otherwise couple the antenna to the transceiver. Optionally two antennas may be utilized in order to eliminate the antenna interface 20. Antenna interface 20 couples received signals to receiver 22 of receive section 21. Receive frequency synthesizer 23 couples to receiver 22 for selecting the receive frequency. Transmit section 24 comprises a transmitter 25 coupled to antenna interface 20 for transmitting signals using antenna 1. A transmit frequency synthesizer 26 is connected to transmitter 25 for selecting the transmit frequency. A processor chip set or CPU 27 comprises all necessary RAM and ROM memory, signal and data switching circuitry, signal processing circuitry, I-O Ports including all necessary program instructions and stored options commonly utilized in portable cellular telephones. Cellular telephone program instructions and necessary chip set circuitry are conventional and may be obtained from a variety of suppliers.

CPU 27, DSP 4 and other components of devices and systems according to the present invention, if desired, individually and/or collectively contain program instructions and algorithms necessary to process, store and reproduce and otherwise access and manage messages such as voice messages or other messages in connection with the present invention. These instructions and algorithms may, for instance, be stored within a particular DSP for application specific purposes, such as video processing and storage, speech processing and storage, modem signal processing and numerous other types of signal processing applications. Optionally, DSP 4 may be an alternative hardware device such as coded or digital to analog/analog to digital conversion circuit or other type of modulator-demodulator including memory interface circuitry coupled to message memory 5 for reading and writing and other accessing and management of messages.

The transceiver 2, as shown in more detail in FIG. 2, includes an antenna interface 20 connected to the antenna 1. The antenna interface 20 directs signals received from antenna 1 to a receiver section 21 of the paging transceiver 100 and directs signals transmitted from a transmit section 24 to the antenna 1. The antenna interface 20 is preferably a duplexer, however an antenna switch or other device may be utilized to provide signal isolation between the receiver and transmitter sections 21 and 24. Alternatively, if paging transceiver 100 includes two antennas 1 with one for transmitting signals and the other for receiving signals, the transceiver 2 would not require any type of antenna interface 20.

The receive section 21 includes a receiver 22 and a receiver frequency synthesizer 23. The receiver 22 is connected to the antenna 1 through antenna interface 20 and receives the signals directed to the paging transceiver 100. The receiver frequency synthesizer 23, based on an input from a processor 27, selects the frequency at which the receiver 22 receives signals. The received signals are passed from the receiver 22 to the processor 27.

The transmit section 24 includes a transmitter 25 for receiving signals from the processor 27. The transmit section 24 also includes a transmitter frequency synthesizer 26 connected to the transmitter 25 which, based upon an input from the processor 27, selects the transmit frequency for the transmitter 25. The signals output by the transmitter 25 are supplied to the antenna interface 20 and then to the antenna 1.

The processor 27 comprises a central processing unit (CPU) having internal memory and switching capabilities. The CPU 27, for instance, comprises all necessary RAM and ROM memory, signal and data switching circuitry, signal processing circuitry, I-O Ports, and all standard program instructions and stored options commonly utilized in portable cellular telephones. The standard cellular telephone program instructions and CPU 27 may be obtained from a variety of suppliers. For instance, the instructions may be obtained from Wireless Link Inc. of Sunnyvale, Calif. and the CPU 27 from GEC Plessey Semiconductor, Inc. of Scotts Valley, Calif.

The DSP 4 includes necessary I-O and program memory and are commonly utilized in cellular telephones. Any suitable DSP may be used in the paging transceiver 100. Alternatively, the controller 4 may comprise another type of electronic device, such as a codec or digital-to-analog/analog-to-digital conversion circuit or other type of modulator-demodulator including memory interface circuitry coupled to message memory 5 for reading and writing of messages.

The transceiver 2 also preferably includes a delay circuit 28. The delay circuit 28 may comprise a timer which informs the processor 27 of when a period of time has expired. The timer, for instance, may expire at a certain time of day, week, or month, or may expire a fixed period of time after a triggering event, such as one hour after the event. The time at which the timer 28 expires is preferably programmable through the user interface 3 and through processor 27. Additionally, the timer 28 preferably comprises a plurality of timers for notifying the processor 27 of when a plurality of different time periods have expired. Rather than a timer, the delay circuit 28 may alternatively operate to delay the occurrence of an event until a certain condition is satisfied. This condition, for instance, may be the strength of received signals or the receipt of a specified signal. The purpose of the timer 28 will become apparent from the description below.

Figure 3:
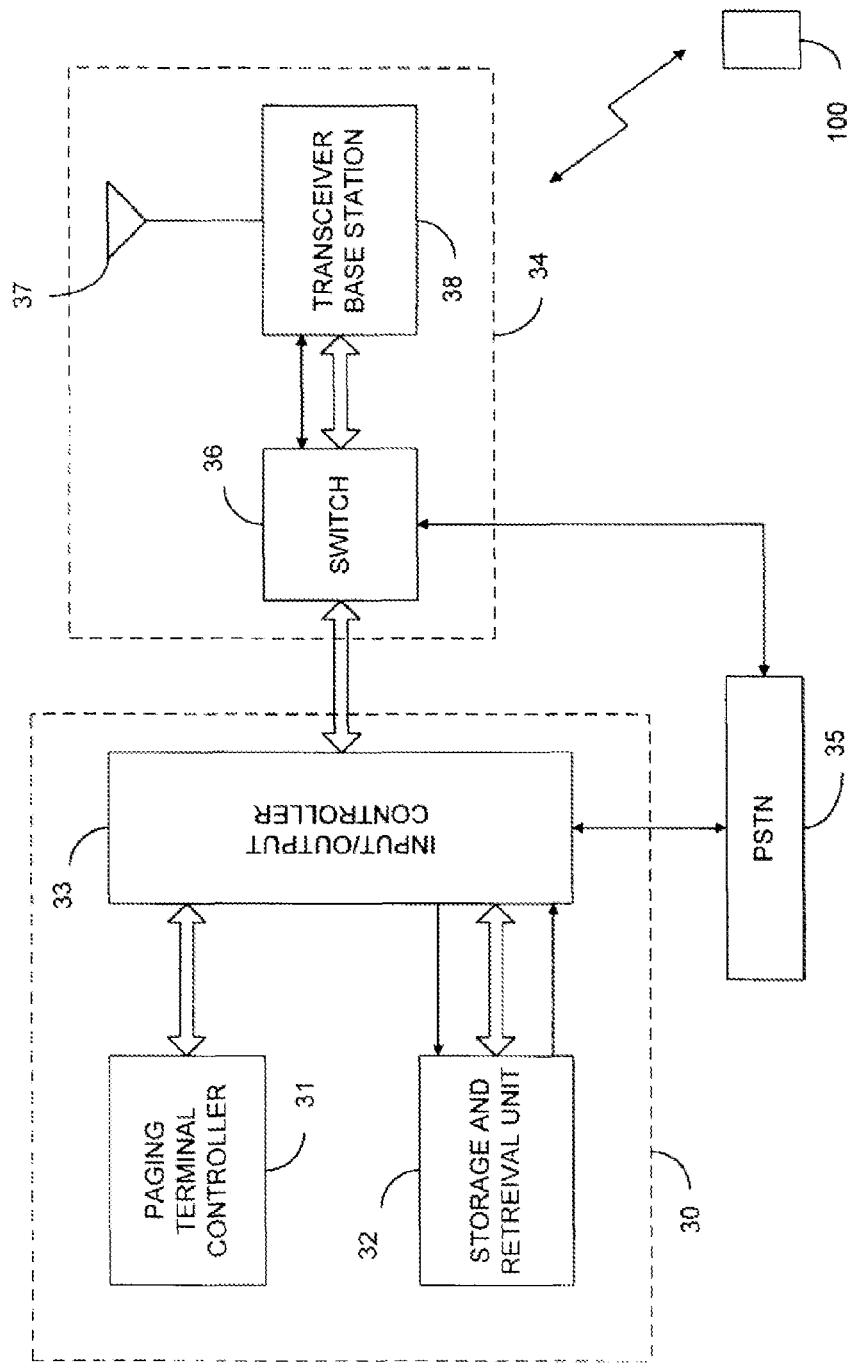
FIG. 3 is a block diagram of a communication system according to a preferred embodiment of the invention, and is a block diagram of a remote device according to a preferred embodiment of the present invention which is adapted to store voice messages and other information for access and management by, among other things, user devices such as those shown functionally in FIGS. 1 and 2.

With reference to FIG. 3, a system 30 according to a preferred embodiment of the invention is interconnected to a base station 34, both of which are connected to the Public Switched Telephone Network (PSTN) or to other telephone company equipment 35. The system 30 comprises a paging terminal controller 31 which may comprise a controller circuit and associated memory having a database of subscriber listings and corresponding selective call address fields. The paging terminal controller 31 communicates with storage and retrieval unit 32 and correlates messages with subscriber listings. The storage and retrieval unit 32 may comprise a CPU or control circuit, message information and program memory, memory interface circuitry and a DSP with appropriate operational code for storage and retrieval of the desired messages. The input/output controller 33 contains all necessary input and output circuitry such as encoders and decoders, modems and required routing and control circuitry for communicating with the paging terminal controller 31, the storage and retrieval unit 32, the PSTN 35, and the base station 34.

FIG. 3 shows a system 30 interconnected to a base station or remote unit 34. Conventional telephone company or other telecommunications or PSTN equipment 35 communicates with the base station 34 and system 30 in conventional fashion. The system 30 can comprise a paging terminal controller 31 which may comprise a controller circuit and associated memory (not shown) having a database of subscriber listings and corresponding selective call address fields. The paging terminal controller 31 communicates with storage and retrieval unit 32 and correlates messages with subscriber listings. The storage and retrieval unit 32 may comprise appropriate processor or control circuitry, message information and program memory, memory interface circuitry and DSP capacity with appropriate operational code for storage and retrieval of the desired messages. The input/output controller 33 contains all necessary input and output circuitry such as encoders and decoders, modems and required routing and control circuitry (not shown) for communicating with the paging terminal controller 31, the storage and retrieval unit 32, telephone company equipment 35 and base station 34. Such base stations and their components may be conventional.

Figure 4A:
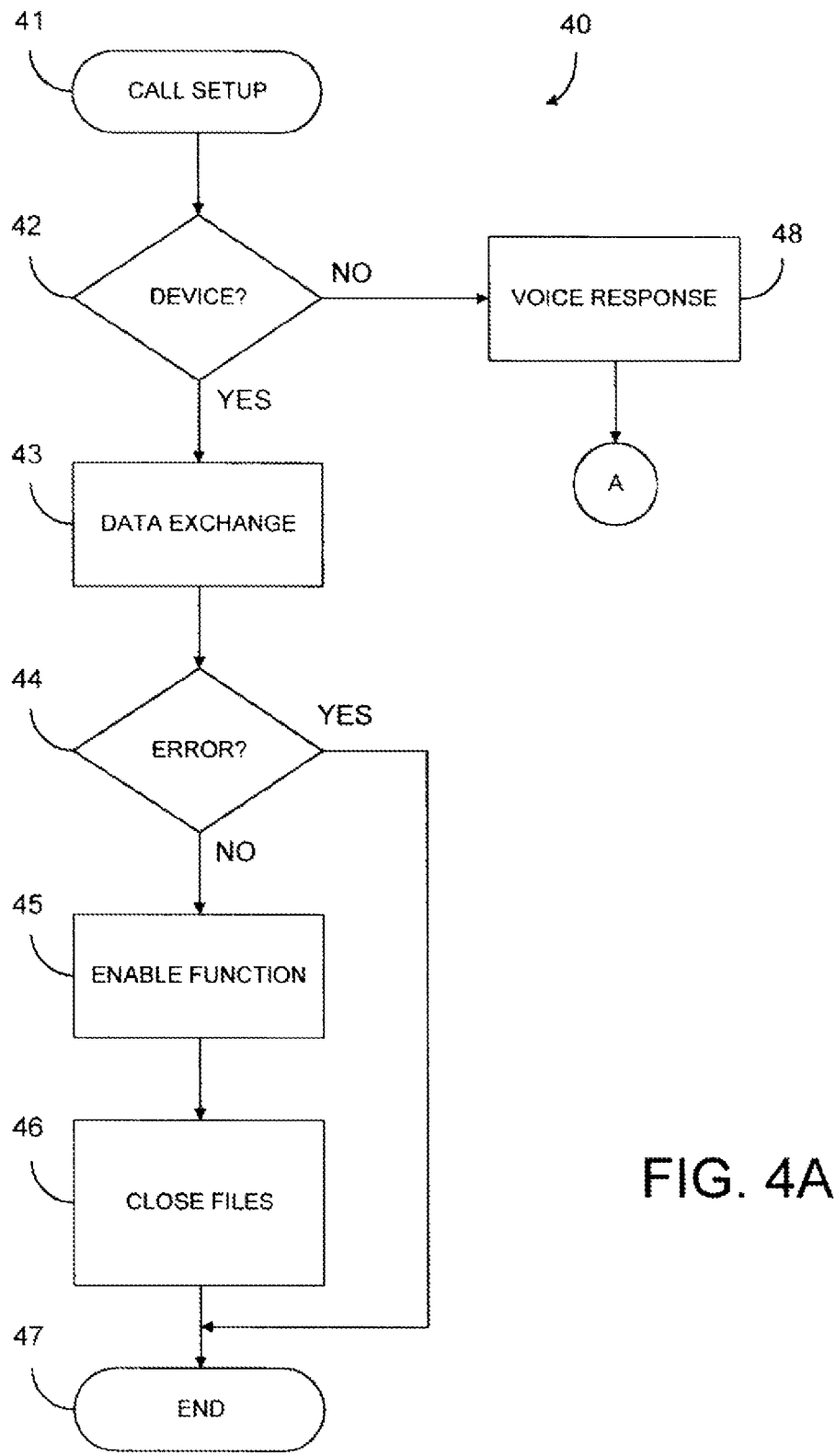
FIGS. 4A and 4B are flow charts depicting an exemplary set-up routine for establishing communications between the system of FIG. 3 and the transceiver of FIG. 1.

A call setup routine 40 for establishing communication between the system 30 and base station 34 will now be described with reference to FIGS. 4A and 4B. At step 41, a connection, such as a telephone connection, is routed through the PSTN 35 or in the case of paging transceiver 100 the switch 36, to the input/output controller 33. The input/output controller 33 determines at step 42 whether the connection is with an automated signaling device or with a person. If the connection is with a person, then at step 48 the storage and retrieval unit 32 is activated to produce one or more voice responses during the call in order to guide the person throughout the process.

If, at step 42, the input/output controller 33 determines that the call is from a device, such as a paging transceiver 100 or computer terminal, data is exchanged between the paging transceiver 100 and system 30 at step 43. The type of data that may be exchanged includes, but is not limited to, the following types of data: identification data, command data, and information data. The data supplied from the PSTN 35 may also be exchanged at step 43 with this data including data for identifying the caller and subscriber, such as, for example, Caller ID and DNIS (Dialed Number Identification Service). Additionally, the data may be extracted from the base station 34. For example, the location of the paging transceiver 100 may be determined from a home location registry (HLR) and the HLR data may be utilized by the system 30 in order to determine the location of the paging transceiver 100, as opposed to having the paging transceiver 100 supply the location information to system 30.

After data is exchanged at step 43, the system 30 determines at step 44 whether an error occurred during the transmission between the system 30 and paging transceiver 100. If an error did occur, then at step 47 the process ends and the paging transceiver 100 is informed of the error. The error is preferably presented to the user in the form of status information produced at the user interface 3, such as with an alert tone or visual display on the LED or LCD display. An error may include, but is not limited to, the following errors: "system busy," "wrong ID," or "bill over due." If no error is detected, as determined by the system 30 at step 44, a function is enabled and executed at step 45. The function, as will be described in greater detail below with reference to FIG. 8, may be selected by the user from a group of available functions. At step 46, housekeeping functions are performed both at the paging transceiver 100 and at the system 30 and the call is terminated at step 47.

Figure 4B:
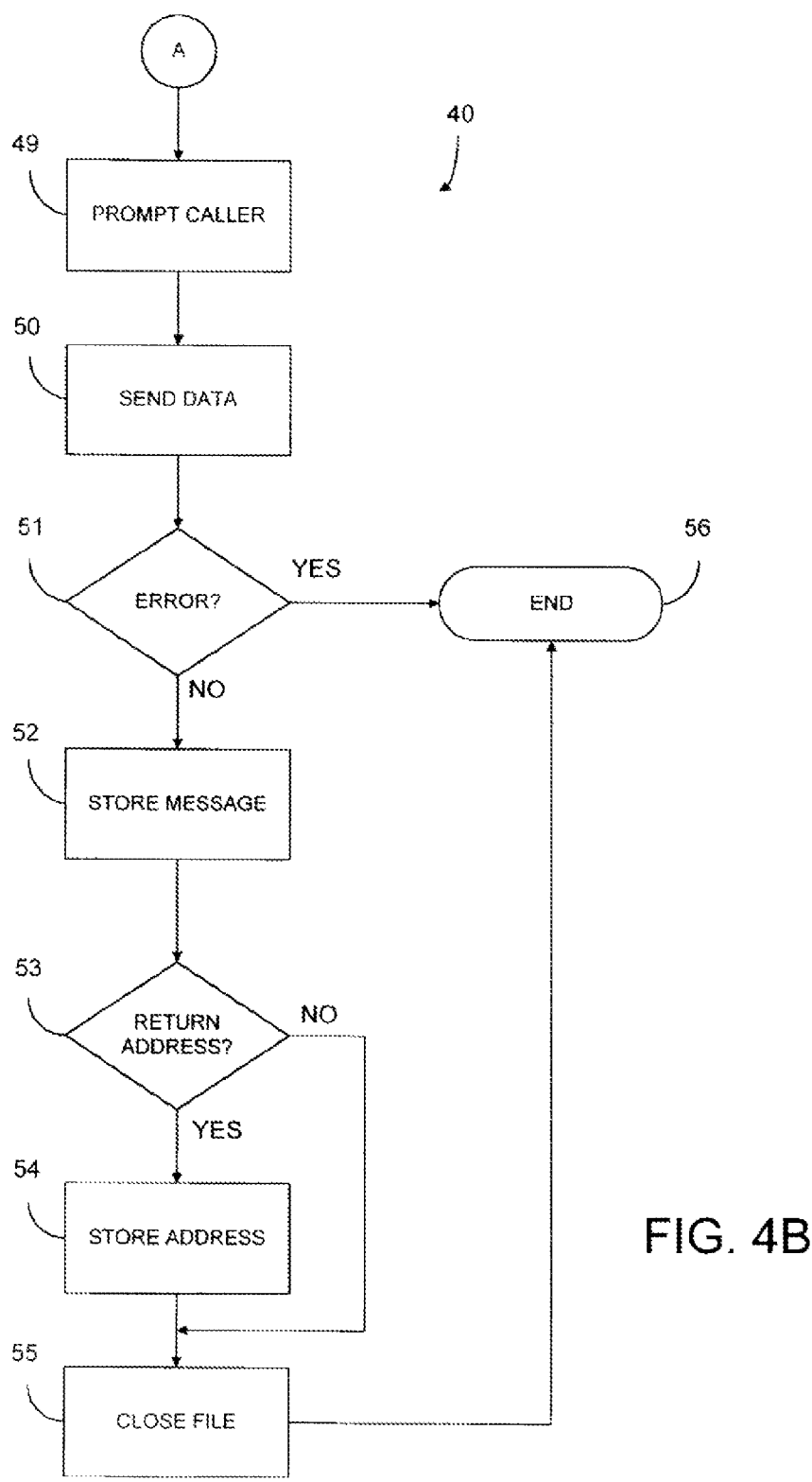

If the call is from a person as determined at step 42, then the caller is provided with a voice response at step 48 and, with reference to FIG. 4B, the caller is then verbally prompted at step 49 to enter information. At step 50, the caller sends data to the system 30, such as by pressing the telephone keypad to generate DTMF tones. The data that may be sent by the caller includes, but is not limited to, ID code, pass code, mail box number, and subscriber number. The system 30 may respond to voice commands from a caller by utilizing a readily available voice recognition system, such as those presently in use by the telephone company to except collect calls. At 51, the system 30 determines whether an error has occurred. If an error is detected, the caller may be given an opportunity to correct the error or, as shown, the process may end at step 56. If no error was detected by the system 30 at step 51, a message, such as a voice message, is recorded and stored in the storage and retrieval unit 32 at step 52. At step 53, the system 30 determines whether a return receipt or a reply message is requested. If a return receipt or reply message is requested, the return address is entered by the caller or optionally issued by the system 30 and is stored by the system 30 in the storage and retrieval unit 32 at step 54. The system 30, for instance, may detect the address signal of the incoming call and, by default, store this number as the return address. After the return address is stored at step 54 or if a return address is not requested, the stored message is cross referenced to selective call data corresponding to the intended paging transceiver 100 at step 55. Also at step 55, a flag is set in a transmission stack file at the paging terminal controller 31 for subsequently transmitting selective call signals representative of the selective call data to the targeted paging transceiver 100. Housekeeping is performed by the system 30 and the call ends at step 56.

The base station 34, as shown in FIG. 3, comprises a switch 36, a transceiver antenna 37, and a transceiver base station 38. In response to a received message, the system 30 passes control information to switch 36 for setting up a page call. The switch 36, for instance, may be a mobile telephone switching office (MTSO) for interfacing to the transceiver base station 38. In the send page mode, selective call signals having an address associated with the paging transceiver 100 are transmitted. The address may be an address code for a paging transceiver, a mobile telephone number (MIN) for a mobile radiotelephone, or type of identifying information for a communication device.

Command data and information data may also be communicated from the system 30 to the paging transceiver 100 through the base station 34. The command data and information data shall hereinafter be referred to as CI data, examples of which include the following: paging transceiver location, forward message, retrieve message, reply to message, paging transceiver ID, message identifiers, retrieval instructions, save message, erase message, message type, message length, time/date message received, system 30 ID, system 30 location, message address, message location, battery life, message identifier, format code, compression type, message age, message priority, alert codes, energy saving commands, memory status, program data, provisioning data, acknowledgment data and requests, function codes, sender name, current time, number of messages, mailbox number, phone number, return address, alpha numeric short messages, general command requests, group calls, and signal strength.

The address and command data and information may be transmitted over any suitable communication system. For instance, the data may be communicated over a paging system, a cellular system having short message service capabilities, such as GSM-SMS, a Cellular Digital Packet Data (CDPD) system, Personal Communications Services, or any other type of mobile radiotelephone system or communication system. Furthermore, the paging transceiver 100 preferably is able to communicate over more than one system, such as with both a paging network and a mobile radiotelephone network.

Figure 5:
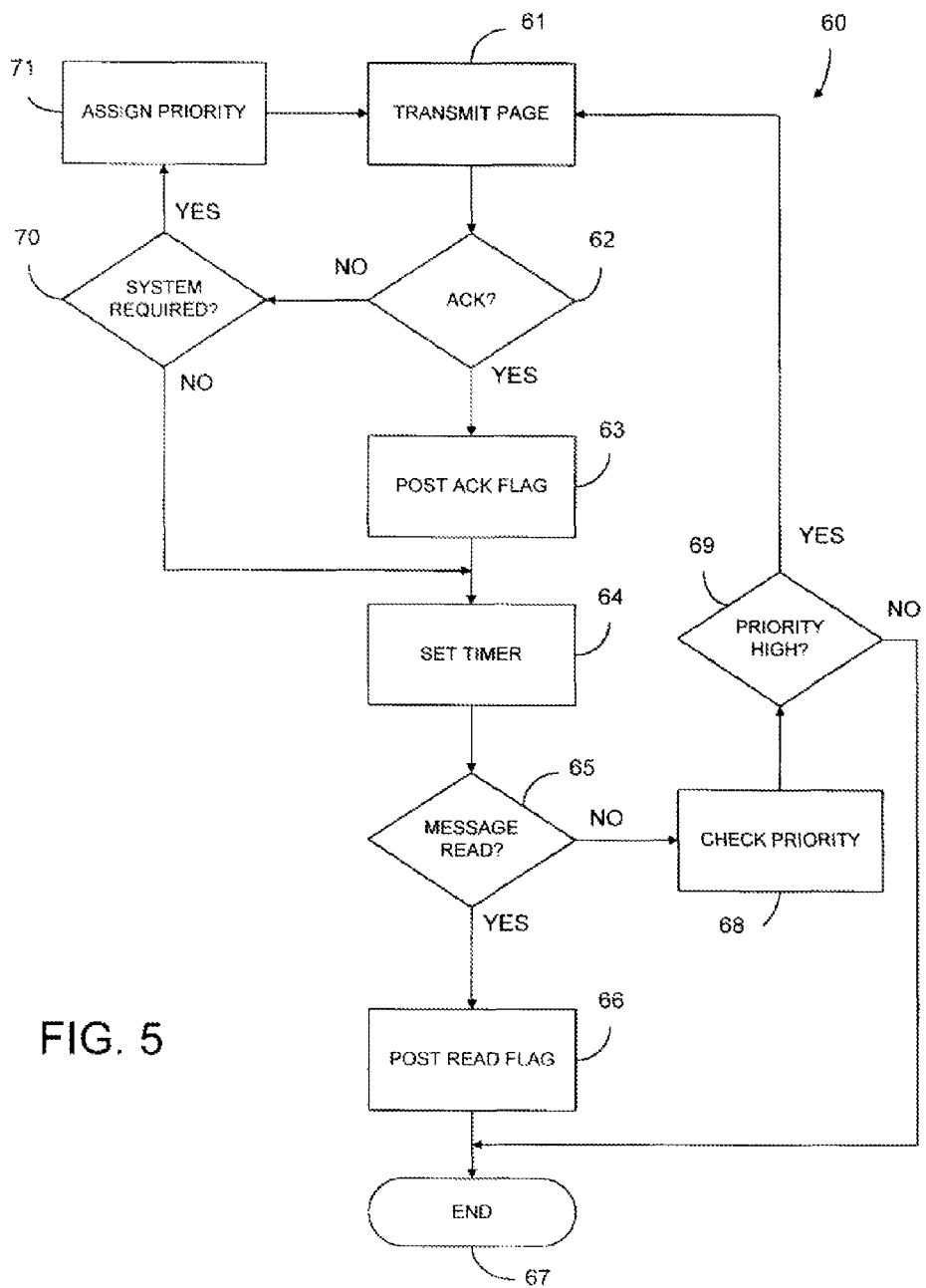
FIG. 5 is a flow chart depicting a paging process.

With reference to FIG. 5, a flow diagram 60 for performing a page call is shown. At step 61, the system 30 locates the current message flag from its transmission stack within paging terminal controller 31 and communicates with base station 34 for setting up a page call. The base station 34 transmits selective call signals and CI data to the targeted paging transceiver 100. At step 62, the system 30 determines whether an acknowledgment (Ack) was received from the paging transceiver 100 indicating that the page call was received. If an acknowledgment was not received, then at step 70 the system 30 determines whether an acknowledgment is a system 30 option. If an acknowledgment is required, then at step 71 the system 30 assigns the page call a priority in the transmission stack and eventually returns to step 61 for re-transmission. If the acknowledgment is received at step 62, the system 30 sets an acknowledgment flag (Ack flag) corresponding to the stored message.

If an acknowledgment is not a system requirement, as determined at step 70, or after posting the acknowledgment flag at step 63, the system 30 sets a timer at step 64 and waits a period of time before proceeding to step 65. At step 65, the paging terminal controller 31 determines if the stored message has been read. If the message has been read, then at step 66 the system 30 posts a read flag in the subscriber data base to indicate that the message was delivered and read and at step 67 the process ends.

If, at step 65, the message had not been read, then at step 68 the system 30 determines the priority of the message and proceeds to step 69. If the priority is high, as determined at step 69, then at step 61 the page call is returned to the transmission stack at the designated priority level for retransmission. If, on the other hand, the priority is not high as determined at step 69, then the message has a low priority and the process ends at step 67.

Figure 6:
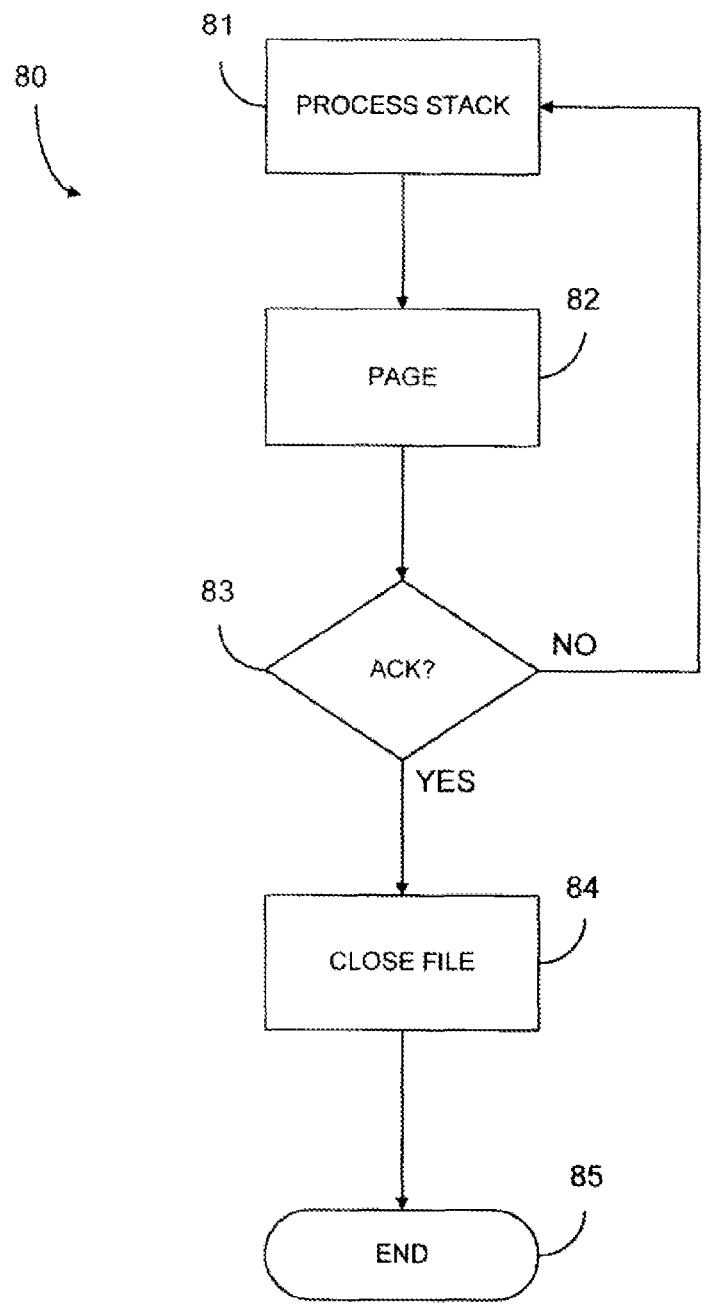
FIG. 6 a flow chart depicting of process of notifying a paging transceiver of an unread message.

An alternate routine 80 for notifying a paging transceiver 100 that an unread message is waiting is shown in FIG. 6. At step 81, the paging terminal controller 31 sorts through subscriber listings which have a corresponding unread and unnotified message in the storage and retrieval unit 32 and sends a page request to base station 34. At step 82, the switch 36 checks a home location registry (HLR) to determine the registered location and status of the remote paging transceiver 100. A page call is processed by transmitting selective call signals from transceiver base station 37 at step 82. If a page acknowledgment is desired for verification that the paging transceiver 100 recipient received the selective call signals, an Ack signal is manually or automatically transmitted from the paging transceiver 100 to base station 34 for storage in the subscriber database of paging terminal controller 31 at step 82.

At step 83, if an acknowledgment signal was received, a notified flag is set in the subscriber data base corresponding to the unread message stored in the storage and retrieval unit 32 and the paging process for the current unread message ends at step 84. If at step 83 an acknowledgment signal was not received, the message is assigned a new priority and the process is subsequently repeated. Optionally, a plurality of priorities may be assigned to acknowledged and not acknowledged unread messages so that the paging transceiver 100 is sent a number of calls until the message is read by the subscriber.

In the preferred embodiment, the base station 34 is part of a mobile radiotelephone network and the paging transceiver 100 is paged over the designated paging channel or the control channels of the network. In addition to paging the paging transceiver 100, the short messages or other data transmitted to the paging transceiver 100 is also preferably transmitted over the paging channel or control channels. Although the paging is preferably performed through a mobile radiotelephone network, the selective call signals may alternatively be routed to a paging system for transmitting an address code and CI data over an independent paging transmitter. In such a configuration, the paging transceiver 100 may be configured to have a separate paging receiver or transceiver compatible with the paging transmitter or paging transceiver. Since radio pager devices require much less energy than portable cellular telephones, a paging transceiver 100 configured with a low energy paging receiver would reduce energy required for receiving selective call signals and allow high energy circuitry of the paging transceiver 100 to be turned off until the user needs to retrieve or transmit messages. Other variations and modifications will be apparent to those skilled in the art.

Figure 7:
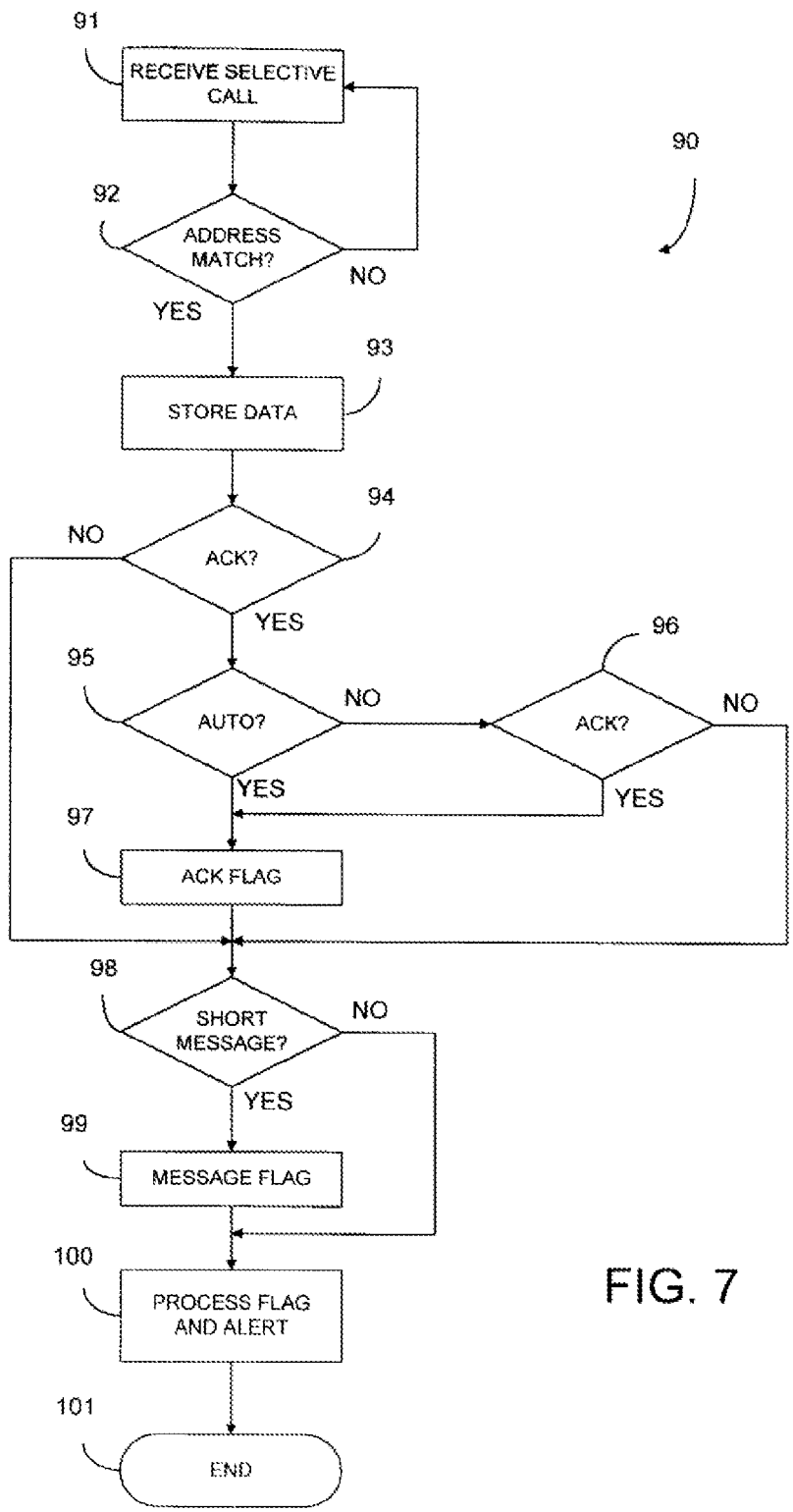
FIG. 7 is a flow chart depicting a process of receiving a page at the paging transceiver of FIG. 1.

A process 90 for receiving messages at a paging transceiver 100 is shown in FIG. 7. A selective call signal including an address is received by receive section 21 of the transceiver 100 at step 91. At step 92, the demodulated signal is processed by the CPU 27 to compare the received address with an address code stored in the CPU 27 memory. If the received address code does not match the stored address, flow returns to step 91 and the transceiver 100 continues to monitor transmissions for its address. When the address corresponds to the pre-stored address code, as determined at step 92, the CPU 27 stores and processes any corresponding received CI data at step 93.

Next, at step 94, the CPU 27 determines if an acknowledgment transmission is required by the paging transceiver 100. The CPU 27 may always enable an acknowledgment in order to confirm at the system 30 or base station 34 that the selective call signals were received by the targeted paging transceiver 100. Alternatively, the CPU 27 may never enable an acknowledgment from the transceiver 100, which is useful in explosive environments where transmissions are dangerous and in environments where a reply from the paging transceiver 100 may cause harmful interference to other electronic equipment. The CPU 27 may, as another option, enable an acknowledgment only when acknowledgment data is contained within the received CI data, such as with a remote request. Finally, the CPU 27 may enable an acknowledgment in response to a user-enabled command.

Returning to step 94, if the paging transceiver 100 allows for an acknowledgment then at step 95 the CPU 27 determines whether the acknowledgment is required or if the acknowledgment is a user option. If the acknowledgment is required to be automatic, then an acknowledgment flag is set at step 97. If, on the other hand, the acknowledgment is not automatic but rather optional, then at step 96 the CPU 27 determines whether an acknowledgment has been enabled. If the acknowledgment has been enabled, then the acknowledgment flag is set in step 97.

At step 98, the CPU 27 determines whether short messages may be transmitted. Short messages may include CI data or any type of short coded message which was pre-stored by the user in the paging transceiver 100. If short messages are enabled, at step 99 the CPU 27 sets the short message flag. At step 100, the paging transceiver 100 transmits all flagged data, including CI data, to the base station 34 for processing by the system 30. The CPU 27 generates status information corresponding to received CI data and passes any necessary user status information to the user interface 3 for visual and/or audible reception by the user. For example the user may hear an alert beep, feel an alert vibration, view an LCD indicating the number of unread messages, view an animated graphic display, hear a synthesized voice indicating that an urgent message is waiting, or receive other types of indications. At step 101, the CPU 27 performs house keeping functions and the routine ends.

Figure 8:
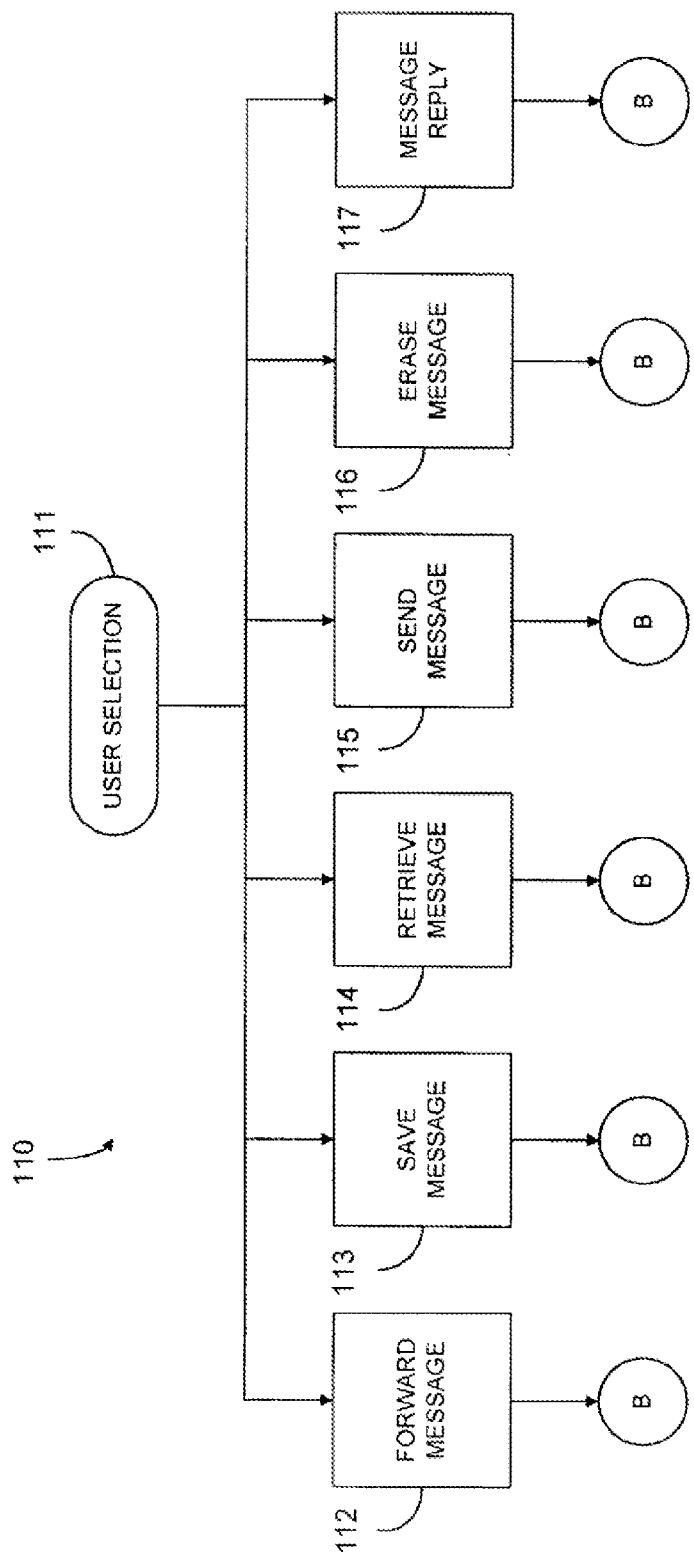
FIG. 8 is a flow chart depicting a process of selecting a function at the paging transceiver of FIG. 1, and is a schematic diagram for an interface according to a preferred embodiment of the present invention for accessing and managing messages on a plurality of platforms.

FIG. 8 depicts a user function flow diagram 110 for user selectable function requests at the paging transceiver 100. At step 111, the user selects a function to be performed from available functions 112 to 117. These functions are exemplary functions that may be available and additional functions may exist. One or more of these functions are preferably selected through the user interface 3. One or more messages may be selected by the user to be forwarded to one or a plurality of addresses or recipients at step 112. Items such as messages and send message lists may be selected by scrolling through the message number or name. The selected messages for forwarding may reside at the paging transceiver 100 or at the system 30. The user may also select the function of saving a selected message at step 113. At step 114, selected messages are retrieved for reproduction and/or storage. At step 115, messages may be sent to one or a plurality of recipients, such as to another paging transceiver 100. At step 116, the selected message may be erased and at step 117, a reply may be sent to the originator of a selected message. With any of the functions selected at steps 112 to 117, the system 30 may act upon the entire information or, alternatively, may instead operate on only the message identifier. For instance, if the user selected the desired action of forwarding a message, the system 30 may send the entire message to a designated recipient or may instead send just the message identifier.

FIG. 8 is a schematic diagram for a preferred embodiment of an interface according to the present invention for user selectable function requests at the paging transceiver 100 in order to access and manage messages. At step 111, the user selects a function to be performed. Flow proceeds to the desired function selected. At step 112, messages may be selected by the user to be forwarded to one or a plurality of addresses. Items such as messages and send message lists may be selected by scrolling through the message number or name. Selected messages may reside at the paging transceiver 100 or at the system 30. At step 113, a selected message may be saved. At step 114, selected messages are retrieved for reproduction and/or storage. At step 115, messages may be sent to another or a plurality or recipients such as another paging transceiver 100. At step 116, the selected message may be erased. At step 117, a reply may be sent to the originator of a selected message.

Figure 9:
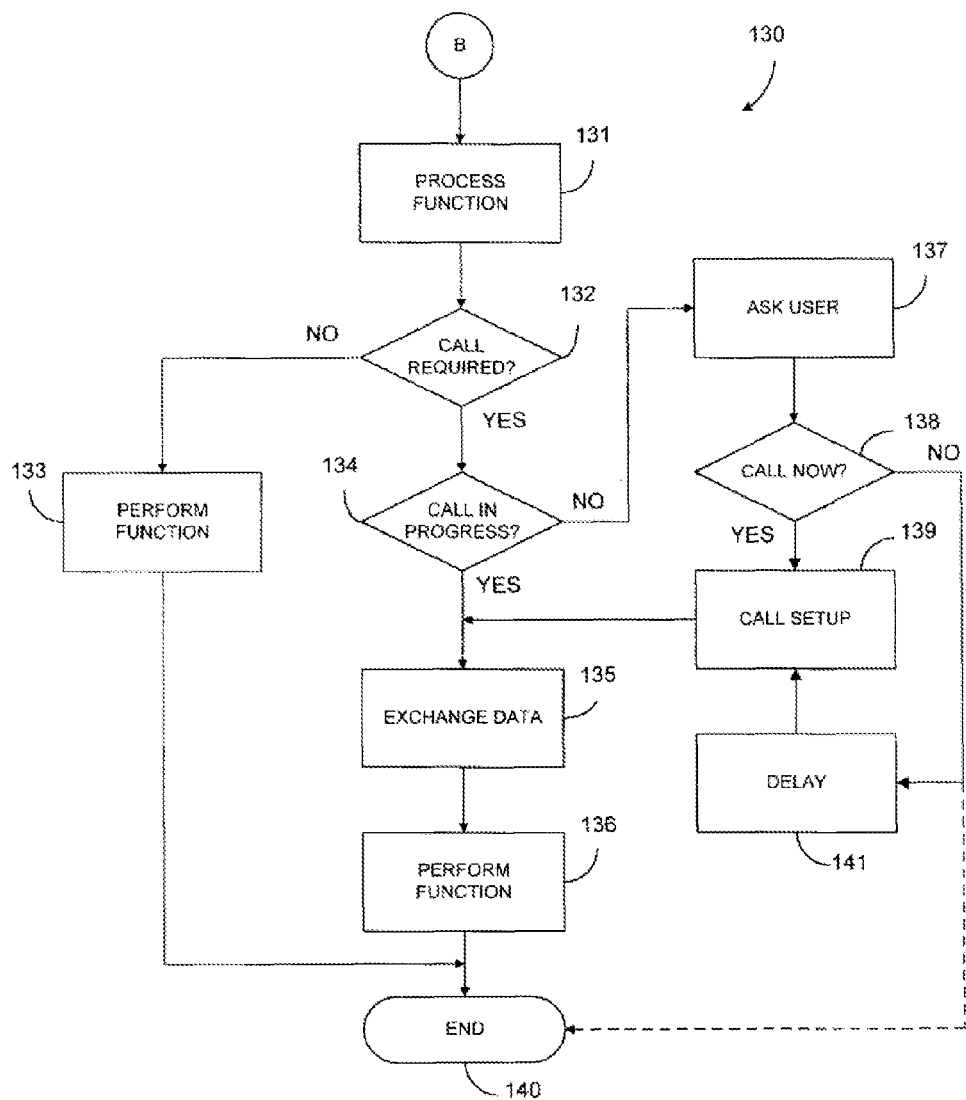
FIG. 9 is a generic flow chart depicting a selective process performed at the paging transceiver of FIG. 1 for executing a desired function, and is flow diagram of a process according to a preferred embodiment of the present invention for initiating a communications session with a remote device and accessing and managing messages at the remote device and in the user's device.

FIG. 9 shows a flow diagram illustrating one version of process flow to implement functions 112-117 shown in FIG. 4. When forward message (step 112) is selected, flow proceeds to step 131, where CPU 27 reads information pertaining to the message or plurality of messages selected by the user to be forwarded. The information may include a message identifier, location data, message length, message type, destination addresses, or other so-called CI type data. Flow proceeds to step 132 where it is determined whether the message can be forwarded without communicating with the system 30. If so, the appropriate function is performed at step 133 to handle the messages as desired by the user. If not, flow proceeds to step 134 where CPU 27 determines if a call is in progress. If a call is in progress flow proceeds to step 135 where CI data is exchanged with the system 30 for forwarding messages. If the messages to be forwarded are located at the system 30, the messages are simply flagged for forwarding to the appropriate addresses, step 136, and confirmation is communicated to the paging transceiver 100. If the message is not located at system 30, it is transmitted from paging transceiver 100 to system 30 at step 136. The process ends at step 140. If at step 134, it is determined that a call is not in progress, the user is asked if the message should be forwarded now, step 137. If the user selects yes, a call is established with system 30, step 139, and flow continues as previously described. If no, CPU 27 retains the forwarding information in memory for forwarding the message during a subsequent call with system 30 and process ends, step 140.

The paging transceiver 100 and system 30 may exchange status information during messaging calls initiated by the paging transceiver 100 or by selective call (i.e. page calls) initiated by the system 30. The status information may contain information corresponding to messages stored within the paging transceiver 100 or within the system 30. For example, if the system 30 erases a message that has resided in its memory for too long a period of time (i.e. an unsaved, read message) the system 30 may inform the paging transceiver 100 that the message no longer exists. If the message identifier stored in the paging transceiver 100 no longer corresponds to a message stored in the system 30 or the paging transceiver 100, CPU 27 can remove the identifier for the no longer existing message.

In operation, the user selects a message or messages to be forwarded. The user also selects a recipient. If the message resides at the system 30, it is simply forwarded to the addressed recipient. If the message is located in the paging transceiver 100 it is first transmitted to the system 30 before it can be forwarded to the intended recipient. In order to conserve time and resources, the system 30 will preferably not accept receipt of a message from the paging transceiver 100 if the same message already exists at the system 30. The system 30 will simply perform the required function with the already present duplicate message.

Returning now to FIG. 9, if a save message function 113 is selected flow proceeds to step 131, where the message identifier to be saved is read by CPU 27 and flow proceeds to step 132, where CPU 27 determines if the message identified selected corresponds to a message already stored in message memory 5 and if the selected function can be processed off line. If yes, flow proceeds to step 133, where a save message flag is set by CPU 27 in order to protect the message stored in message memory 54 from being over written and the process ends, step 140. If at step 132, it is determined that the message is not stored at the paging transceiver 100, flow proceeds to step 134, where a determination is made to see if a call is in progress. If a messaging call is in progress, CI data instructing the system 30 to save the message is sent. System 30 flags the stored message and sends a message saved acknowledgment or confirmation signal (Ack) to the paging transceiver 100, step 136. The CPU 27 converts the Ack to status information and informs the user that the message is saved at the system 30. The process ends at step 140. If at step 134, it is determined that the paging transceiver 100 is not currently in communication with the system 30, CPU 27 flags the message identifier for saving and the user is asked if the call should be made now, step 137. If no, step 138, the flag is kept for transmission to system 30 at a later time such as during a selective call to the paging transceiver 100 or during a messaging call to system 30. If yes, flow proceeds to step 139 where a call is set up for transmitting the save flag and CI data as previously described.

Returning now to function 114 of FIG. 9, if the retrieve message function is selected, flow proceeds to step 131 where message identifiers corresponding to messages to be returned are read from CPU 27 memory for retrieving the message. Additionally, CPU 27 may read message location information, system ID information, address information, message length information, message type information and the like as previously described. Flow proceeds to step 132, where CPU 27 determines where the message is located and if a call to system 30 is required. If the message is stored in message memory 5 of FIG. 1, flow proceeds to step 133, where the message is retrieved. The message may be an audio message, visual message or electronic signal for transferring to another device. At step 132, if the message does not reside in message memory 5, CPU 27 determines that a call is required to retrieve the message and flow proceeds to step 134, where it is determined if a call is in progress. If a call is in progress, flow proceeds to step 135 where CI data is exchanged such as which messages to retrieve, message length, message type, message identifier and the like. Flow proceeds to step 136 where the message is retrieved and simultaneously stored in message memory 5 by DSP 4 of FIG. 1. The appropriate status information corresponding to the message is stored in CPU 27 memory and the process ends. If at step 134 a call is not in progress, the user is asked if the call should be made now or if during another call, step 137. Flow proceeds to step 138 where if the user chooses to place the call now then flow proceeds to step 139 and the call is processed. If the user chooses to delay the call until another session, the message is left flagged for retrieval at the next session and the process ends, step 140. It should be noted that when the user chooses to postpone the call at step 138, a timer 141 may be inserted so that the message may be retrieved at a desired time or a retrieval instruction may be sent from system 30 to paging transceiver 100 for causing the paging transceiver 100 to automatically retrieve a message or plurality of messages at a time designated by system 30. For example, it may be desirable to have emergency weather information automatically retrieved during night time hours when telephone line charges and air time charges are less. The above described options may also be utilized for forwarding messages, erasing messages, saving messages, sending messages and replying to messages as will be shown in more detail hereinafter.

Referring now to the send message function 115 of FIG. 9: In order to send a message, the message must typically first be stored at the paging transceiver 100 or the system 30. The process of storing or recording messages is conventional. It is only necessary that the stored message be identified, addressed to a recipient and properly identified in accordance with the description of the present invention. Examples of these devices are described in U.S. Pat. No. 4,602,129 to Matthew, et al., (which is incorporated herein by this reference) and U.S. Reissue Pat. 34,976 to Helferich, et al. (which, together with its underlying patent, has been incorporated by reference above). System 30 and paging transceiver of the present invention can be configured to record, store and retrieve a plurality of different types of messages as previously described depending on the application required. Returning to send message function 115, when send message function 115 is selected, flow proceeds to step 131 where the selected message to be sent is identified and cross referenced to the selected recipient address information. Flow proceeds to step 132 and continues through the process in the same manner as forwarding a message, function 112. The message to be sent may reside in the paging transceiver 100 or the system 30. If the message resides in the system 30 and the paging transceiver 100, the message in the system 30 corresponding to the CPU 27 message identifier will be sent in order to conserve time. If the message does not reside in system 30, the message will be sent from the paging transceiver 100 to the system 30. If the message is to be sent from the paging transceiver 100, it may be a pre stored message or alternatively, the message may be transmitted to system 30 by paging transceiver 100 in real time during a call session between system 30 and paging transceiver 100.

Referring now to erase message function 116 of FIG. 9, the erase message function allows a user to erase messages stored at the system 30 or at the paging transceiver 100 depending on the mode of operation. Given that a message may be erased without erasing the message identifier, if a message is erased at the paging transceiver and the identifier still exists, the message can be retrieved from the system 30. In order to remove a message identifier at the paging transceiver 100, the message must be erased at the system 30. At step 131, the selected message to be erased is identified and the user is asked if the selected message in the paging transceiver is to be erased or if both copies of the message are to be erased. If the local message only is selected to be erased, the message identification information is retained and flow proceeds to step 133 where the message stored in memory 5 of FIG. 1 is flagged for erasure or overwriting. In other words, the message still exists but may be over written by another message when memory space is required. The message may be retrieved from message memory until it is over written. If at step 132, a decision was made to erase both copies of the message, flow proceeds to step 134 where CPU 27 determines if a call is in progress. If yes, flow proceeds to step 135, where CI data is exchanged instructing system 30 to erase the message. Flow proceeds to step 131 where system 30 transmits an Ack that the message was erased, CPU 27 flags the local message for erasure, the identifier is removed and both copies of the message and the identifiers are erased. If at step 134, it is determined that a call is not in progress, flow proceeds to step 137, where the local message is erased and the user is asked if the system 30 copy of the message needs to be erased now. If yes, flow proceeds to step 139, the call is established and the process continues as previously described. If no, the necessary flags are set for erasing the remote message during the next communication with system 30. Again, timer option 141 may be utilized for a timed erase of the message stored at system 30.

Referring now to message reply function 117 of FIG. 9, the reply message function 116 is for sending a reply to an already received message. A reply message utilizes the same process as a send message except that a return address is already correlated to the message designated for reply. During send message function 115 the user is required to select an address or destination for the message to be sent. In other words, the user must know the destination or address in advance. Message reply function 117 does not require that the user know the address of the recipient because the message being replied to has a corresponding return address. Just like send message function 115, a reply message may be sent in real time or it may be prerecorded and stored in the paging transceiver 100 for transmission to system 30. Additionally, the replay transmission may be delayed for a set period of time as previously described.

The common user interface of the present invention serves to control functions at the paging transceiver 100 and/or corresponding functions of system 30, (i.e. a remote device), depending on the location of a message and the communications status of the paging transceiver 100.

FIG. 9 depicts processing performed by the paging transceiver 100 in response to the selection of any one of the functions 112 to 117 shown in FIG. 8. At step 131, the function is identified by the CPU 27 and other processing occurs prior to step 132 where the CPU 27 determines whether a call is required. If a call is not required to perform the function, then at step 133 the CPU 27 performs the requested function and the process ends at step 140.

If, on the other hand, a call is required, then at step 134 the CPU 27 next determines whether a call is already in progress. If a call is in progress, the CPU 27 exchanges data with the system 30 and base station 34 at step 135 and the function is performed or executed at step 136. The data that is exchanged at step 135 includes a request signal that is sent from the paging transceiver 100 to the system 30 specifying the desired action and the particular information or message. If a call is not in progress, then at step 137 the CPU 27 preferably asks the user if a call should be made and receives the user's feedback at step 138. If the user elects not to call, then a delay occurs at step 141 with delay circuit 28.

As discussed above, the delay circuit 28 may be a timer which expires at a set time, such as at 1:00 a.m., when traffic and costs are low or may expire after a period of time, such as 1 hour. The set time or the period of time may be programmed by the user or may be determined by default values. Additionally, the delay circuit 28 may operate to delay operation until the signal strength is above a certain threshold. The delay circuit 28, in this example, may therefore comprise a level detector and a comparator circuit for comparing the signal strength to the threshold level. The delay circuit 28 would therefore advantageously delay the paging transceiver 100 from initiating communication until signal strength is sufficiently high. Moreover, the delay circuit 28 may alternatively comprise a communication monitor circuit for determining when the paging transceiver 100 is communicating before performing a function. Also, the delay circuit 28 may detect transmissions and trigger a certain event in response to a received communication. As an example, if the paging transceiver 100 receives a certain type of message or a message from a particular source or individual, the paging transceiver 100 may automatically perform a programmed action. The paging transceiver 100 would therefore be able, for instance, to automatically forward all messages received from one recipient to a designated person.

After the timer 28 is triggered or if the user decides to call now, then at step 139 the CPU 27 sets up a call to the base station 34. Once a call is established, then processing proceeds to step 135 for the exchange of data and then to step 136 for the performance or execution of the function. At step 140, the process ends. The process shown in FIG. 9 is not limited to the performance of a single function but also represents the processing if the user selects a number of functions. For example, the user may select the functions of retrieving a message at step 114 and forwarding a message at step 112 and these functions may be performed in unison with each other or sequentially one after the other.

The paging transceiver 100 and system 30 may exchange status information during messaging calls initiated by the paging transceiver 100 or by selective call, such as page calls, initiated by the system 30. The status information may contain information corresponding to messages stored within the paging transceiver 100 or within the system 30. For example, if the system 30 erases a message that has resided in its memory for too long a period of time, such as an unsaved, read message, the system 30 may inform the paging transceiver 100 that the message no longer exists. If the message identifier stored in the paging transceiver 100 no longer corresponds to a message stored in the system 30 or in the paging transceiver 100, the CPU 27 removes the identifier for the no-longer existing message.

When the forward message function 112 is selected, flow proceeds to step 131 where the CPU 27 reads information pertaining to the message or plurality of messages selected by the user to be forwarded. The information may include a message identifier, location data, message length, message type, destination addresses, or other CI type data as previously described. At step 132, the CPU 27 determines whether the message cannot be forwarded without communicating with the system 30. At step 134, the CPU 27 determines if a call is in progress. If a call is in progress, CI data is exchanged at step 135 with the system 30 for forwarding messages. If the messages to be forwarded are located at the system 30, the messages are simply flagged for forwarding to the appropriate addresses. At step 136, the messages are forwarded and confirmation is communicated to the paging transceiver 100. If the message is not located at system 30, the message is transmitted from the paging transceiver 100 to system 30 at step 136 and the process ends at step 140. If at step 134, it is determined that a call is not in progress, the user is asked if the message should be forwarded now at step 137. If at step 138 the user selects yes, a call is established with system 30 at step 139 and flow continues as previously described. If at step 138 the user responds that a call should not be made, the CPU 27 keeps the forwarding information in memory for forwarding the message during a subsequent call with system 30 and a delay occurs at step 141 with delay circuit 28, as described above. After the delay, a call is established with system 30 at step 139 and flow continues as previously described. The process ends at step 140.

In operation, the user selects a message or messages to be forwarded and also selects a recipient for receiving the message. If the message resides at the system 30, the message is simply forwarded to the addressed recipient. If the message is located in the paging transceiver 100, the message is first transmitted to the system 30 at step 135 before it can be forwarded to the intended recipient. In order to conserve time, the system 30 will not accept receipt of a message from the paging transceiver 100 if the same message already exists at the system 30. The system 30 will simply perform the required function with the already present duplicate message.

If the function selected is the save message function 113, then at step 131 the message identifier to be saved is read by CPU 27. At step 132, the CPU 27 determines if the message identifier selected corresponds to a message already stored in message memory 5 and if the selected function can be processed off-line. If yes, at step 133 the CPU 27 sets a save message flag in order to protect the message stored in message memory 5 from being over-written and the process ends at step 140.

If at step 132 the CPU 27 determines that the message is not stored at the paging transceiver 100, then at step 134 the CPU 27 determines whether a call is in progress. If a messaging call is in progress, CI data instructing the system 30 to save the message is sent. The system 30 flags the stored message and sends a message saved acknowledgment to the paging transceiver 100 at step 136. The CPU 27 converts the acknowledgment to status information and informs the user that the message is saved at the system 30 and the process ends at step 140. If at step 134, it is determined that the paging transceiver 100 is not currently in communication with the system 30, the CPU 27 flags the message identifier for saving and the user is asked if the call should be made now at step 137. If no, at step 138 the flag is kept for transmission to system 30 at a later time. A delay occurs at step 141 with delay circuit 28 as described above. After the delay, a call is established with system 30 at step 139 and flow continues as previously described. Transmission to system 30 may also take place at a later time, such as during a selective call to the paging transceiver 100 or during a messaging call to system 30. If yes, then the CPU 27 sets up a call at step 139 for transmitting the save flag and CI data as previously described.

When the retrieve message function is selected at 114, then at step 131 the message identifiers corresponding to messages to be returned are read from the CPU 27 memory for retrieving the message. Additionally, the CPU 27 may read message location information, system ID information, address information, message length information, message type information and/or as previously described. At step 132, the CPU 27 determines the location of the message and determines if a call to system 30 is required. If the message is stored in message memory 5, then at step 133 the CPU 27 retrieves the message. The message, for instance, may be an audio message, visual message, text message, or electronic signal intended to be transferred to another device.

At step 132, if the message does not reside in message memory 5, the CPU 27 determines that a call is required to retrieve the message and, at step 134, determines if a call is in progress. If a call is in progress, CI data, such as which messages to retrieve, message length, message type, and message identifier, is exchanged at step 135. At step 136, the message is retrieved and simultaneously stored in message memory 5 by the DSP 4. The appropriate status information corresponding to the message is stored by the CPU 27 in its memory and the process ends at step 140. If at step 134 a call is not in progress, the user is asked if the call should be made now or if during another call at step 137. At step 138, if the user chooses to place the call, the call at step 141 is set up at 139. If the user chooses to delay the call at step 141 until another session or some later time, the message is left flagged for retrieval at the next session or some later time and the process ends at step 140. With the timer 28, the message may be retrieved at a chosen time or a retrieval instruction may be sent from system 30 to paging transceiver 100 for causing the paging transceiver 100 to automatically retrieve a message or plurality of messages at a time designated by system 30. For example it may be desirable to have emergency weather information automatically retrieved during night-time hours when telephone line charges and air time charges are less expensive. The above described options may also be utilized for forwarding messages, erasing messages, saving messages, sending messages, and replying to messages as will be shown in more detail hereinafter.

With the send message function 115, in order to send a message, the message must first be stored at the paging transceiver 100 or at the system 30. The process of storing or recording messages is well known to those of ordinary skill in the art and accordingly will not be described in further detail. Examples of these devices are described in U.S. Pat. No. 4,602,129 to Matthew, et al., titled "Electronic Audio Communications System With Versatile Message Delivery," and in U.S. Reissued Pat. No. Re. 34,976 to Helferich et al, titled "Analog/Digital Voice Storage Cellular Telephone," both of which are incorporated herein by reference. The system 30 and paging transceiver 100 can record, store and retrieve a plurality of different types of messages as previously described depending on the application required.

If the send message function 115 is selected, the CPU 27 identifies the message to be sent and cross references it to the selected recipient address information. At step 132, the CPU 27 determines whether a call is required. The subsequent processing of sending a message should be apparent from the description above for forwarding a message and accordingly will not be duplicated in order to simplify description of the invention. The message to be sent may reside in the paging transceiver 100 or in the system 30. If the message resides in the system 30 and in the paging transceiver 100, the message in the system 30 corresponding to the CPU 27 message identifier will be sent in order to conserve air time. If the message does not reside in system 30, the message will be sent from the paging transceiver 100 to the system 30. If the message is to be sent from the paging transceiver 100, the message may be a pre-stored message or alternatively, the message may be transmitted to system 30 by paging transceiver 100 in real time during a call session between system 30 and paging transceiver 100.

If the erase message is selected at step 116, the erase message function allows a user to erase messages stored at the system 30 or at the paging transceiver 100 depending on the mode of operation. A message may be erased at a paging transceiver 100 without erasing the message identifier. If a message is erased at the paging transceiver 100 and the identifier still exists in message memory 5, the message can be retrieved from the system 30. In order to remove a message identifier at the paging transceiver 100, the message must be erased at the system 30. This feature causes the user to manage the messages at the platform, thereby conserving memory space at the storage and retrieval unit 32. At step 131, the selected message to be erased is identified and the user is asked if the selected message in the paging transceiver is to be erased or if both copies of the message are to be erased. If the local message only is selected to be erased, the message identification information is kept and at step 133 the CPU 27 flags the message stored in memory 5 for erasure or overwriting. In other words, the message still exists but may be overwritten by another message when memory space is required and, until then, may be retrieved from message memory 5. If at step 132 a decision was made to erase both copies of the message, then at step 134 the CPU 27 determines if a call is in progress. If yes, at step 135 the CI data is exchanged instructing system 30 to erase the message. At step 131, the system 30 transmits an acknowledgment that the message was erased, the CPU 27 flags the local message for erasure, the identifier is removed and both copies of the message and the identifiers are erased.

If at step 134 the CPU 27 determines that a call is not in progress, the CPU 27 at step 137 erases the local message and the user is asked if the system 30 copy of the message needs to be erased now. If the user responds yes, at step 138 the call is established at step 139 and the process continues as previously described. If the user responds no at step 138, the necessary flags are set for erasing the remote message during the next communication with system 30 after the delay of step 141 and the timer 28 is activated. The timer 28 may be utilized for a timed erase of the message stored at system 30.

The message reply function 117 is for sending a reply to an already received message. A reply message utilizes the same process as the send message function except that a return address is already correlated to the message targeted for a reply. During the send message function 115, the user is required to select an address or destination for the message to be sent. In other words, the user must know the destination or address in advance. The message reply function 117 does not require that the user know the address of the recipient because the message being replied to has a corresponding return address. As with the send message function 115, a reply message may be sent in real time or it may be prerecorded and stored in the paging transceiver 100 for transmission to system 30. Additionally, the reply transmission may be delayed for a set period of time as previously described with timer 28.

In summary, as discussed above with reference to FIGS. 5 and 6, the system 30 does not transmit the entire message to the paging transceiver 100 but rather notifies the user that a message is waiting. The paging transceiver 100, as discussed above with reference to FIG. 7, stores data associated with the page and possibly a short message. The user can then select a desired one of plurality of available functions, such as those shown in FIG. 8, and the paging transceiver 100 will process the request in accordance with FIG. 9.

With the system 30 and paging transceiver 100, the paging transceiver 100 can notify a user of a message without receiving the entire message. The user can then decide to act upon the message at a time convenient to the user. Rather than receiving the message with the alert, as occurs with conventional paging receivers, the user can control the time when he or she wants to receive a message and may even decide not to retrieve the message. After the user has been notified, the user can then control the paging transceiver 100 to retrieve the message from the system 30, to save the message at either the system 30 or paging transceiver 100, to forward the message to an indicated recipient, to reply to the message, or to erase the message from the paging transceiver 100 or from the system 30 With paging transceiver 100, the user can position the paging transceiver in a desired location before initiating communication with the system 30. Thus, if the user is paged by system 30 while the user is in a subway, basement, or on an airplane, the user can postpone the delivery of the message until the paging transceiver 100 is in a better location to receive and reply to the message. Similarly, the user may be in an explosive environment or near sensitive electronic equipment and may postpone delivery of the message and a reply from the paging transceiver 100 until the user is out of the explosive environment or far enough away from the sensitive electronic equipment. The paging transceiver 100 and system 30 therefore give the user control over the messages stored in the system 30.

The paging transceiver 100 and system 30 conserve both valuable air time and also paging transceiver message memory 5. The system 30 does not automatically deliver each message to the intended paging transceiver 100 but instead allows the user to exercise control over the message. Since a message may be many bytes in length, perhaps kilobytes, megabytes, or even greater, the benefit to the system 30 and to the base station 34 in not having to transmit each message can be quite substantial. Also, since each message is not automatically delivered to the paging transceiver 100, the paging transceiver 100 does not become overloaded with messages and instead the user can choose to act on selective messages, such as by retrieving only certain messages. The user, additionally, may decide not to act on any of the messages through base station 34 and may call the system 30 through the PSTN 35, thereby bypassing the base station 34 and its associated charges and expenses.

The paging transceiver 100 and system 30 are not limited to voice messages in a paging system. Rather, the paging transceiver 100 and system 30 may operate with any type of message or information, including, but not limited to numeric messages, alphanumeric messages, voice or other audio messages, video messages, graphics or even data. The paging transceiver 100 may be a separate paging transceiver, may be integral with a mobile radiotelephone, or may be incorporated into other devices.

For instance, the paging transceiver 100 may be integrated into a portable radio, CD, or tape player. The paging transceiver 100 could receive messages from system 30 which indicate portions of songs that may be sampled by the user. The user may browse through a listing of available music and select a desired song. The paging transceiver 100 then communicates with the system 30 to retrieve the selected song and the user can then play the song at the paging transceiver 100.

As another example, the messages may be video messages which the user can browse through and select only desired messages. The paging transceiver 100 may be integral with a television set and the video messages may be promotions for new movies or shows. Alternatively, the paging transceiver 100 may be integral with a game console and the video messages may be clips of new games that are available with that game console. Other applications for the paging transceiver 100 and system 30 will be apparent to those skilled in the art.

The information or message available to a paging transceiver 100 need not be static but instead may be dynamic. In other words, when a paging transceiver 100 is alerted that information is available, the information may be updated or otherwise change from the time that the user was alerted. As an example, the user may receive a weather alert and by the time the user decides to receive the information the information would be updated to reflect current weather conditions. The identifier for the information therefore does not limit the content that may be stored as the information available to the user.

The system 30 is not limited to transmitting only one alert at a time to one paging transceiver 100. Instead, the system 30 may send a plurality of alerts to a single paging transceiver 100 and each of those alerts may be broadcast to a plurality of paging transceivers 100. For instance, the system 30 may broadcast information to a plurality of transceivers 100 that share a common set of numbers within their mobile identification numbers. If the system 30 sends a plurality of alerts to a paging transceiver 100, these alerts may be displayed by the user interface 3 and the user can scroll through and act upon the messages as desired.

As discussed above, the system 30 and paging transceiver 100 allows information to be remotely acted upon by the paging transceiver 100. The system 30, however, also allows users access to their information via conventional ways, such as the PSTN 35. Therefore, a user may receive the alert with a paging transceiver 100 and decide to call in through the PSTN 35 to listen or otherwise act upon the message. The system 30 preferably is connected to the Internet whereby users can also gain access and act upon their information via the Internet.

The paging transceiver 100 preferably alerts the user both when a message identifier signal has been received and when complete messages have been received. The alerts may comprise any suitable indication to inform the user that the paging transceiver 100 has received a communication, such as a tone, vibration, or visual display. The alerts for a received identifier and for a received message are preferably different so as to allow a user to easily differentiate between the two communications.

Figure 10:
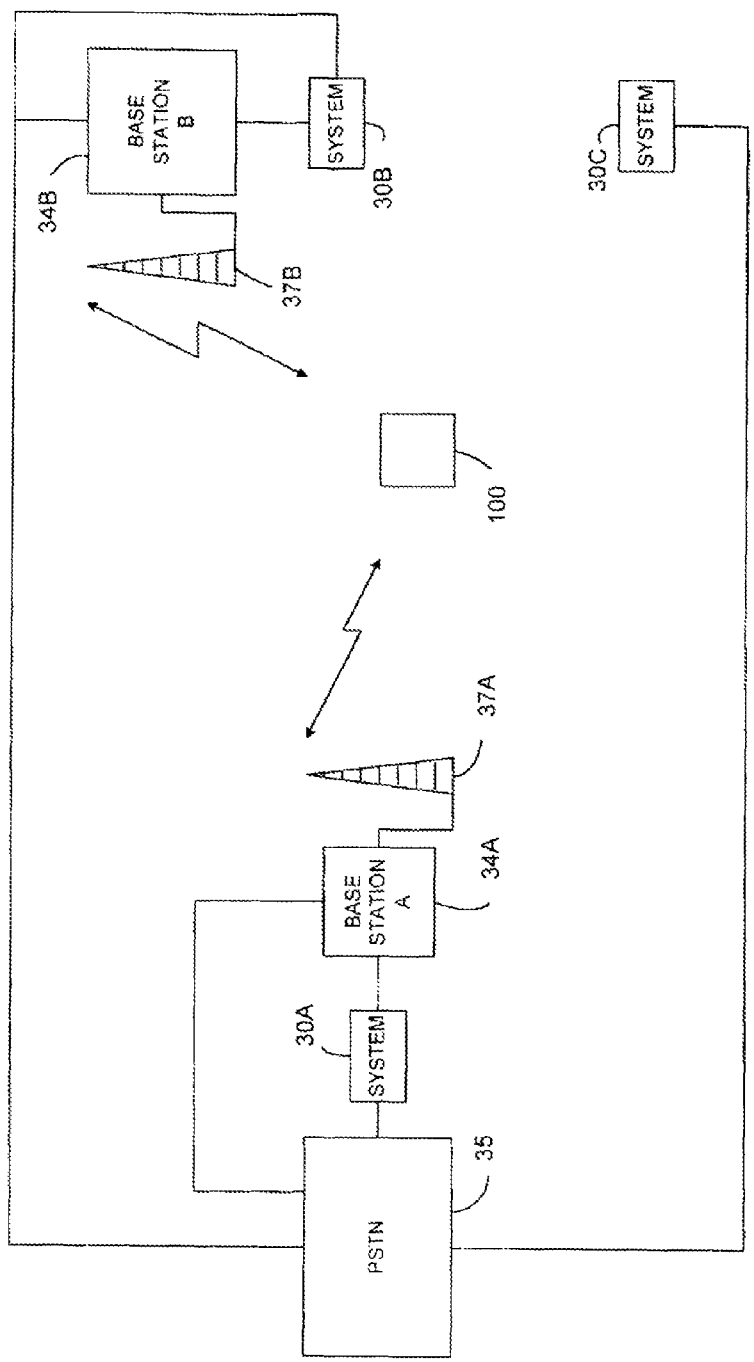
FIG. 10 is a block diagram of a paging system having multiple systems for storing messages.

The example provided in FIG. 3 was a single system 30 for storing messages on behalf of a plurality of paging transceivers 100. The invention, however, may include any number of systems 30 for storing messages with each system 30 storing information for a transceiver 100 being considered a content provider. For instance, as shown in FIG. 10, a messaging system 200 may comprise a plurality of systems 30 connected to the PSTN 35 with system 30A being associated with base station 34A and transceiver antenna 37A and system 30B being associated with base station 34B and transceiver antenna 37B. Although three systems 30 are shown, the system 200 may include any number of systems 30 and, although two base stations 34 are shown, each system 30 may be associated with a base station 34 and transceiver antenna 37 or only one of the systems 30 may be associated with a base station 34 and transceiver antenna 37. Furthermore, each system 30 need not include a paging terminal controller 31 or a storage unit 32. System 30C, for instance, may include a storage and retrieval unit 32 and input/output controller 33 but not a paging terminal controller 31 and may page the paging transceiver 100 through the paging terminal controller 31 in system 30A. Conversely, a system 30, such as system 30A, may include a paging terminal controller 31 and an input/output controller 33 but not a storage and retrieval unit 32. Further, the input/output controller 33 need not be a separate unit but may be incorporated into the paging terminal controller 31 if the system 30 does not include a storage and retrieval unit 32, or into the storage and retrieval unit 32, if the system 30 does not include a paging terminal controller 31. The systems 30 and base stations 34 may communicate with each other through the PSTN 35 or through links or lines other than or in addition to the PSTN 35, such as through an SS7 backbone of a wireless network or through the Internet.

Additionally, each of the base stations 34A and 34B may be part of a paging network but are preferably part of a cellular network. Either one or both of base stations 34A or 34B may page the paging transceiver and either one or both of the base stations 34A or 34B may deliver the contents of messages to the paging transceiver. Each of the systems 30A, 30B, and 30C may store messages on behalf of a user with the messages being of the same or different types. Furthermore, the messages stored within a single system 30 may be all the same type or may differ from each other.

As an example, system 30A may store voice mail messages and email messages directed to the user's office, system 30B may store voice mail messages directed to the user's home, and system 30C may store audio messages. The base station 34A acts as a clearinghouse for all messages delivered to the user to any of the systems 30 and pages the paging transceiver 100 whenever a message is received. Thus, when a voice mail message or email message is received at system 30A, the system 30A delivers a page to base station 34A which is then delivered to paging transceiver 100. When a voice message is received at system 30B, the system 30B sends information about the message to system 30A and system 30A then delivers a page to base station 34A for delivering the page to the paging transceiver 100. Similarly, when system 30C has an audio message it notifies system 30A and system 30A acts to have the page delivered to the paging transceiver 100.

An example of the data transmission 201 sent from system 30B or 30C to system 30A is shown in FIG. 11. The data transmission 201 includes system ID information for identifying the system 30 from a potential plurality of systems 30. The system ID information may be an address code or may comprise the telephone number of the system 30 and may be automatically captured by system 30A, such as from Caller ID or from DNIS information. The data message 201 also identifies the paging transceiver(s) 100, such as with an address code or MIN. For many systems 30, the message or information stored will often be for a single user whereby the transceiver ID would be the address code or MIN for that single paging transceiver 100. For other systems 30, however, the system 30 may want to broadcast a single message to a plurality of paging transceivers 100 whereby the transceiver ID may be a code that identifies a predefined group of paging transceivers 100.

The data transmission 201 also includes message information. The message information includes information identifying the message and preferably also includes information specifying the type of the message, the length of the message, and the message priority. The message identification may identify the message with a unique code, such as a number, or may specify the address in system 30 for the message. The message type advantageously indicates whether the message is a voice message, email message, audio message, video message, or text message. The message length indicates the size of the message and the message priority indicates the priority level of the message. For instance, the user can designate priorities based upon the telephone number of the caller leaving the message or the priority may be set by the caller. Although the data transmission 201 preferably includes this information, the data transmission 201 may include additional or fewer fields than the example provided in FIG. 11.

The data transmission 201 also includes additional information that may be relayed and presented to the user. For instance, for many systems 30 that receive and store messages on behalf of the user, the additional descriptive information preferably comprises a return address for identifying the caller's telephone number to inform the user as to who left the message. For other systems 30 which may generate their own information, the additional information preferably describes the information available to the user. For instance, for a system 30 that allows users to sample songs, the additional information would indicate the title and the artist of the song and may also specify the cost to retrieve and play the song. Other uses of the additional information will be apparent to those skilled in the art.

The page sent to the paging transceiver 100 includes most, if not all, of the data transmission 201. The information transmitted to the paging transceiver 100, with reference to FIG. 7, may be inserted into a short message transmitted to the user at step 98. From the system ID information, the paging transceiver 100 can determine which system 30 it needs to respond to in order to act upon a message. For instance, system 30A may page the paging transceiver 100 and indicate that system 30B has a stored message. If the user selects the retrieve message function, then the paging transceiver 100 can contact system 30B through base station 34B to retrieve the desired message. The paging transceiver 100 as discussed above may instead respond to base station 34A to retrieve the message and base station 34A would communicate with system 30B to retrieve or otherwise act upon the message.

The message information is used by the paging transceiver 100 to inform the user of the message or information stored at the system 30. The message type, length, priority, and additional descriptive material may be displayed or otherwise indicated to the user at the paging transceiver 100. From this information, the user can decide what type of action to take upon the message or information at the system 30.

As described with reference to FIG. 9, a call to the system 30 may be required in order for the paging transceiver 100 to perform a desired function. If a call is required, the paging transceiver 100 relays information in the data transmission 201 to the system 30. If the paging transceiver 100 responds to a system 30 other than the one storing the message or information, the paging transceiver 100 identifies the system 30 storing the message or information and also identifies the message. As discussed above, the message may be identified in a number of ways, such as with a message code or by specifying the location in memory where the message is stored. The call to the system 30 would automatically provide the transceiver identification information to the system 30, although the paging transceiver 100 could provide this information with the other information provided to the system 30.

Upon receiving a call from the paging transceiver 100, the system 30 reads the transceiver identification and message information to find the information requested by the paging transceiver 100. The information obtained from the paging transceiver 100 at the system 30 and the transfer of the requested information to the paging transceiver occurs at step 135 in FIG. 9.

The system 200 can present substantial cost savings to conventional paging systems. With a conventional paging system, the entire message is transmitted to the location of the paging transceiver 100. For instance, if the user's home base is in Chapel Hill, N.C., and the message originates in Chicago, Ill., then the message is typically sent over the PSTN 35 to the home base. With nationwide paging, the user may have traveled to San Diego, Calif. whereby the home base would then send the entire message from Chapel Hill to San Diego. With system 200, on the other hand, only the data transmission 201 is transmitted from Chicago to Chapel Hill and from Chapel Hill to San Diego. The actual message, in contrast, is sent directly from the storage facility in Chicago to San Diego, thereby reducing charges associated with the transfer between Chicago and Chapel Hill. Moreover, the data transmissions 201 between systems 30 may occur over the Internet. These transmissions, for instance, may be formatted according to the Voice Profile for Internet Mail (VPIM) and the addresses of the transceivers 100 may be determined from an open directory service, such as the Lightweight Directory Access Protocol (LDAP) or X.500.

The systems 30 and 200 allow a user to easily manage the multitude of messages that are commonly received every day. Conventionally, a user would have to call in to the office voice mail to retrieve voice messages, call home to retrieve voice messages sent to the house, and connect with the computer network at the office to retrieve email messages. Although paging systems have been used to notify a user that a voice mail message or other message has been received, the user would still have to call in to a separate system to actually retrieve the message. The system 200, on the other hand, enables a user to be notified of all messages, regardless of their type and regardless of their location and furthermore allows the user to selectively retrieve, save, erase or perform other functions on the messages. The systems 30 and 200 and paging transceiver 100, moreover, allow the user to exercise control over the remotely stored messages; the user can selectively store, save, retrieve, erase, forward, send or otherwise perform operations on messages stored at a remote location.

The forgoing description of the preferred embodiments of the invention has been presented only for the purpose of illustration and description and is not intended to be exhaustive or to limit the invention to the precise forms disclosed. Many modifications and variations are possible in light of the above teaching.

Figure 12:
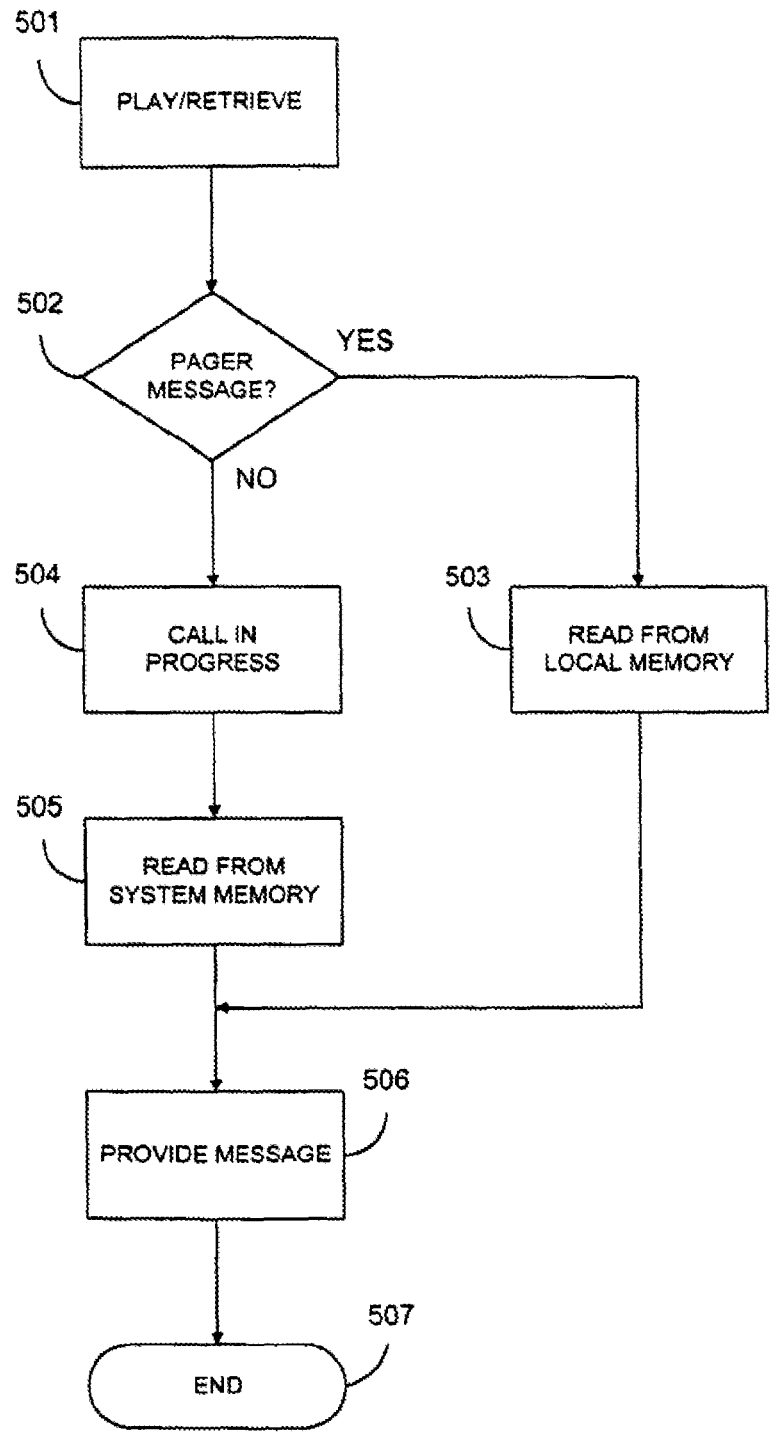
FIG. 12 is a flow diagram of a process according to a preferred embodiment of the present invention for playing and/or retrieving messages.

FIG. 12 shows process flow for when the user of devices such as paging transceiver 100 wishes to play a selected message (i.e. a message from John Doe). The operator simply presses keys or otherwise manipulates or actuates the interface in a manner to cause the interface to recognize a "play" input, step 501. This can occur via any man/machine interface components which feature appropriate properties, including appropriate look and feel, structure, cost, compatibility with electronic and structural environment and convenience. Such components can, for instance be conventional keypad, single dimension or multi dimension mouse coupled to an appropriate screen, buttons, voice actuated, or other components. Flow proceeds to step 502 where CPU 27 determines if the message identifier information selected corresponds to a message stored at the paging transceiver 100. If yes, flow proceeds to step 503 where the message is read from message memory 5 and the message is played. If at step 502 the result is no, flow proceeds to step 504 where if the paging transceiver 100 is on line flow proceeds to step 506. If it is not, the call process is activated to go on line as previously described and flow proceeds to step 506 where the message is read from store and retrieval unit 32 and played for the operator while the message is simultaneously stored in paging transceiver 100 message memory 5. The process ends at step 507.

Figure 13:
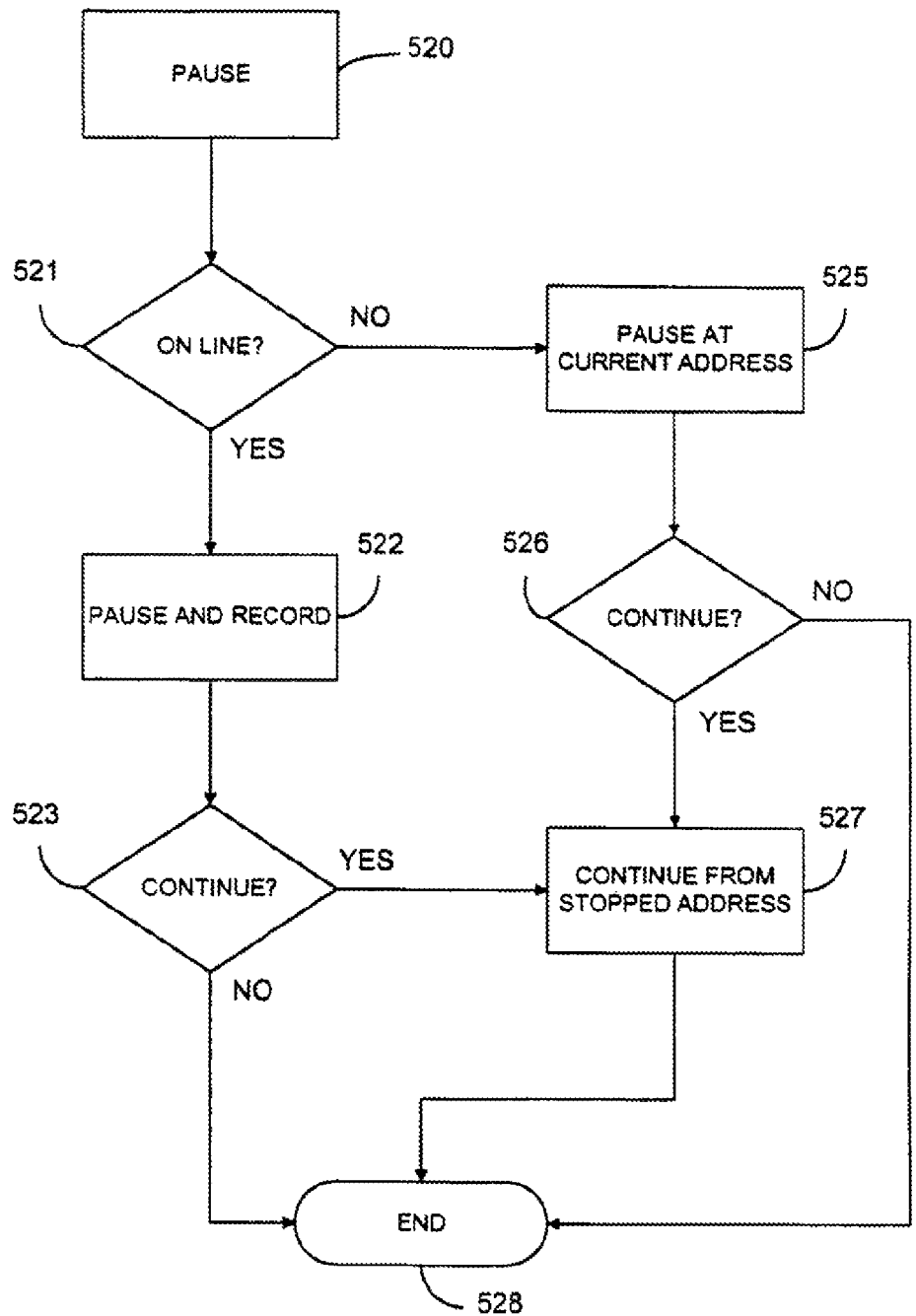
FIG. 13 is a flow diagram for a process according to a preferred embodiment of the present invention for pausing while playing messages.

FIG. 13 shows process flow for when a message is playing and the user wishes to use the interface to create a 'pause,' step 520. Flow proceeds to step 521 where a test is made to determine if the message is being played. If the message is playing from system 30, flow proceeds to step 522 where the message that the operator hears is paused while the message continues to be recorded in paging transceiver 100 message memory 5. Flow proceeds to step 523 where CPU 27 determines if the operator released the pause function. If not, the paging transceiver remains in pause mode (i.e. muted) and the process ends, step 524. If at step 523 the operator releases the pause button, flow proceeds to step 527 where the message begins to play from the location in memory from which pause was last pressed. The process ends at step 528. If at step 521, it is determined that the message is playing from message memory 5, flow proceeds to step 525 where playing of the message is suspended and flow proceeds to step 526 where a test is made to determine if the operator released the pause button. If no, the process ends, step 529. If yes, the message begins to play from the last paused address and the process ends at step 528.

Figure 14:
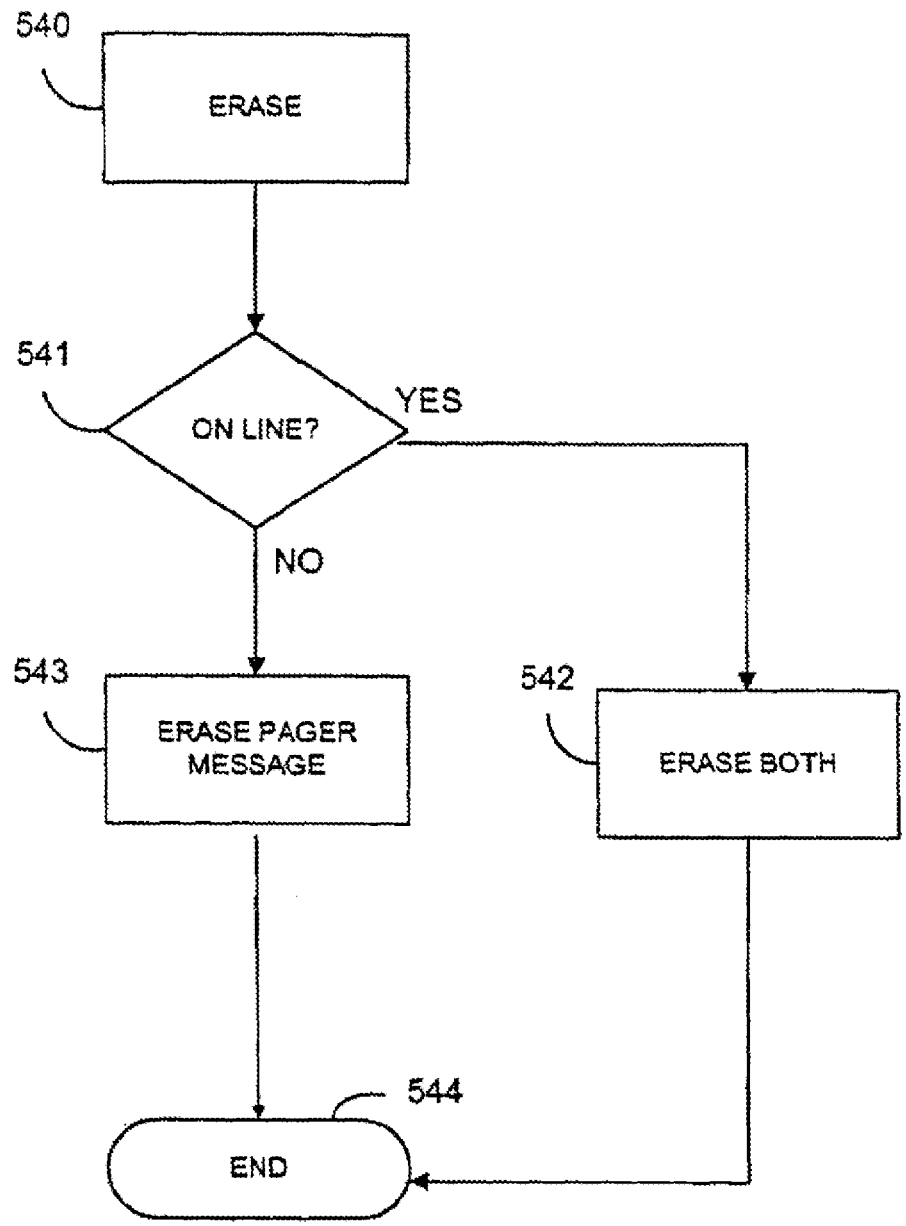
FIG. 14 is a flow diagram for a process according to a preferred embodiment of the present invention for erasing messages.

FIG. 14 shows process flow for when the user wishes to 'erase' messages using the interface. CPU 27 determines if the paging transceiver is on line or off line, step 541. If off line, flow proceeds to step 543 where the selected message is erased and the process ends, step 544. If at step 541, it is determined that the paging transceiver 100 is on line, the selected message at the paging transceiver (if any) and the corresponding message at the system 30 are both erased and the process ends, step 544.

Figure 15:
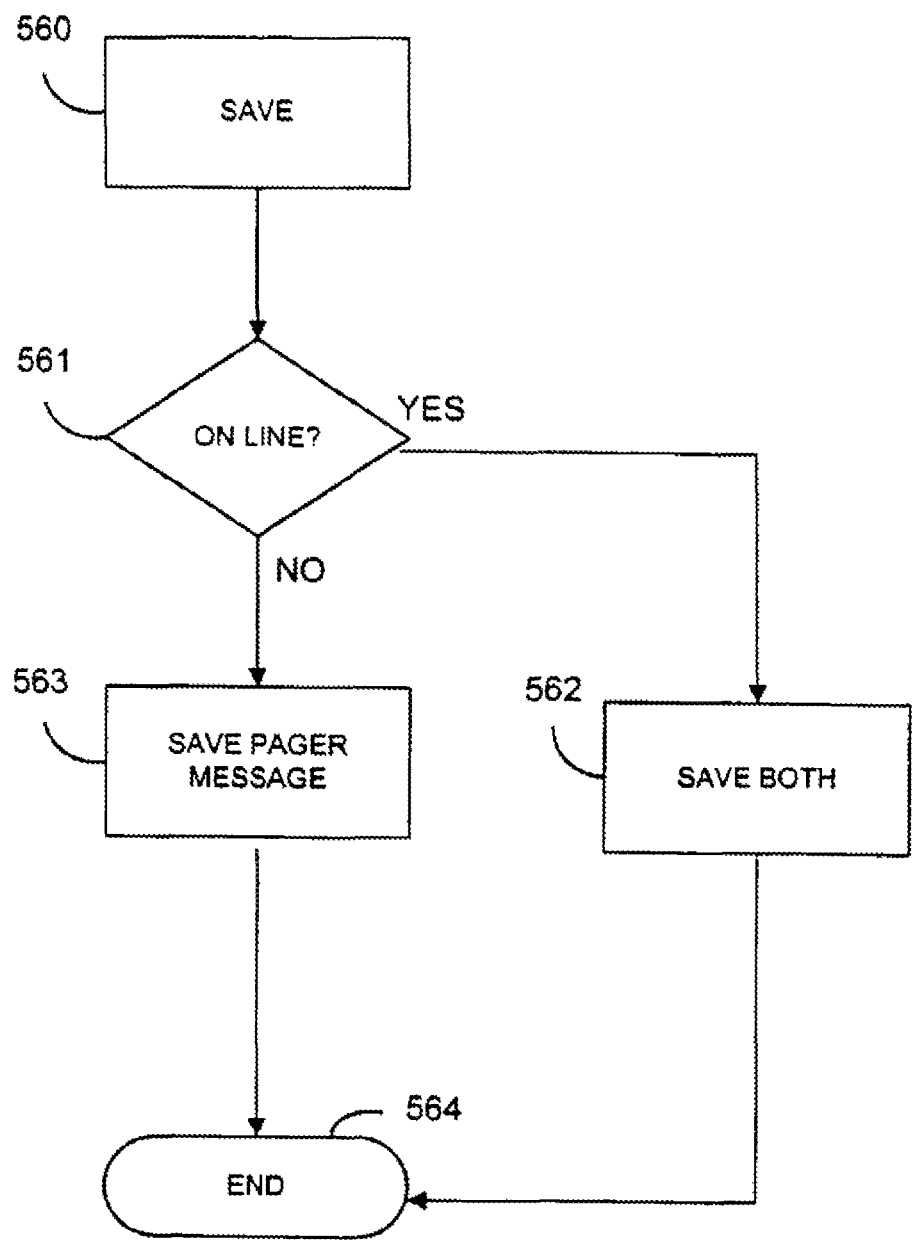
FIG. 15 is a flow diagram for a process according to a preferred embodiment of the present invention for saving messages.

FIG. 15 shows process flow where the user desires to 'save' messages. At step 560, flow proceeds to step 561 where it is determined if the paging transceiver 100 is on line or off line. If off line, a save message flag is set which corresponds to any selected message which may reside in the paging transceiver 100, step 563. If on line, flow proceeds to step 562 where the selected message is saved at the paging transceiver 100 (if any) and the system 30. If at step 562 the selected message does not reside at the paging transceiver 100, it will be retrieved from the system 30 and saved at both locations. The process ends at step 564.

For the purpose of illustration only, a wireless mobile telephone will be used as an exemplary wireless messaging device. However, it should be understood that other messaging devices, such as pagers, wireless PDA's and the like, are also contemplated.

A wireless mobile telephone, hereinafter mobile phone, is configured to receive text messages and message alerts. The mobile phone may be configured to receive Short Messaging Service (SMS) email messages or the mobile phone may have a Web Browser for accessing an Internet based email service. An email server receives an email message intended for a specific mobile telephone. An email message includes a message body and a message header. The message header usually includes various fields, such as a To field, a From field, and a Subject field. The message header also may include a Message Type field and other information common in email messages.

The email server assigns a message identifier (ID) to the message and, in one embodiment, forwards the entire message and the message ID to a mobile system for transmission to the targeted mobile phone. Alternatively, the email server may send to the mobile system just an alert, the From field, and/or the Subject field, but not the entire message. Depending on what was transmitted to the mobile system, the mobile phone user may read the entire message, read whom the message was from, read the message subject or read the message ID.

Whether the entire message or just part of the message header was transmitted to the mobile phone, the mobile phone user may choose to reply to the message. To reply to the message, the user may simply press a button to automatically transmit to the mobile system information that identifies the mobile phone user and the message to which the user is replying. The mobile phone user may be identified by the mobile phone's mobile identification number (MIN) or by data associated with the received message, such as the message ID described above. Similarly, the message to which the user is replying may be identified by the message ID. In one embodiment, the message ID is a reply code (i.e., a short string of letters and/or numbers, such as 1234). Alternatively, the message ID is a telephone number (or pseudo telephone number) that is associated with a message processing system. For example, the email server may assign a callback telephone number to a specific message. Upon receiving the message and callback number, the mobile phone user may simply activate the reply mode causing the callback number to be transmitted for identifying the mobile phone user and or the specific message being replied to.

Figure 16:
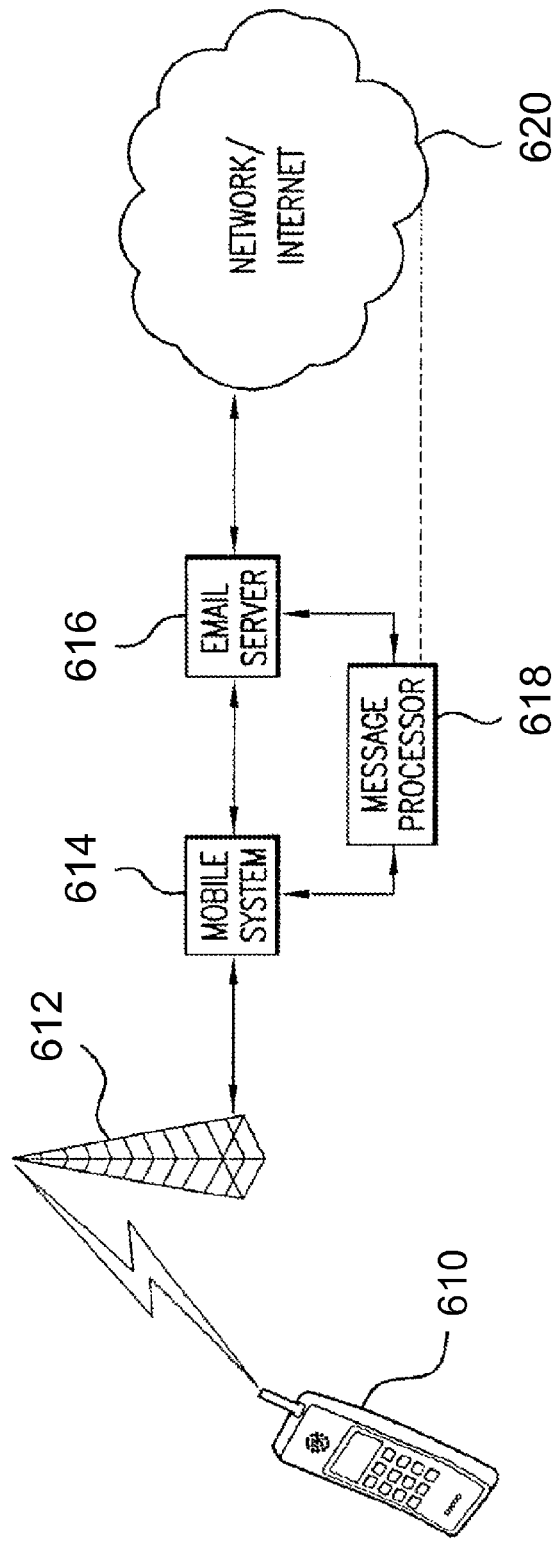
FIG. 16 is a block diagram of a wireless messaging system.
Figure 17A:
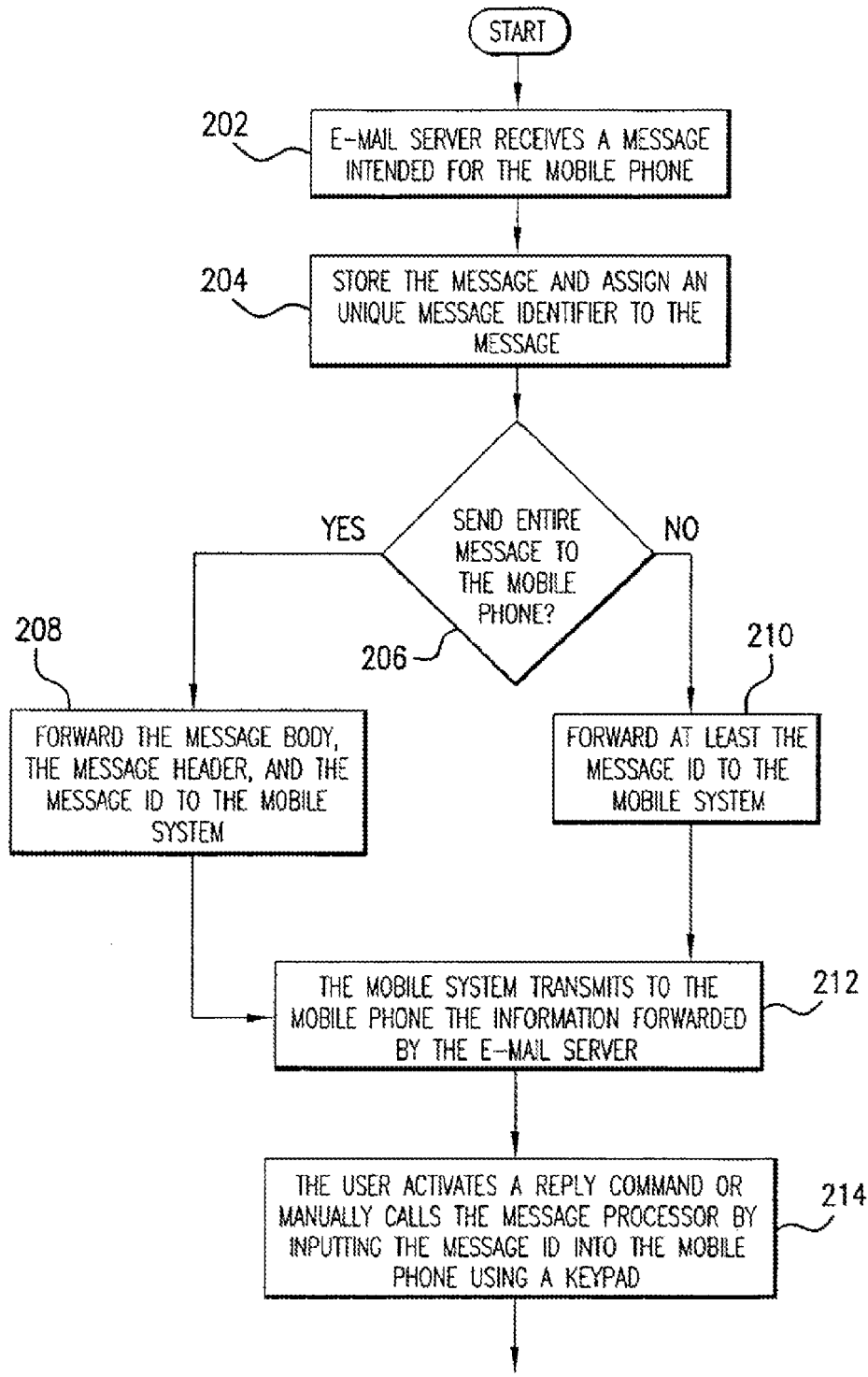
FIGS. 17A and 17B is a flowchart illustrating a process of replying to a message.
Figure 17B:
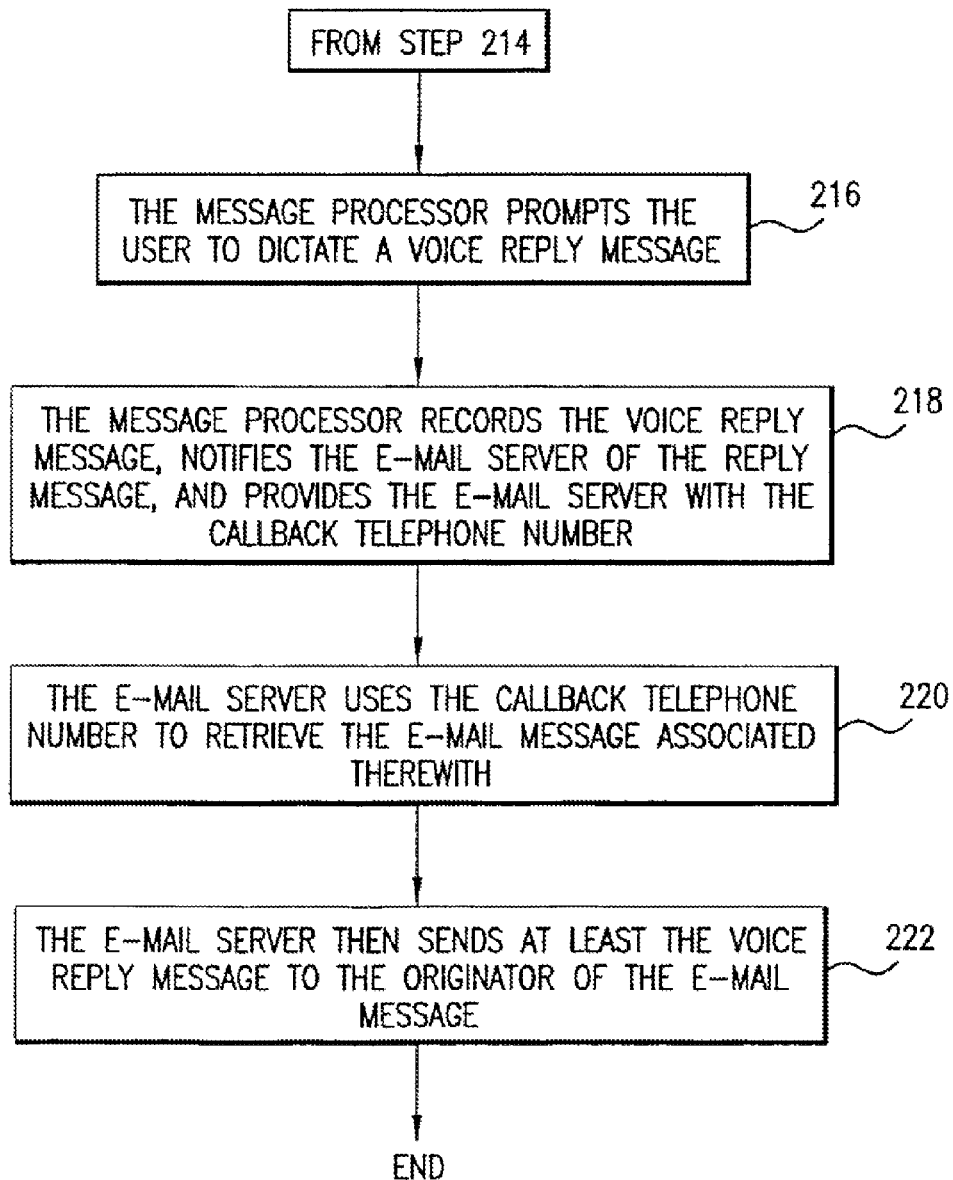

FIG. 16 illustrates the messaging system 600 described above and FIGS. 17A and 17B illustrate the steps performed by the components of system 600 when a mobile phone 610 user replies to an email message with a voice message. First, the email server 616 receives the email message from the Internet 620 or from another source (step 202). The email server 616 stores the message and assigns a message identifier (ID) to the email message (step 204). The message ID may take any number of forms as previously described but for the purpose of example, the email server assigns to the message a telephone callback number (e.g., 202-555-1212) or pseudo telephone number (e.g., #71 or #112).

Next, the email server 616 determines whether it should send to the mobile phone 610 the entire email message or just part of the message (for example, one or more fields of the message header) (step 206). This determination can be based on a user profile that is stored at the email server 616, or may be specified by the user for one or a particular group of email messages. Thus, some users may create a profile that specifies that they want to receive the entire message, whereas other users can specify that they don't want to receive the entire message and can specify which portions of the message they do want to receive. If the entire message should be sent, then the entire message plus the callback number generated in step 204 is forwarded to the mobile system 614 (step 208). If the entire message should not be sent, then the email server 616 forwards, at the least, the callback number generated in step-204 to the mobile system 614 (step 210). The mobile system 614 comprises a message center, a call switching center, and transceiver circuitry necessary for transmitting information to the antenna 612 and the mobile phone 610. The mobile system 614 then transmits to the mobile phone 610 the information forwarded by the email server 616 (step 212).

Upon receiving at the mobile phone 610 the information forwarded by the email server 616, which at the least includes a callback number, the user may choose to send a reply message to the originator of the email message (step 214). The user can accomplish this by activating a reply command. Upon activating the reply command, the mobile phone automatically places a call to the callback number. Alternatively, instead of activating the reply command, the user may manually call the callback number by entering the callback number using a keypad on the mobile phone 610, or by speaking the callback number into the receiver of the mobile phone 610.

In one embodiment, all of the callback numbers generated by the email server are associated with message processor 618, thus upon placing the call to the callback number, the mobile system 614 routes the call to the message processor 618, which then answers the call. The message processor 618 may comprise a voice store and forward system for receiving voice and forwarding voice messages. Voice store and forward systems are readily available and are commonly configured to communicate with networked systems such as the email server 616. The email server 616 communicates with the message processor 618 for establishing a temporary mailbox associated with a specific callback number, which was assigned to a message.

When the message processor 618 receives a call directed to a specific callback number, the message processor 618 prompts the mobile phone user to dictate a reply message for the specific recipient identified by header information contained in the original message (step 216). The message processor 618 records the voice reply message, notifies the email server 616 of the voice message, and provides the email server with the callback telephone number that the user dialed (or that the mobile phone 610 automatically dialed in response to the user activating the reply command) (step 218).

The email server 616 uses the callback telephone number to retrieve the email message associated therewith (step 220). The email server 616 then transmits to the originator of the email message associated with the callback telephone number at least the voice message recorded by the message processor 618 (step 222). In one embodiment, only the voice message is transmitted, in other embodiments, the voice message plus the email message associated with the callback number are transmitted.

The message processor 618 may be replaced with another type of processor depending on the media type. For example, instead of utilizing a voice message processor, a video message processor may be utilized in a broadband system for sending video messages from a mobile phone.

Messages sent from the email server may be transported over the Internet 620 or a private network. The mobile system 614, email system 616 and message processor 618 may be directly connected or they may be connected via a network such as the Internet or the public switched telephone network.

As described above, a mobile phone user may reply to messages that were not transmitted in their entirety to the mobile phone 610. In one embodiment, a mobile phone user might receive only a name for identifying the message originator and/or a subject but not the body of the message. Such would be the case in a system that allows the mobile phone user to decide which messages should be transmitted. In the case where the user does not receive the entire message, the mobile phone user could reply to the originator of the message stating, "I will attend to your message when I return to the office." Optionally, the mobile phone user could read the subject matter and then send a request message to the email server 616, which causes the email server to transmit the entire message or the remainder of the message. Lastly, a mobile phone 610 equipped with a web browser may connect to an Internet based mail system for reading messages. A reply code, callback number or message code may be embedded in the internet mail based message, thereby enabling a mobile phone user to reply to a specific message as described above.

A significant feature of the -present invention described above is the ability to "directly access" a specific message from the mobile phone 610 for replying to or for performing an action thereon. Each message transmitted to or accessed from the mobile phone 610 has a message ID associated therewith. A mobile phone user (for example) may reply to a message, delete a message from the email server 616 without retrieving the entire message, forward a message and retrieve a message. The user may also mistakenly delete a message stored in the mobile phone 610 and then retrieve it again from the email server 616. Unlike prior art email and voice mail systems, the present invention provides for direct access of remotely stored messages for retrieval and for performing an action associated therewith, as is described in the above mentioned related U.S. patent application Ser. Nos. 08/934,143, 08/933,344, 08/934,132, and 08/934,337.

The invention of FIG. 16 is shown configured with one email server 616 and one message processor 618. However, multiple email servers 616 and or message processors 618 may be configured in the system, for example, via network connection, direct connect, or the Internet. This approach, when used in conjunction with the email industry standard POP3 mail, allows the mobile phone user to access email from a plurality of email systems.

Any email server 616 may send message alerts, header information, message codes, subject matter, or the body of a message to the mobile system 614 for transmission to the mobile phone 610. Alternatively, the email server 616 and or the message processor 618 (shown in FIG. 16) may act as a master system for commutating with the mobile system 614 and slave email servers 616 and or slave message processors 618 may be configured to communicate with the master email server 616 and or a master voice processor 618 for communicating with the mobile phone 610.

As previously stated, a mobile phone user may receive any part of the message or the entire message. While some mobile phone users may decide to have the system alert them and automatically deliver the entire message, other mobile phone users (power users) may wish to be alerted and automatically receive only the sender's name and the subject of the email message. The mobile phone user may then decide to retrieve the message, delete the message, forward the message or reply to the message. The present invention provides the mobile phone user direct access to and remote control of email messages regardless of where the email messages reside.

The mobile phone 610 can originate email messages by utilizing an address book or by direct entry of an address or an abbreviated address. The address book may be stored in the mobile phone 610, on the email server 16 or in the message processor 618. The mobile phone user may simply select a name from the mobile phone's 610 address book, activate a send message command and send a message to the message processor 618 for delivery to the email server 616 and finally to the addressed destination as previously described.

In another embodiment, the mobile phone user may enter the address manually or enter an abbreviated address associated with the actual address stored on the email server 616 and or the message processor 618. In another embodiment, the mobile phone user may utilize a mobile phone 610 that has Internet access capability such as the so-called "smart phones". Upon accessing the Internet, the mobile phone user may access an Internet based email system such as Hot Mail, Yahoo Mail and the like. The Mobile phone user may then choose a message to read, reply to a message or select a name from an address book for originating a message. The user then selects a send command for sending a message (digital, analog, or other) to the Internet based email system or the email server 616. The selected address book entry may contain addressing information for identifying a particular email server or message processor. Upon the mobile phone user's selection of a message recipient, the mobile phone 610 connects to the identified email server 616, message processor 618, or another system for delivering the email message. An email message may also be routed to a particular system based on the type of email message For example, a voice message may be directed to a voice message processor and a text message may be directed to an email server. The mobile phone 610 may connect to the Internet for sending a-message or a phone call may be placed to the message processor 618. Alternatively, a mobile phone user may indicate to an email server that he/she wishes to send a message, such as a voice message, to a particular destination. The email server then informs the message processor 618 that the specific mobile phone user wishes to send a message. The message processor then places a call (or connects) to the mobile phone 610 and prompts the mobile phone user to record a message as previously described.

The present invention provides for receiving an email message that has an attachment (i.e., an attached file). The mobile phone 610 does not need any special modifications to receive a text message and for example a voice attachment (i.e., the attached file contains a voice message). When a mobile phone 610 receives a text message having an attachment associated therewith, the mobile phone user may receive all or a portion of the text message, header information, an alert, and a message code which identifies the attachment. To hear the voice message attachment, delete the voice message, reply to the originator of the voice message, or forward the voice message to other people, the mobile phone user simply places a call to the message processor 618, enters the message code that identifies the attachment using a keypad (or if the message processor 618 has voice recognition capability, simply speaks the message code), and enters a code corresponding to an action or speaks a command, such as reply, delete, forward, save, etc. The message processor 618 performs the command.

That is, the message processor 618, upon receiving a call from a mobile phone user, may be configured to identify the mobile phone user utilizing the industry standard caller ID. After identifying the mobile phone user, the message processor prompts the mobile phone user to enter the message code associated with the received message for retrieving the corresponding voice attachment. The voice message file corresponding to the message code is then accessed by the message processor 618. The message processor 618 then plays the message to the mobile phone user over the telephone connection so that the mobile phone user can hear the attachment.

In this manner, unlike prior art voice mail systems, the present invention provides direct access to a specific message. The mobile phone user need not scroll through a large number of messages in order to locate a specific message.

Upon accessing a message file, the message processor 618 allows the user to erase the message, forward the message, or record a reply for the voice message originator. In another embodiment, the mobile telephone may be configured to automatically transmit a message code to a specific message processor as previously described. The main difference between a message code for retrieving a voice attachment and a reply code is that a message code for retrieving a message directs the message processor to play the message while a reply code directs the message processor 618 to record a reply message.

Voice attachments may be retrieved manually by entering a message code or automatically. The mobile phone user may place a call directly to a specific message processor 618 or the call may be automatically directed to a specific message processor that corresponds to a received system identification code or the call may be directed to a specific telephone number associated to the mailbox within the message processor 618 where a specific message resides.

The mobile phone user may additionally access a voice message by accessing a web based email system with a browser-enabled mobile phone 610. The web based email server may supply the message code and upon a mobile phone user activating a retrieve command, the mobile phone 618 places a call to a message processor 618. Alternatively, the web based email server may notify the message processor 618 and the message processor 618 then connects with (or calls) the mobile phone 610 and plays the message to the mobile phone user. The message processor 618 is adapted to play an analog voice file or a digital voice file. The voice message may be streamed to the mobile phone 610 for real time reproduction or the voice file may be transferred to the mobile phone 610 for storage in a memory device within the mobile phone 610. The message is not limited to an analog or digital voice message buy may include streaming video or other multimedia content.

It has been clearly shown that an email text message and an attachment may be received or retrieved by the mobile phone 610. Email messages may be sent to the mobile phone 610 from a number of devices such as for example, a computer with Internet access to a web based email system or from a computer utilizing an email program. The present invention additionally provides for sending email messages from a mobile phone 610 to another mobile phone 610 (i.e. mobile-to-mobile) or to itself (i.e. memo mode). A mobile originated voice message may be recorded and addressed by a mobile phone user to a targeted mobile phone 610. The difference between sending a message to a computer or to a mobile phone 610 is simply the address. The present invention makes it possible to communicate two-way email, including attachments between a computer and a mobile phone and between mobile phones. Mobile phone users need not scroll through messages to access a specific message. Messages may be directly accessed for performing an action thereto. A mobile phone user may simply select a destination address, activate a send message command and record a voice email for any targeted destination. A mobile phone user may activate a reply command and record a voice email that is automatically or manually addressed to a message originator. Messages may be automatically received, manually retrieved, replied to, forwarded, deleted, originated and reproduced by the mobile phone 610. The need for a mobile phone to have browser capability for accessing the Internet to communicate two-way email is eliminated.

As previously stated, the present invention may be configured to deliver entire text email messages to a mobile phone 610 or just a portion of the message, such as the name of the originator and/or the subject. Additionally, a message may be received from the email server 616 on demand by the mobile phone 610. A mobile phone user may automatically receive a name and subject information but may not wish to automatically receive the entire message. After the mobile user reviews the received names and associated subjects, the mobile phone user may decide to retrieve the remainder of the message or the entire message.

A message may be deleted from the mobile phone 610 but it may be again retrieved from the email server 610, if the message is still stored on the email server 610 as previously described. The ability to retrieve a specific message on demand allows for new and improved features for the mobile phone 610, a paging device or other types of wireless email and messaging devices.

One such feature of the present invention is an improved memory management arrangement and method for automatically deleting messages stored in a mobile phone or messaging device when the device's memory is full. For example, prior art paging devices have a limited amount of memory for storing messages. There are times when the memory is full of messages and new messages cannot be received and stored. Other paging devices automatically delete the oldest read message in order to make room in memory for a newly received message. These prior art devices and methods have a disadvantage because once a message is deleted or over written, it cannot be recovered. The present invention provides a system for deleting messages when memory is full but the deleted or over written messages may be again received and stored by the mobile telephone 610 as will be described hereinafter.

The mobile phone 610 may be configured so that an internal processor executes the following process: Receive and store messages in memory. When a message is received and memory is full, over write one or more message bodies, but retain the message header and the message ID associated with the message, to make room for the new message. Store the new message. When over writing message bodies, over write the oldest read message body first, when there are no read message bodies left, over write the oldest unread message body. When there are no more message bodies, over write the oldest read subject first. When there are no more read subjects, over write the oldest unread subject. The mobile phone 610 may be configured to delete the name and header information using the same priority as described above.

The above-described process causes the mobile phone 610 to over write only message bodies when there is not enough memory to store an additional message. The mobile phone user may continue to save and view information that identifies the message originator (the name) and information describing the message (the subject). If the mobile phone user desires to read an entire message body that was deleted or over written, a retrieve command may be activated by the mobile phone user for causing the mobile phone 610 to transmit the selected message ID to the email server 616. Upon receiving the retrieval request and message ID, the email server 616 sends the email message corresponding to the message ID to the requesting mobile phone 610. An over written or deleted message can now be recovered.

The present invention provides for sending and receiving messages based on one or more variables. The email server 616 and the message processor 618 may be configured with Instant Messenger software such as is provided by Microsoft, America On Line, AT&T and others. These programs provide notification when a computer-messaging device is on line or the operator is logged in. When the message processor 618 or email server 616 receives a message for the mobile phone 610, the message may be held until the mobile phone is on line. In other words, when the user is logged in or when the presence of the user is detected, the message is delivered. Conversely, when a message is sent to a mobile phone 610, the message may be held by the email server 616 or the message processor 618 until the presence of the mobile phone 610 or the mobile phone user is detected. Detection of the mobile phone 610 may for example be accomplished by interfacing a home location register (HLR) to the email server 616 and the message processor 618. HLR equipment is readily available and used extensively by mobile phone companies to provide detection of a mobile phone in a particular service area in order to route calls. Detection of a mobile phone user may also be accomplished by detecting user-activated commands that are transmitted to the email server 616 or the message processor 618. Detection of an operator, mobile phone user or active messaging device enables the present invention to perform actions responsive to the status of messaging devices or the presence of their respective user. The email server 616 may automatically route messages to a mobile phone 610 when the mobile phone user is utilizing the mobile phone 610. Then, when the mobile phone user turns the mobile phone 610 off and logs in to an office computer, the email server routes messages to the office computer. The present invention may perform any number of actions or combination of actions based on a mobile phone user activated command or by automatically detecting the status of the mobile phone 610 and or the presence of the mobile phone user. Messages may even be redirected automatically to a mobile phone user's computer email service if the message cannot be delivered to the mobile phone 610 because the mobile phone 610 was out of range or turned off.

The email server 616 and the message processor 618 may automatically perform an action or sequence of actions based on the time of day, the date, the status of a mobile phone 610, the presence of a user, user activity, geographic location of the mobile phone 610 or any number of conditions which may be transmitted to the email server 616 or the message processor 618. Sensors may be added to the mobile phone 610 and data from the sensors may be automatically transmitted or manually sent by the mobile phone user. A temperature sensor, for example, may be included in the mobile phone 610 wherein temperature readings are automatically transmitted to the email server 616. Based on temperature, the location of the mobile phone 610 and the presence of the mobile phone user, the email server 616 or the message processor may for example send an email message to the mobile phone user that includes an advertisement stating, "The temperature is 98 degrees. Please drink Coke. 35 cent special one block away at the super store." Alternatively, the mobile phone user may configure the present invention so that messages from particular people are delivered to the mobile phone 610 on week days between 9:00 am and 5:00 μm but otherwise routed to the mobile phone user's home computer and have copies of all message activity go to an office email system. Messages may also be filtered based on the location of the mobile phone 610 so that very important messages are routed to the mobile phone 10 when the mobile phone user is out of town with the mobile phone 610. A mobile phone user may also configure the system to send a notification message to the mobile phone 610 when another mobile phone 610 user or a computer device user is detected by the email server 616 or the message processor 618.

The present invention may be utilized in telephone systems, paging systems, email systems, and numerous communications systems.

Similar process flow may be implemented for other functionality which is desired in access and management of messages according to the present invention.

The foregoing disclosure is provided for purposes of explanation and illustration of various embodiments and features of the invention. Modifications and changes may be made to the disclosed subject matter without departing from the scope or spirit of the invention.

The embodiments were chosen and described in order to explain the principles of the invention and their practical application so as to enable others skilled in the art to utilize the invention and various embodiments and with various modifications as are suited to the particular use.

What is claimed is:

1. A method used by a content provider that provides notification of content intended for a subscriber having a wireless transceiver configured to receive messages and retrieve remotely stored content, comprising:
    storing in a memory a plurality of items of content available to the wireless transceiver;
    causing transmission of a notification to a subscriber by paging call, the notification configured to: (1) include a content identifier specifying a particular item of content from among the plurality of items of content in the memory and a system address indicating a system to be contacted to trigger retrieval of the content, (2) formatted for display on the subscriber's wireless transceiver, and (3) enable the subscriber to request the particular item of content by responding with at least a portion of the notification to cause the particular item of content to be downloaded;
    causing error status information to be transmitted to the wireless transceiver from the system to be contacted to trigger retrieval of the content; and
    responsive to a transmission from the wireless transceiver, transmitting the particular item of content to the wireless transceiver following receipt from the wireless transceiver of a request that is based at least in part on the error status information.

2. The method of claim 1, further comprising retrieving information from a home location register (HLR) that stores information pertaining to the wireless transceiver.

3. The method of claim 1, wherein the notification further includes at least information about the subject of the particular item of content.

4. The method of claim 3, wherein the notification further includes the name of the originator of the particular item of content.

5. The method of claim 1, further comprising determining a registered location and status of the wireless transceiver and thereafter causing transmission of the notification to the wireless transceiver.

6. The method of claim 5, wherein determining the registered location and status of the wireless transceiver comprises retrieving information from a home location register (HLR).

7. The method of claim 5, wherein determining the registered location and status of the wireless transceiver occurs without a user of the wireless transceiver supplying the location information.

8. The method of claim 1, wherein the notification comprises a short message service ("SMS") message.

9. The method of claim 1, wherein a content provider receives the content identifier and system address from a separate identification service.

10. The method of claim 1, further comprising updating the particular item of content after the notification is caused to be transmitted without causing a new notification to be caused to be transmitted.

11. The method of claim 10, further causing the updated particular item of content to be transmitted to the wireless transceiver after receiving a request corresponding to the originally-sent notification.

12. The method of claim 1, wherein the notification and the request that is based at least in part on the error status information include addresses specific to the same mobile wireless transceiver.

13. The method of claim 1, wherein the notification further identifies a type of the particular item of content.

14. The method of claim 1, wherein the notification further includes an express time selected by the content provider stating when the particular item of content is available, wherein the express time is after the time the notification is caused to be transmitted to the subscriber.

15. A system that provides notification of content intended for a subscriber having a wireless transceiver configured to receive messages and retrieve remotely stored content, comprising:
a memory configured to store a plurality of items of content available to the wireless transceiver;
a first processor configured to cause transmission of a notification to a subscriber by paging call, the notification configured to: (1) include a content identifier specifying a particular item of content from among the plurality of items of content in the memory and a system address indicating a system to be contacted to trigger retrieval of the content; (2) formatted for display on the subscriber's wireless transceiver, and (3) enable the stored particular item of content to be downloaded;
a second processor configured to cause error status information to be transmitted to the wireless transceiver from the system to be contacted to trigger retrieval of the content; and
a third processor configured to transmit the particular item of content to the wireless transceiver responsive to a request from the wireless transceiver following receipt from the wireless transceiver of a request that is based at least in part on the error status information.

16. The system of claim 15, wherein the notification further includes information about the subject of the particular item of content.

17. The system of claim 15, the first processor being configured to determine the registered location and status of the wireless transceiver.

18. The system of claim 17, the first processor being configured to determine the registered location and status of the wireless transceiver by retrieving registered location and the status information from a home location register (HLR).

19. The system of claim 17, the first processor being configured to determine the registered location and status of the wireless transceiver without the user of the wireless transceiver manually supplying the registered location and status.

20. The system of claim 15, wherein the notification comprises a short message service ("SMS") message.

21. The system of claim 15, wherein the particular item of content includes audio and visual information.

22. The system of claim 15, further comprising a network interface configured to receive the system address from a separate identification service.

23. The system of claim 15, wherein the memory is configured to store an updated version of the particular item of content after the notification is caused to be transmitted without causing a new notification to be transmitted.

24. The system of claim 23, wherein the third processor is configured to cause the updated version of the particular item of content to be transmitted to the wireless transceiver.

25. The system of claim 17, wherein the notification and the request that is based at least in part on the error status information include addresses specific to the same mobile wireless transceiver.

26. The system of claim 17, wherein the notification further identifies a data type of the particular item of content.

27. The system of claim 17, wherein the notification further includes an express time stating when the particular item of content is available, wherein the express time is after the time the notification is caused to be transmitted to the subscriber.

* * * * *